(12) United States Patent
Carlson

(10) Patent No.: US 11,549,232 B2
(45) Date of Patent: Jan. 10, 2023

(54) VERTICAL LIFT LOADER ARMS FOR COMPACT UTILITY LOADER

(71) Applicant: Great Plains Manufacturing, Inc., Salina, KS (US)

(72) Inventor: Jason Carlson, Lindsborg, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 42 days.

(21) Appl. No.: 16/942,506

(22) Filed: Jul. 29, 2020

(65) Prior Publication Data

US 2021/0032843 A1 Feb. 4, 2021

Related U.S. Application Data

(60) Provisional application No. 62/984,476, filed on Mar. 3, 2020, provisional application No. 62/879,796, filed on Jul. 29, 2019.

(51) Int. Cl.
*E02F 3/38* (2006.01)
*E02F 9/22* (2006.01)
(Continued)

(52) U.S. Cl.
CPC ............... *E02F 3/382* (2013.01); *B60K 5/12* (2013.01); *B62D 55/06* (2013.01); *B62D 55/10* (2013.01); *B62D 55/125* (2013.01); *B62D 55/18* (2013.01); *E02F 3/34* (2013.01); *E02F 3/342* (2013.01); *E02F 3/3414* (2013.01); *E02F 3/3417* (2013.01); *E02F 3/422* (2013.01); *E02F 9/02* (2013.01); *E02F 9/08* (2013.01); *E02F 9/0866* (2013.01); *E02F 9/0891* (2013.01); *E02F 9/2004* (2013.01); *E02F 9/2037* (2013.01); *E02F 9/22* (2013.01); *E02F 9/2221* (2013.01);
(Continued)

(58) Field of Classification Search
None
See application file for complete search history.

(56) References Cited

U.S. PATENT DOCUMENTS 1,397,543 A * 11/1921 Peppin .................. E02F 3/30
414/694
6,415,532 B1 7/2002 Bricko et al.
(Continued)

FOREIGN PATENT DOCUMENTS

KR 10-1997-0032575 U 7/1997

OTHER PUBLICATIONS

International Search Report and Written Opinion dated Nov. 27, 2020 for related PCT Patent Application No. PCT/US220/044088, 16 pages.
(Continued)

*Primary Examiner* — Ronald P Jarrett
(74) *Attorney, Agent, or Firm* — Hovey Williams LLP; Kameron D. Kelly

(57) ABSTRACT

A compact utility loader compact utility loader comprising a frame, and a loader arm configured to support an attachment. The compact utility loader additionally comprises a first link pivotably secured to the frame, a second link pivotably secured to the frame, and an actuator configured to raise and lower the loader arm. The actuator is not simultaneously secured to both the frame and the loader arm.

14 Claims, 36 Drawing Sheets

(51) Int. Cl.

| | | |
|---|---|---|
| *E02F 3/42* | (2006.01) | |
| *E02F 3/34* | (2006.01) | |
| *E02F 3/342* | (2006.01) | |
| *E02F 9/08* | (2006.01) | |
| *E02F 9/20* | (2006.01) | |
| *E02F 9/26* | (2006.01) | |
| *B62D 55/06* | (2006.01) | |
| *B62D 55/10* | (2006.01) | |
| *B62D 55/125* | (2006.01) | |
| *E02F 9/02* | (2006.01) | |
| *F16D 63/00* | (2006.01) | |
| *B60K 5/12* | (2006.01) | |
| *B62D 55/18* | (2006.01) | |

(52) U.S. Cl.
CPC .............. *E02F 9/2267* (2013.01); *E02F 9/26* (2013.01); *F16D 63/006* (2013.01); *E02F 9/2264* (2013.01)

(56) References Cited

U.S. PATENT DOCUMENTS

| | | | |
|---|---|---|---|
| 6,460,640 | B1 | 10/2002 | Keagle et al. |
| 6,499,934 | B1 | 12/2002 | Kaczmarski et al. |
| 6,550,562 | B2 * | 4/2003 | Brandt ................. E02F 9/2004 180/333 |
| 6,658,768 | B1 | 12/2003 | Bainter |
| 6,662,556 | B2 | 12/2003 | Bares et al. |
| 6,695,568 | B2 | 2/2004 | Bares et al. |
| 6,698,114 | B2 | 3/2004 | Bares et al. |
| 6,708,430 | B2 | 3/2004 | Azure et al. |
| 6,709,223 | B2 | 3/2004 | Walto et al. |
| 6,729,050 | B2 | 5/2004 | Whitten et al. |
| 6,785,596 | B2 | 8/2004 | Brandt et al. |
| 6,807,809 | B2 | 10/2004 | Schuh |
| 6,830,111 | B2 | 12/2004 | Page |
| 6,832,659 | B1 | 12/2004 | Bares et al. |
| 6,851,916 | B2 | 2/2005 | Schmidt |
| 6,854,951 | B2 * | 2/2005 | Mimuro ................. E02F 3/308 414/685 |
| 6,860,707 | B2 | 3/2005 | Roan et al. |
| 6,866,466 | B2 | 3/2005 | Roan et al. |
| 6,902,016 | B2 | 6/2005 | Bares et al. |
| 6,931,771 | B1 | 8/2005 | Liebl |
| 6,948,265 | B2 | 9/2005 | Unzicker et al. |
| D516,587 | S | 3/2006 | Bares et al. |
| 7,059,434 | B2 | 6/2006 | Bares et al. |
| 7,142,967 | B2 | 11/2006 | Brandt et al. |
| 7,226,137 | B2 | 6/2007 | Fornes |
| 7,229,140 | B2 | 6/2007 | Page et al. |
| 7,296,862 | B2 | 11/2007 | Albright et al. |
| D563,438 | S | 3/2008 | Bares et al. |
| 7,494,314 | B2 | 2/2009 | Bares et al. |
| 7,496,441 | B2 | 2/2009 | Brandt et al. |
| 7,537,428 | B2 | 5/2009 | Hutchinson et al. |
| 7,549,500 | B2 | 6/2009 | Graham et al. |
| 7,552,785 | B2 | 6/2009 | Tuhy |
| 7,611,155 | B2 | 11/2009 | Bares |
| 7,621,366 | B2 | 11/2009 | Sewell et al. |
| 7,644,524 | B2 | 1/2010 | Azure et al. |
| 7,650,960 | B2 | 1/2010 | Bock |
| 7,762,013 | B2 | 7/2010 | Hartwick |
| 7,778,756 | B2 | 8/2010 | Hartwick et al. |
| 7,802,488 | B2 * | 9/2010 | Bucheton ................. B64C 25/30 74/89.23 |
| 7,805,864 | B2 | 10/2010 | Azure et al. |
| 7,815,000 | B2 | 10/2010 | Kisse et al. |
| 7,824,145 | B2 | 11/2010 | Kisse |
| 7,874,396 | B2 | 1/2011 | Sewell et al. |
| 7,890,235 | B2 | 2/2011 | Self et al. |
| 7,930,843 | B2 | 4/2011 | Hartwick |
| 7,975,787 | B2 | 7/2011 | Kisse et al. |
| 7,980,569 | B2 | 7/2011 | Azure et al. |
| 7,999,562 | B2 | 8/2011 | Khapochkin et al. |
| 8,015,733 | B2 | 9/2011 | Azure et al. |
| 8,016,065 | B2 | 9/2011 | Osborn et al. |
| 3,037,952 | A1 | 10/2011 | Bock |
| 3,042,290 | A1 | 10/2011 | Hartwick |
| 8,041,492 | B2 | 10/2011 | Young |
| 8,047,310 | B2 | 11/2011 | Kallevig |
| 8,047,311 | B2 | 11/2011 | Waletzko et al. |
| 8,047,760 | B2 | 11/2011 | Roan et al. |
| 8,079,605 | B2 | 12/2011 | Kallevig |
| 8,079,650 | B2 | 12/2011 | Tokach et al. |
| 8,091,355 | B2 | 1/2012 | St. Aubin et al. |
| 8,096,374 | B1 | 1/2012 | Papke et al. |
| 8,104,552 | B2 | 1/2012 | Papke et al. |
| 8,104,559 | B2 | 1/2012 | Kisse |
| 8,109,356 | B2 | 2/2012 | Brock et al. |
| 8,113,306 | B2 | 2/2012 | Mass et al. |
| 8,172,030 | B2 | 5/2012 | Sewell et al. |
| 8,205,361 | B2 | 6/2012 | Azure et al. |
| 8,240,783 | B2 | 8/2012 | Johnson et al. |
| 8,262,104 | B2 | 9/2012 | Kallevig et al. |
| 8,347,529 | B2 | 1/2013 | Berg et al. |
| 8,360,531 | B2 | 1/2013 | Gales |
| 8,371,048 | B2 | 2/2013 | Hartwick et al. |
| 8,375,605 | B2 | 2/2013 | Ruhl et al. |
| 8,430,188 | B2 | 4/2013 | Hansen |
| 8,444,367 | B2 | 5/2013 | Lougheed |
| 8,457,828 | B2 | 6/2013 | Self et al. |
| 8,485,287 | B2 | 7/2013 | Sewell |
| 8,522,843 | B2 | 9/2013 | Kappel et al. |
| 8,561,382 | B2 | 10/2013 | Gamble et al. |
| 8,732,992 | B2 | 5/2014 | Hartwick et al. |
| 8,783,308 | B2 | 7/2014 | Kappel et al. |
| 8,783,391 | B2 | 7/2014 | Porter et al. |
| 8,801,115 | B2 | 8/2014 | Hansen |
| 8,806,784 | B2 | 8/2014 | Ruhl et al. |
| 8,827,013 | B2 | 9/2014 | Hansen |
| 8,868,301 | B2 | 10/2014 | Self et al. |
| 9,017,005 | B2 | 4/2015 | Martin et al. |
| 9,079,614 | B2 | 7/2015 | Hansen |
| 9,180,910 | B2 | 11/2015 | Hansen |
| 9,211,808 | B2 | 12/2015 | Young |
| 9,222,239 | B2 | 12/2015 | Hartwick |
| 9,241,437 | B2 | 1/2016 | Bryant et al. |
| 9,288,939 | B2 | 3/2016 | Porter et al. |
| 9,291,105 | B2 | 3/2016 | Kaldor et al. |
| 9,321,386 | B1 | 4/2016 | Thomas et al. |
| 9,334,627 | B2 | 5/2016 | Self et al. |
| 9,382,925 | B2 | 7/2016 | Lacher et al. |
| 9,462,738 | B2 | 10/2016 | Bryant et al. |
| 9,462,759 | B2 | 10/2016 | Knipp |
| D771,152 | S | 11/2016 | Rush |
| 9,586,635 | B2 | 3/2017 | Sewell |
| 9,591,796 | B2 | 3/2017 | Bryant et al. |
| 9,695,573 | B2 | 7/2017 | Sewell et al. |
| 9,739,034 | B2 | 8/2017 | Sewell et al. |
| 9,752,301 | B2 | 9/2017 | Ruhl et al. |
| D803,273 | S | 11/2017 | Sewell |
| 9,894,848 | B2 | 2/2018 | Weinberg et al. |
| 9,970,176 | B2 | 5/2018 | Azure et al. |
| 9,975,750 | B2 | 5/2018 | Thomas et al. |
| 10,017,216 | B2 | 7/2018 | Hansen |
| 10,039,239 | B2 | 8/2018 | Brand et al. |
| 10,059,389 | B2 | 8/2018 | Sewell |
| 10,086,382 | B2 | 10/2018 | Harthoorn et al. |
| 10,099,733 | B1 | 10/2018 | Sewell |
| 10,100,579 | B2 | 10/2018 | Campbell et al. |
| 10,113,656 | B2 | 10/2018 | Tokach et al. |
| 10,114,404 | B2 | 10/2018 | Kukuk et al. |
| 10,117,388 | B2 | 11/2018 | Azure |
| 10,119,246 | B2 | 11/2018 | Sewell et al. |
| 10,151,080 | B2 | 12/2018 | Sewell |
| 10,161,106 | B2 | 12/2018 | Benteman |
| 10,202,266 | B2 | 2/2019 | Thomas et al. |
| 10,221,540 | B2 | 3/2019 | Azure et al. |
| 10,231,389 | B2 | 3/2019 | Kappel et al. |
| 10,260,627 | B2 | 4/2019 | Lacher |
| 10,292,341 | B2 | 5/2019 | Knipp et al. |
| 10,302,027 | B2 | 5/2019 | Hansen et al. |
| 10,316,487 | B2 | 6/2019 | Breuer |

(56) References Cited

U.S. PATENT DOCUMENTS

| | | |
|---|---|---|
| 10,337,168 B2 | 7/2019 | Sewell |
| 10,344,453 B2 | 7/2019 | Binstock et al. |
| 10,378,179 B2 | 8/2019 | Ruhl et al. |
| 10,422,107 B2 | 9/2019 | Sewell et al. |
| 10,435,092 B2 | 10/2019 | Stellman |
| 2003/0070859 A1 | 4/2003 | Dahl et al. |
| 2003/0108414 A1 | 6/2003 | Walto et al. |
| 2004/0145134 A1 | 7/2004 | Bares |
| 2005/0036876 A1 | 2/2005 | Walto |
| 2006/0053926 A1 | 3/2006 | Cooper et al. |
| 2007/0017713 A1 | 1/2007 | Sewell et al. |
| 2009/0077836 A1 | 3/2009 | Azure et al. |
| 2010/0168933 A1 | 7/2010 | Rorabaugh |
| 2011/0091307 A1 | 4/2011 | Yasuda et al. |
| 2015/0060707 A1* | 3/2015 | Baasch ............. F15B 15/149 251/59 |
| 2015/0373930 A1 | 12/2015 | Knipp et al. |
| 2016/0122970 A1 | 5/2016 | Kukuk et al. |
| 2017/0026716 A1 | 1/2017 | Nagorski et al. |
| 2017/0037599 A1 | 2/2017 | Binstock et al. |
| 2017/0183844 A1 | 6/2017 | Vanderford et al. |
| 2017/0226716 A1 | 8/2017 | Breuer |
| 2018/0105217 A1 | 4/2018 | Stellman |
| 2018/0127950 A1 | 5/2018 | Kukuk |
| 2018/0168115 A1 | 6/2018 | Weinberg et al. |
| 2018/0215425 A1 | 8/2018 | Roske et al. |
| 2019/0031256 A1 | 1/2019 | Sewell |

OTHER PUBLICATIONS

YouTube video uploaded on Jun. 20, 2017; BC Diesel Generators; Ramrod Pro Series-3300; Screenshot at 0:35 showing Arm; https:www.youtube.com/watch?v=KzVkdHAVOpA.†

* cited by examiner
† cited by third party

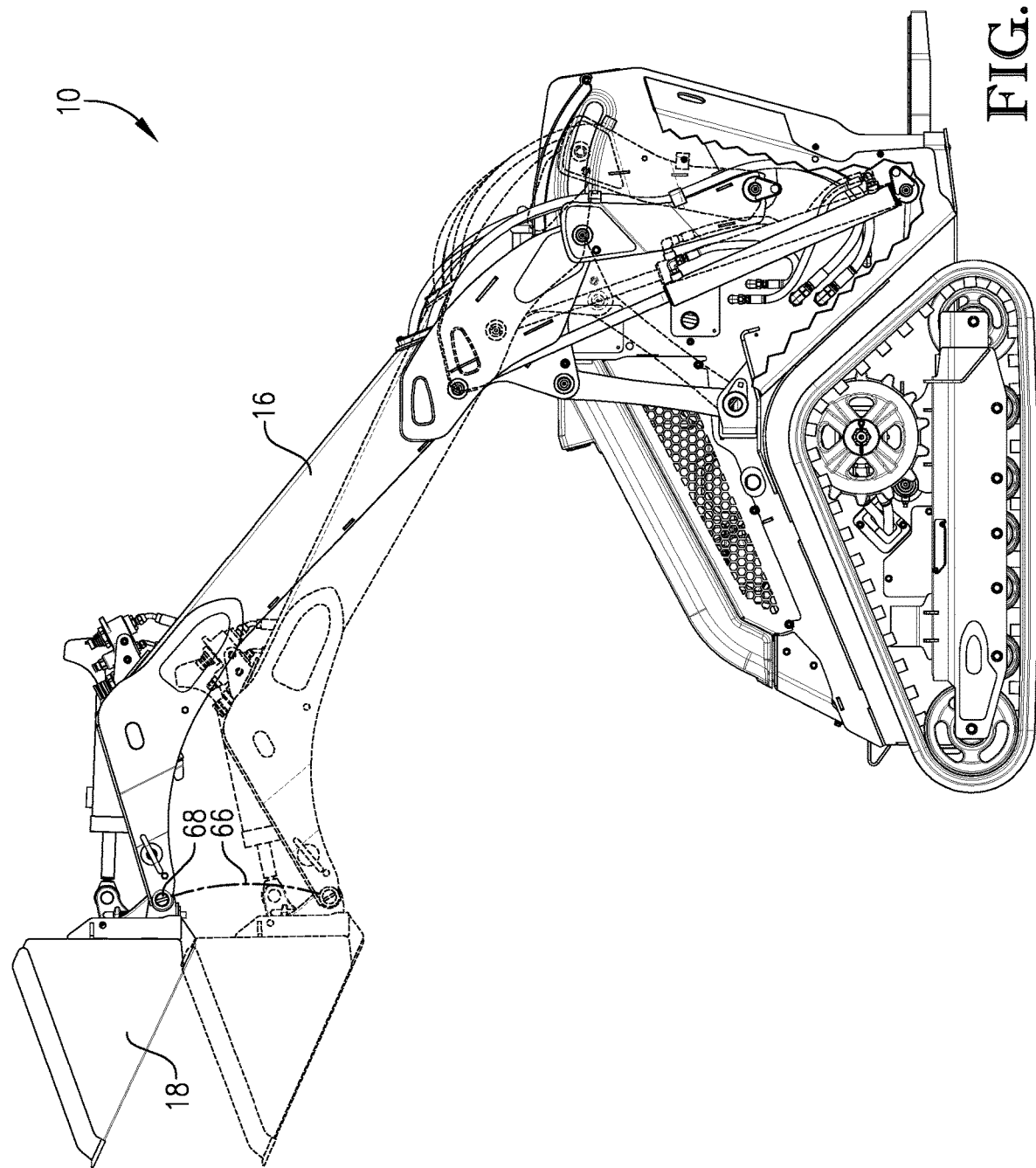

VERTICAL LIFT LOADER ARMS FOR COMPACT UTILITY LOADER

RELATED APPLICATIONS

The present non-provisional patent application claims priority benefit to prior-filed U.S. Provisional Patent Application Ser. No. 62/879,796, filed on Jul. 29, 2019, and entitled "COMPACT UTILITY LOADER"; and U.S. Provisional Patent Application Ser. No. 62/984,476, filed on Mar. 3, 2020, and entitled "COMPACT UTILITY LOADER." The entirety of both above-identified prior-filed provisional patent applications is hereby incorporated by reference into the present non-provisional patent application.

FIELD OF THE INVENTION

Embodiments of the present invention are generally directed to utility loaders. More particularly, embodiments of the present invention are directed to compact utility loaders that can carry and operate a wide range of attachments while maintaining a reduced operating footprint.

BACKGROUND OF THE INVENTION

There are many utility loaders on the market today. Such utility loaders are generally used as hydraulic tool carriers configured to operate a variety of hydraulically-driven tools or attachments. Common attachments include augers, trenchers, grapples, etc. Other non-hydraulic attachments may also be carried by utility loaders, such as buckets, rakes, etc.

Unfortunately, currently-available utility loaders are commonly manufactured in large sizes (e.g., having large widths and lengths), which can make the loaders difficult to maneuver and operate. There are some versions of compact utility loaders that are formed with reduced widths and/or lengths; however, such compact utility loaders are generally manufactured with narrow tracks, which reduces maneuverability and can be problematic for load distribution onto the ground. For instance, the use of narrow tracks on utility loaders can cause ruts to be formed in soft ground. As such, there is a need for a compact utility loader having a small, reduced width but that includes large, oversized tracks, so as to provide for improved maneuverability and load distribution. It would also be beneficial to provide compact utility loaders that include improved loader arm configurations and enhanced operator functionalities to improve the operational capabilities of the loader.

SUMMARY OF THE INVENTION

In one embodiment of the present invention, there is provided a compact utility loader comprising a frame including a lower portion and an upper portion. A width of the lower portion is smaller than a width of the upper portion. The compact utility loader additionally comprises a first track and a second track, with each track being positioned on a side of the frame. Each of the tracks has a width of at least "7.5" inches, and the compact utility loader has an overall width of no more than "36" inches.

Additional embodiments of the present invention include a compact utility loader comprising a frame, an engine, a pair of loader arms, and an attachment secured to ends of the loader arms. The compact utility loader additionally includes a first track or wheel and a second track or wheel positioned on either side of the frame. The compact utility loader additionally comprises a control interface including a graphic display configured to present operational information to an operator. The graphic display is configured to present a login screen prompting the operator for a passcode. The engine is prevented from being started until a valid passcode is entered via the control interface.

Additionally, embodiments of the present invention include a compact utility loader comprising a frame, a first track and a second track positioned on either side of the frame, and a pair of loader arms. The loader arms are configured to couple with an attachment via a hitch plate and a hitch pin. The compact utility loader is configured such that as the loader arms are raised and lowered, the hitch pin follows a path approximately defined by a curve $f(x) = 4.641e^{0.34x}$. The value "x" represents a horizontal direction and the function f(x) represents a vertical direction.

Additionally, embodiments of the present invention include a compact utility loader comprising a frame and a loader arm configured in a vertical-lift configuration. The compact utility loader additionally comprises a link pivotably secured to the loader arm and to the frame, and an actuator pivotably secured to the loader arm and to the frame. The compact utility loader further comprises a track assembly configured to maintain the loader arm in direct attachment to the frame.

Additionally, embodiments of the present invention include a compact utility loader comprising a frame, and a pair of loader arms supported by the frame. The frame includes a right side, a left side, and a bottom side extending between the right side and the left side. The compact utility loader additionally includes an engine mount secured to the bottom side of the frame and spaced apart from each of the left side and the right side of the frame. The compact utility loader further comprises an engine supported on the engine mount.

Additionally, embodiments of the present invention include a compact utility loader comprising a frame, and a loader arm configured to support an attachment. The compact utility loader additionally comprises a first link pivotably secured to the frame, a second link pivotably secured to the frame, and an actuator configured to raise and lower the loader arm. The actuator is not simultaneously secured to both the frame and the loader arm.

Additional embodiments of the present invention include a compact utility loader comprising a frame, an engine, a pair of loader arms, and an attachment secured to ends of the loader arms. The compact utility loader additionally includes a first track or wheel and a second track or wheel positioned on either side of the frame. The compact utility loader additionally comprises a control interface including a keyless start mechanism configured to start said engine without requiring a physical key.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 15b is another side elevation view of the compact utility loader from FIG. 14b, particularly illustrating a continuing path traveled by the loader arms when shifting between a lowered position and a raised position;

Figure 1:
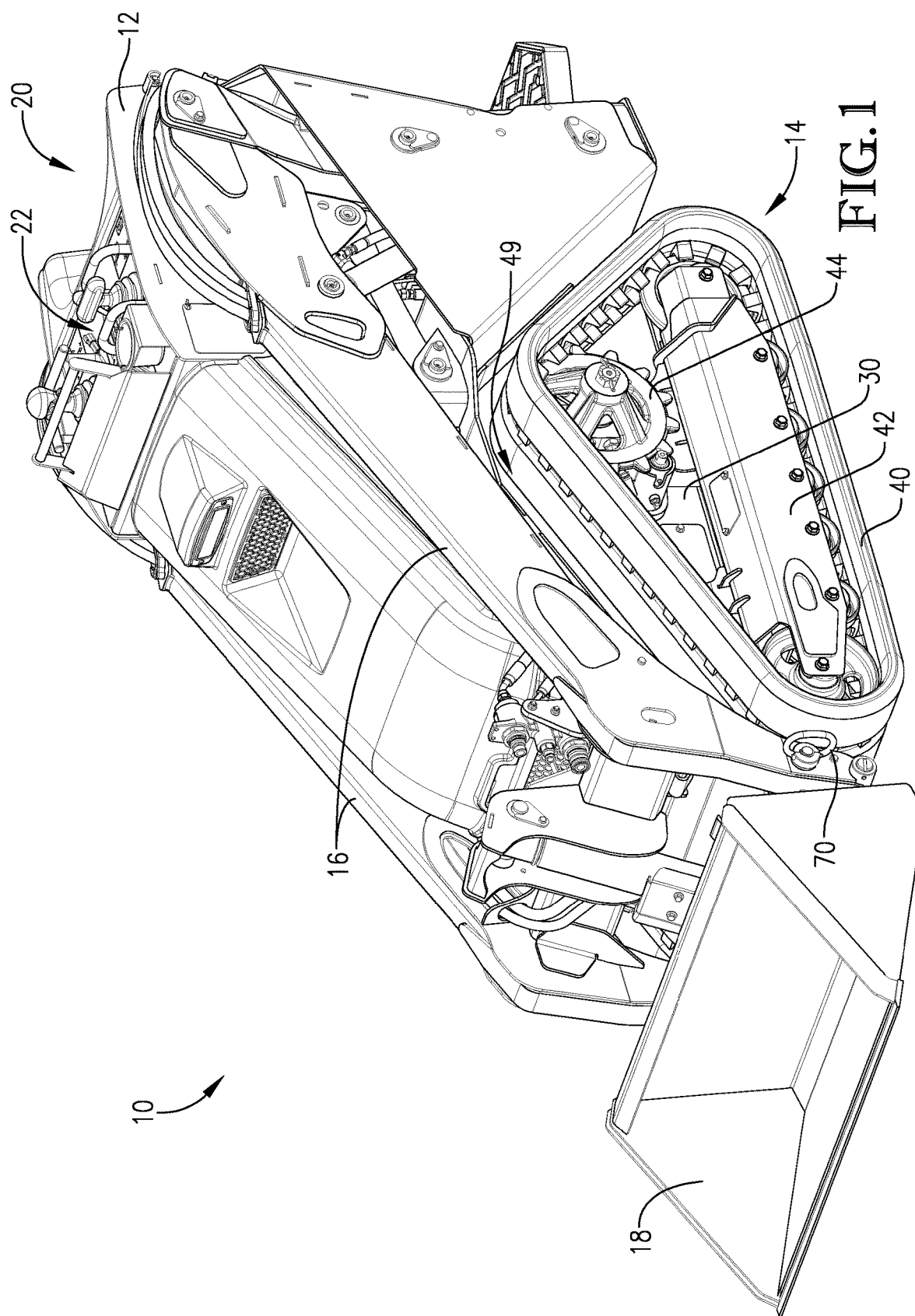
FIG. 1 is a front perspective view of a compact utility loader according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

General

Embodiments of the present invention are directed to a utility loader 10 (the "loader 10"), as illustrated in exemplary FIGS. 1-5. Broadly, the loader 10 may comprise a frame 12 supported on the ground by a drive assembly 14. As will be discussed in more detail below, in addition to supporting the loader 10 on the ground, the drive assembly 14 is configured to propel the loader 10 over the ground. The loader 10 may additionally comprise a pair of vertically-shiftable loader arms 16 supported by the frame 12. The loader arms 16 are configured to support various types of attachments 18 for performing various types of work, as required by an operator of the loader 10. The loader 10 may include a control station 20 positioned at a rear of the frame 12. The control station 20 may include a control panel 22 (See FIGS. 1, 4, and 5) with a plurality of control elements (e.g., buttons, switches, levers, joysticks, etc.) to permit the operator to control operation of the loader 10, as will be described in more detail below.

As used herein, directional terms are implemented from the perspective of an operator standing at the control station 20 (located at the rear of the loader 10) and facing the opposite end of the loader 10 (i.e., facing a front end of the loader 10. Thus, the terms "front" and "forward" mean a longitudinal direction towards the front end of the loader 10. It is noted that the attachment 18 is supported at the front end of the loader by connection to front ends of the loader arms 16. The terms "back," "rear", or "rearward" mean a longitudinal direction towards the back end of the loader 10 which includes the control station 20. The term "left" or "leftward" means a left lateral direction from the perspective of the operator standing at the control station 20 and facing forward, and the terms "right" or "rightward" means a right lateral direction from the perspective of the operator standing at the control station 20 and facing forward.

The loader 10 may comprise a "compact utility loader" or a "CUL." As used herein the term "compact utility loader" refers to a loader that is a self-propelled machine having an operating mass of less than about 3400 pounds and having one or more loader arms configured to support various interchangeable, attachments that are operably connected with front ends of the loader arms. The attachments may be tools that have hydraulically-driven auxiliary functions, such as augers, grinders, tillers, rollers, trenchers, digger derrick, or the like. Alternatively, the attachments may comprise buckets, forks, or the like. Often, a compact utility loader will be operated by an operator standing on, or walking behind, a rear end of the loader. Compact utility loaders are different from standard loaders, such as skid-steer loaders, which are large and quite heavy. Generally, an operator of such a standard loader (e.g., a skid-steer loader) will operate the loader while seated in an operating compartment of the loader. Beneficially, because compact utility loaders have a smaller size and weight than standard loaders (e.g., a skid-steer loaders), compact utility loaders can be much more maneuverable and provide more efficient load/weight distribution than standard loaders.

Embodiments of the present invention are directed to a loader 10 with loader arms 16 having a "vertical-lift configuration." As used herein, the term "vertical-lift configuration" means a configuration of loader arms 16 in which the entirety of the loader arms shifts its position upward, downward, forward, and/or rearward with respect to the frame 12 of the loader 10 as the loader arms transition between lowered and raised positions. Such vertical-lift configured loader arms can beneficially raise an attachment (e.g., a bucket or other tool) along a substantially vertical path. A vertical-lift configuration is different from a "pivot-lift configuration" (also commonly referred to as a "radial lift configuration) in which the loader arms are secured to the frame via a fixed pivot point. As such the portion of the loader arms that are fixed to the frame via the pivot points do not shift its position upward, downward, forward, and/or rearward with respect to the frame (as is required for a vertical-lift configuration). In a pivot-lift configuration, the forward ends of the loader arms travel further away (in a forward direction) from the frame of the loader (and/or a center of gravity of the loader) while the loader arms are being moved between lowered and raised positions. The attachment (e.g., the bucket) being supported by the loader arms may be supporting a heavy load, such that the shifting the attachment too far away from the loader's center of gravity can cause the loader to tip forward, which can be dangerous to the operator, as well as the loader and its load. Another advantage of a vertical lift configuration over a pivot-lift configuration is when the loader arms are completely raised, the pivot-lift configuration brings its loads back toward the middle of the loader, thus, making it more difficult to dump (in the embodiments in which the attachment is a bucket) into a container or dump truck. A vertical-lift configuration has the advantage of more reach away from the loader when the loader arms are fully lifted.

Figure 6:
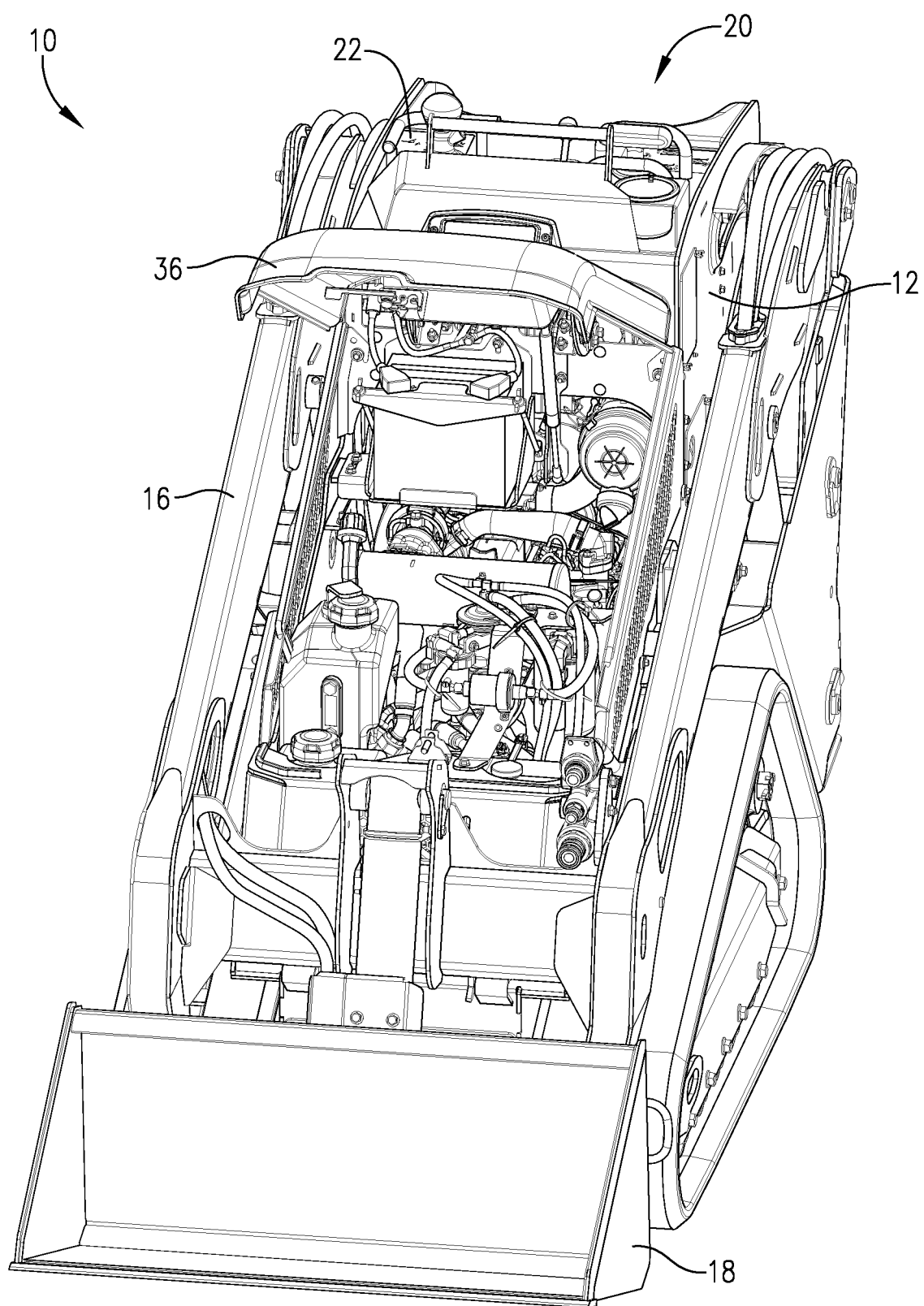
FIG. 6 is another front perspective view of the compact utility loader from FIGS. 1-5, with a hood being raised to show internal components of the compact utility loader.
Figure 7:
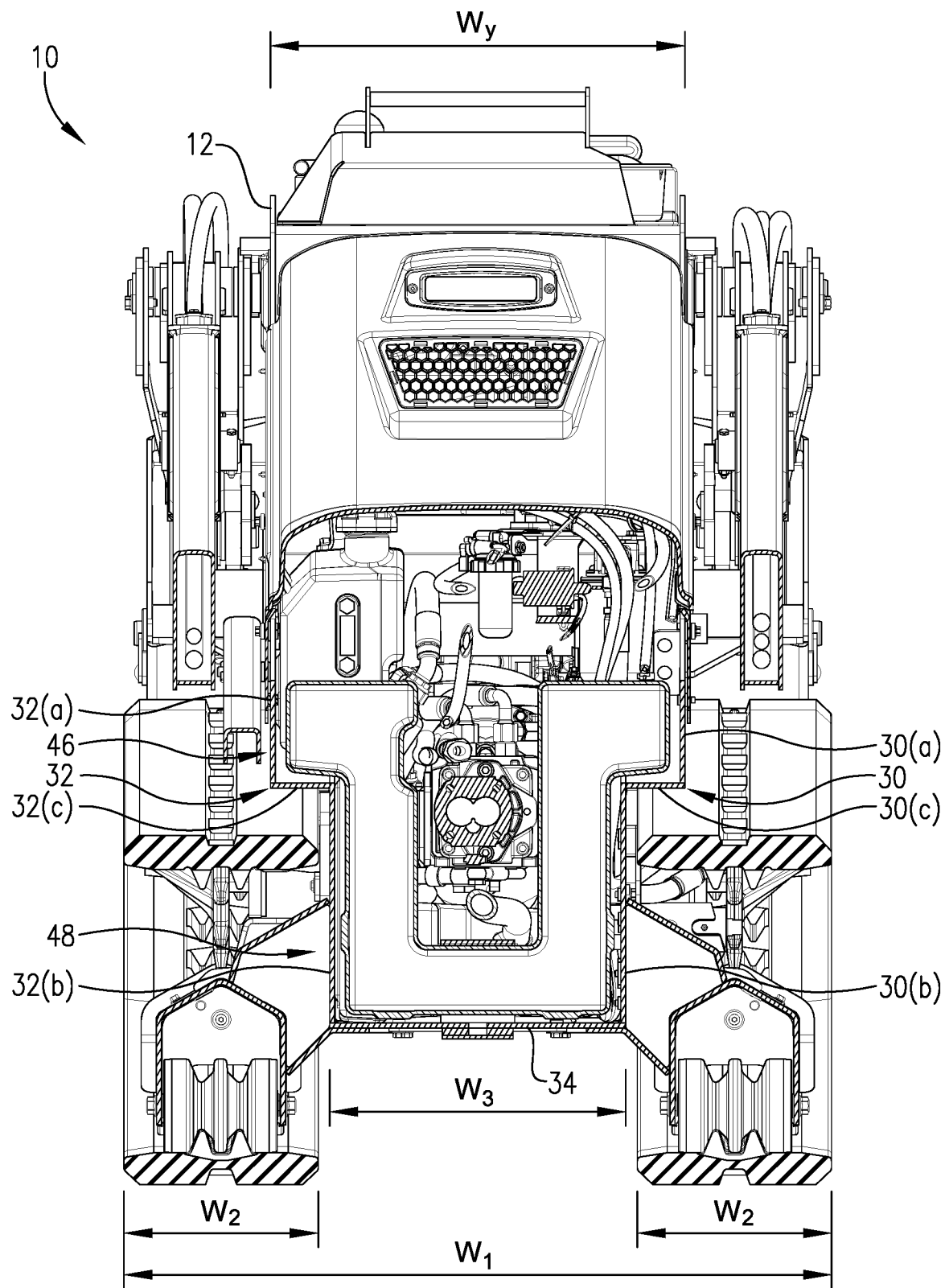
FIG. 7 is a cross-section of the compact utility loader taken along the line 7-7 from FIG. 5.
Figure 8:
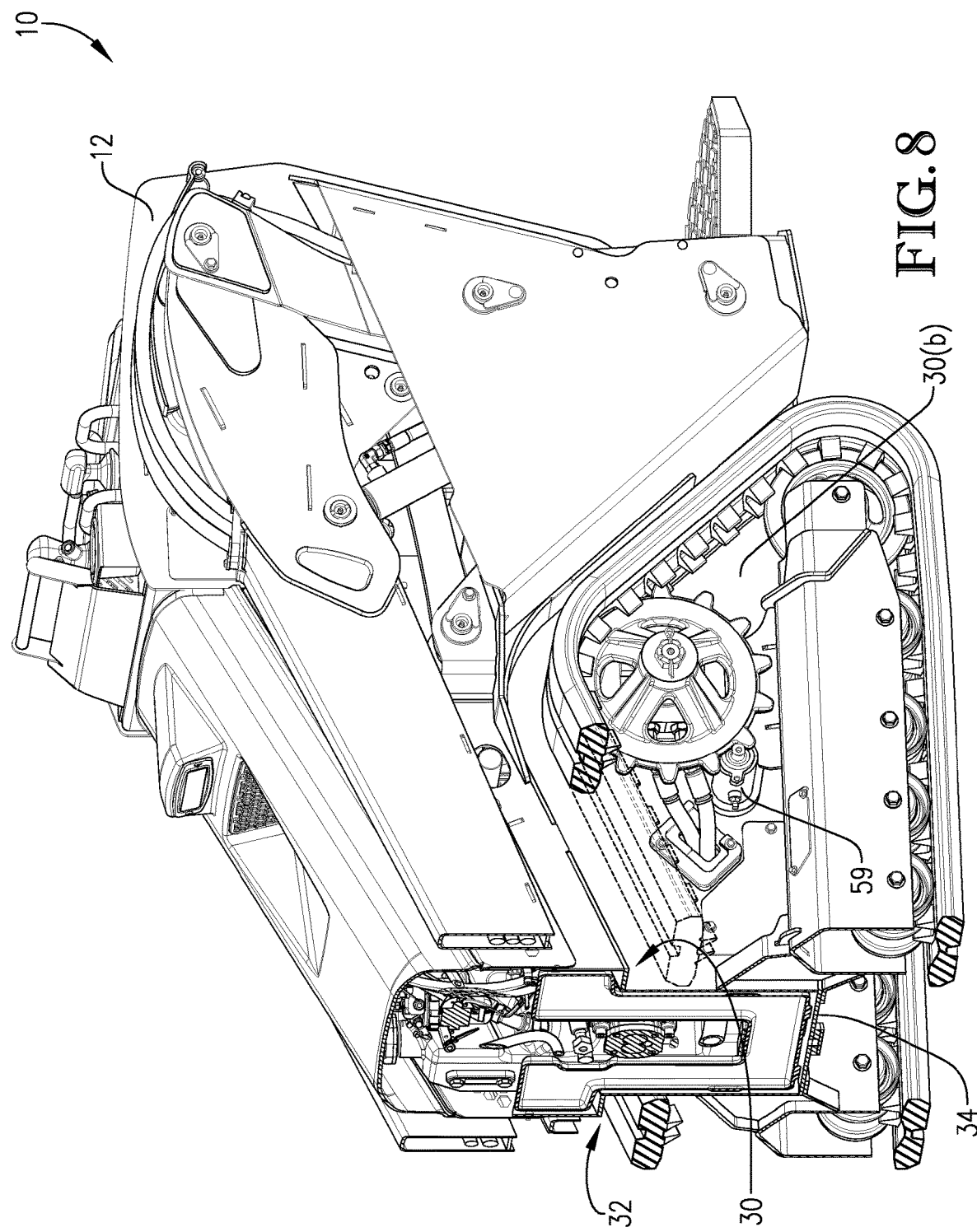
FIG. 8 is a perspective view of the cross-section from FIG. 7.
Figure 9:
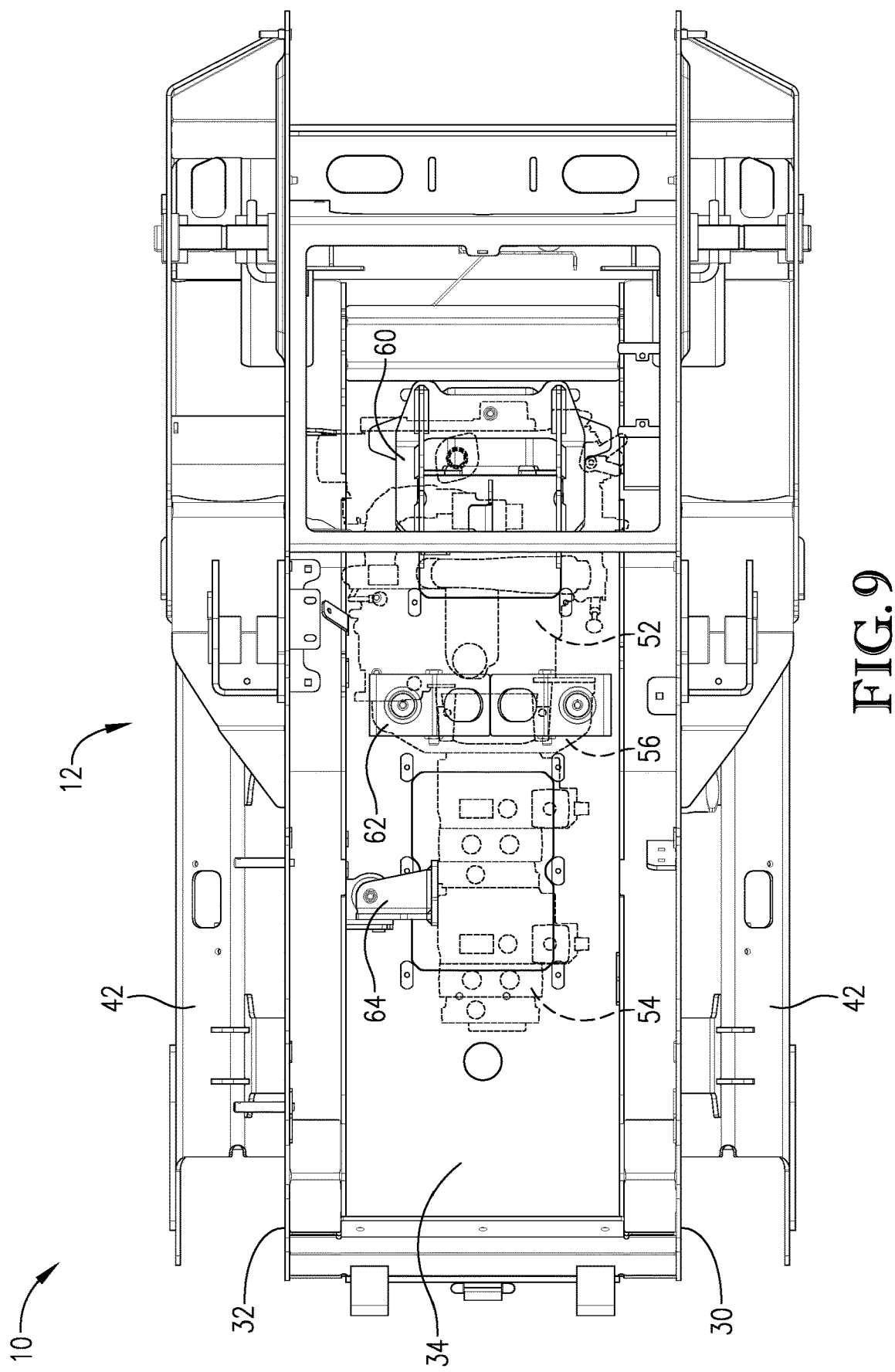
FIG. 9 is a top perspective view of a frame and certain internal components, such as an engine, a flywheel, and a pump, of the compact utility loader from FIGS. 1-6.

Returning to the loader 10 of embodiments of the present invention in more detail, and with reference to FIG. 6, the frame 12 may form a housing that defines an interior compartment within which various components of the loader 10 (e.g., engine, hydraulic system, etc.) are housed and supported, as will be discussed in more detail below. Turning to FIGS. 7-9, the frame 12 may comprise a left side 30 and a right side 32, which are connected together via a bottom side 34. As such, the frame 12 presents the interior compartment for supporting various components of the loader 10. Returning to FIGS. 3 and 6, a hood 36 may be hingedly connected a top of the frame 14 so as to enclose and present a covering for the components supported with the interior compartment of the frame 12 of the loader 10. The hood 36 may be formed from plastic, fiberglass, or other similar material. As shown in FIG. 6, the hood can be raised (See FIG. 6) so as to provide access to the components supported with the interior compartment of the frame 12 of the loader 10 so as to facilitate efficient service and maintenance of the loader 10.

Figure 2:
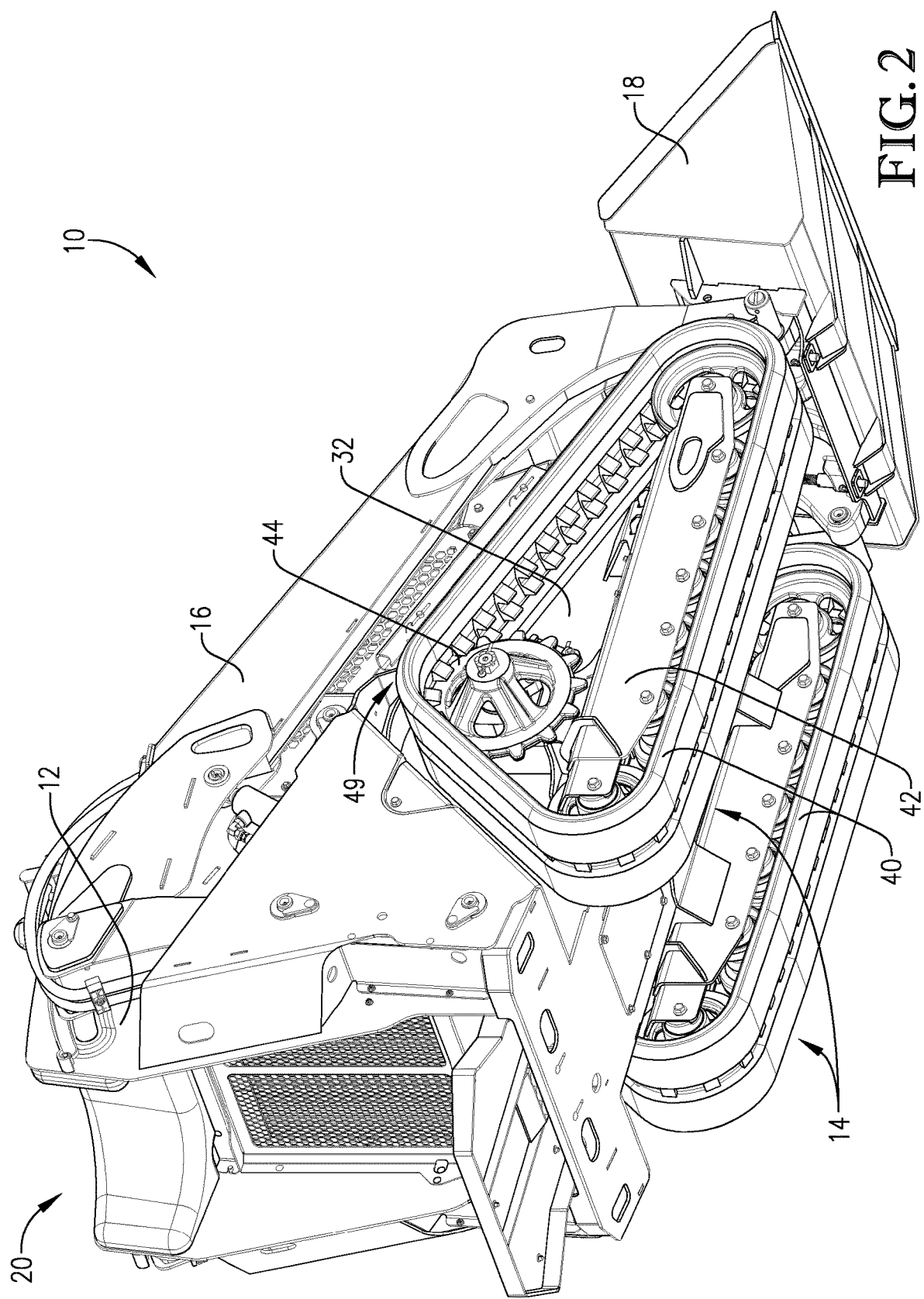
FIG. 2 is a rear perspective view of the compact utility loader from FIG. 1.
Figure 3:
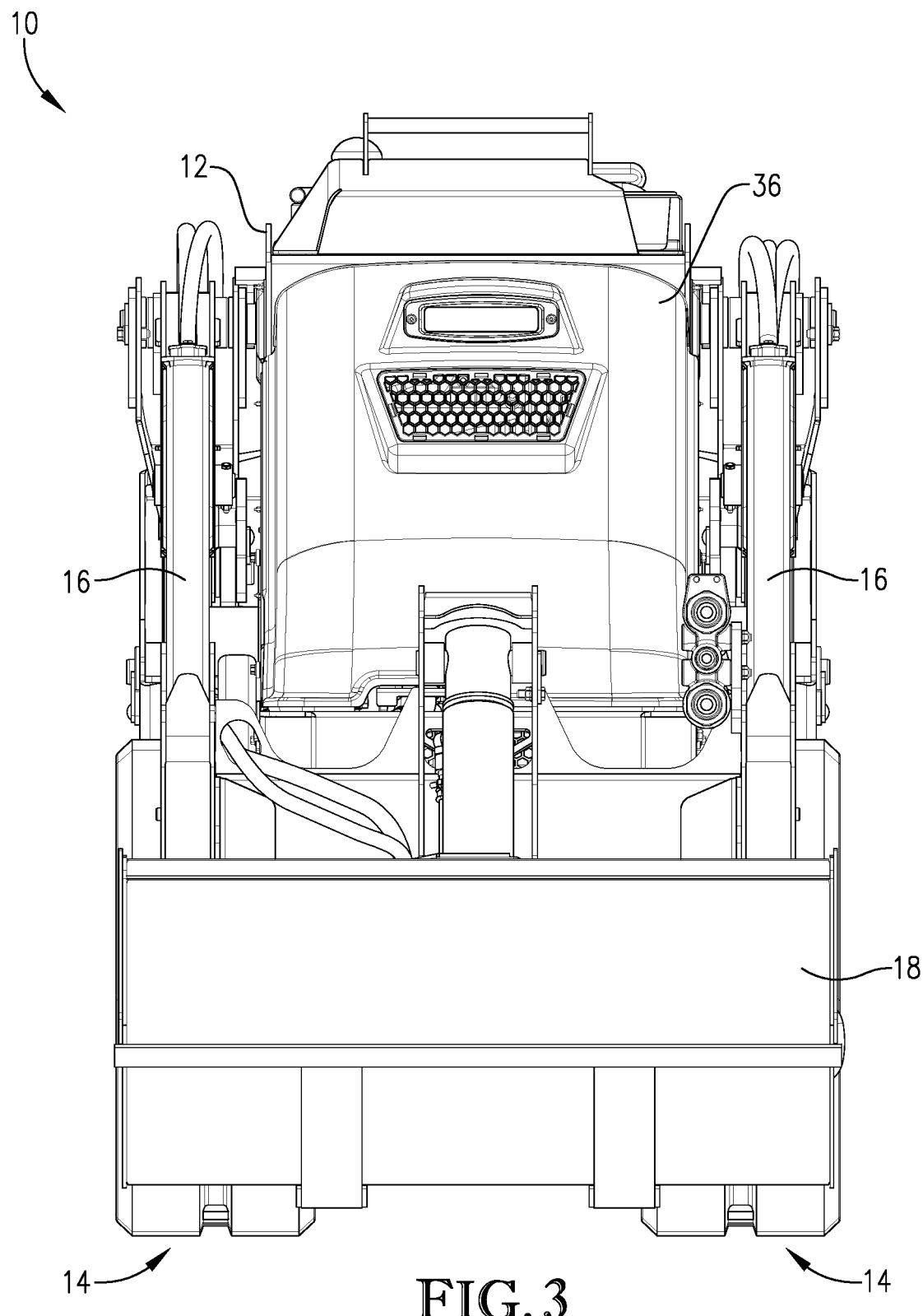
FIG. 3 is a front elevation view of the compact utility loader from FIGS. 1 and 2.
Figure 4:
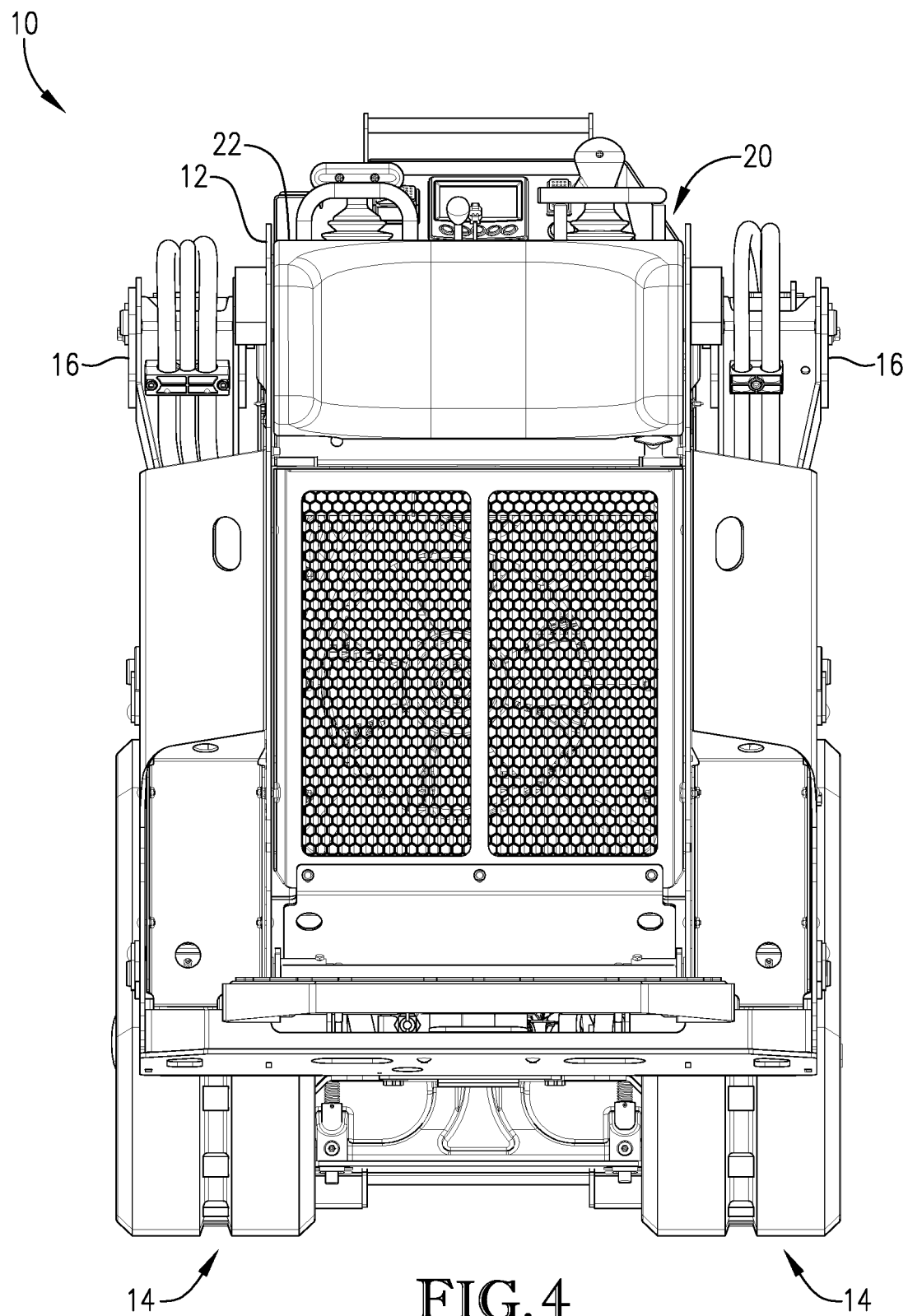
FIG. 4 is a rear elevation view of the compact utility loader from FIGS. 1-3.
Figure 5:
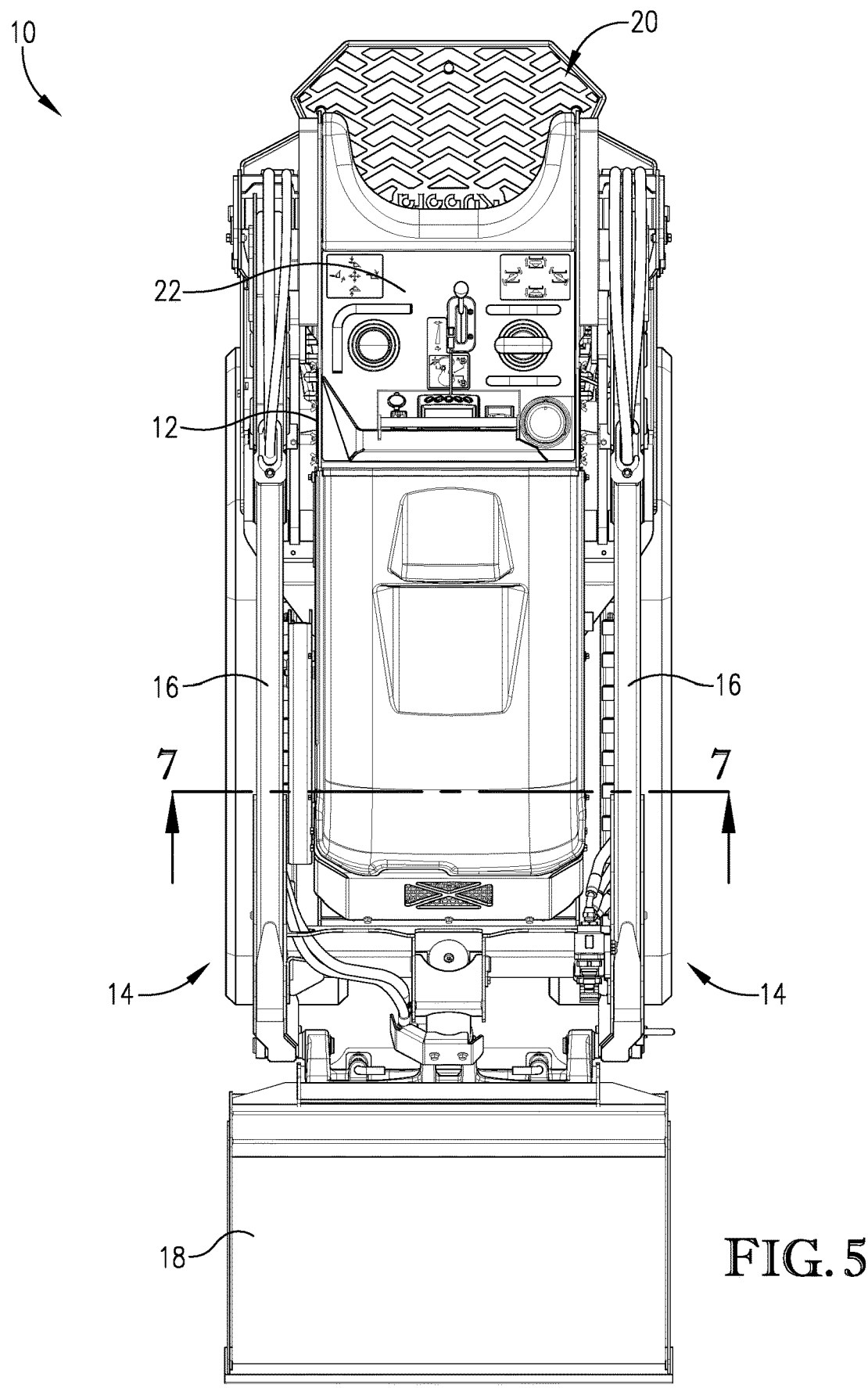
FIG. 5 is a top plan view of the compact utility loader from FIGS. 1-4.

With reference to FIGS. 1 and 2, the drive assembly 14 of the loader may comprise a pair of endless tracks 40 that extend from either exterior side of the frame 12. In more detail, the drive assembly 14 may comprise a pair of track frames 42, with each track frame 42 being rigidly secured to one exterior side of the frame 12 of the loader 10. As perhaps best shown in FIG. 9 the left side track frame 42 may be rigidly secured (e.g., via welding) to the left side 30 of the frame 12, so as to extend laterally away from the frame 12. Similarly, the right side track frame 42 may be rigidly secured (e.g., via welding) to the right side 32 of the frame 12, so as to extend laterally away from the frame 12. One of the tracks 40 may loop around each of the track frames 42 so as to present a left track 42 and a right track 40. As shown in FIGS. 1 and 2, the track frames 42 may include one or more wheels (e.g., idler wheels, bogey wheels, etc.) rotatably secured thereto, so as to permit the tracks 40 to rotate around the track frames 42. The tracks 40 may be formed from rubber, metal, or combinations thereof. Although the loader 10 is illustrated as having tracks 40, in some embodiments, the loader 10 may include one or more wheels on each side 30, 32 of the frame 12 to support and to propel the loader 10.

To facilitate rotation of the tracks 42, the drive assembly 14 may additionally comprise a pair of drive sprockets 44 positioned on either exterior side of the frame 12 of the loader 10, as shown in FIGS. 1 and 2. Specifically, in some embodiments, a left side drive sprocket 44 may extend from the left side 30 of the frame at a position above the left side track frame 42. Similarly, a right side drive sprocket 44 may extend from the right side 32 of the frame 12 at a position above the left side track frame 42. Each of the tracks 40 may be looped around both of the associated track frame 42 and drive sprocket 44. As such, the tracks 40 may be configured in a triangular shape. As perhaps best shown in FIG. 8, an interior surface of the tracks 40 may be formed with nubs that engage with teeth of the drive sprockets 44, such that rotation of the drive sprockets 44 will cause a corresponding rotation of the tracks 40. As such, the loader 10 can be propelled by rotating the drive sprockets 44, which causes rotation of the tracks 40.

To assist in providing enhanced maneuverability and weight distribution of the loader 10, the loader 10 may be configured to have both a small, overall width (relative to other common, previously-used loaders) but large or oversized tracks 40. In more detail, and with reference to FIG. 7, the loader 10 may have an overall, lateral width W1 (i.e., extending from the lateral-most point on each side of the loader 10) that is no more than 44 inches, no more than 42 inches, no more than 40 inches, no more than 38 inches, no more than 36 inches, no more than 34 inches, no more than 32 inches, no more than 30 inches, or no more than 28 inches. In addition, the loader 10 may include tracks 40 that each have a width W2 of at 7.5 inches, least 8 inches, at least 9 inches, at least 10 inches, at least 11 inches, or at least 12 inches. In some embodiments, a ratio of the track width W2 to the overall width W1 of the loader 10 may be at least 1:4, at least 5:18, at least 1:3, at least 7:18, or at least 4:9. Such a configuration (i.e., a loader 10 having a narrow overall width W1 and tracks 40 having a large width W2) permits the loader 10 to be highly maneuverable, while maintaining preferred load/weight distribution onto the ground. As such, the loader 10 can successfully maneuver in tight spaces (e.g., through lawn gates) and over various types of terrain (e.g., soft or muddy ground) without causing ruts while carrying different types of attachments (e.g., a hydraulically-driven attachment or a bucket) to perform various types of operations. In certain embodiments, the use of such large, oversized tracks 40 will allow the loader 10 to exert a pressure of no more than 3.7 pounds per square inch (psi), no more than 3.8 psi, no more than 3.9 psi, no more than 4.0 psi, or no more than 4.1 psi onto the ground. Such pressure is exerted on the ground even in embodiments in which the loader 10 weighs between 3000 and 3400 pounds, between 3100 and 3300 pounds, or about 3200 pounds.

Returning to the frame 12, the loader 10 is configured to have (i) a generally narrow overall width W1 (e.g., about 36 inches wide), and (ii) a pair of generally large, oversized tracks 10 (e.g., each about 10 inches wide), in part, due to the frame 12 (or at least a portion thereof) being shaped in the form of the letter "T." As illustrated in FIG. 7, a cross-section of the loader 10 illustrates how the frame 12 is formed in a "T" shape. In more detail, the frame 12 may broadly comprise an upper portion 46 and a lower portion 48. Specifically, the left side 30 of the frame 12 may comprise an upper panel 30(a) and a lower panel 30(b), which are connected by a lateral panel 30(c). Similarly, the right side 32 of the frame 12 may comprise an upper panel 32(a) and a lower panel 32(b), which are connected by a lateral panel 32(c). The upper panels 30(a), 32(a) may form the upper portion 46 of the frame 12, while the lower panels 30(b), 32(b) may form the lower portions 48 of the frame 12. The bottom side 34 of the frame 12 may also form part of the lower portion 48 of the frame 12. To provide the frame 12 with the T-shape, the lower portion 48 of the frame 12 may have a width W3 that is less than a width W4 of the upper portion 46. In some specific embodiments, the width W3 may be between 11 and 19 inches, between 13 and 17 inches, or about 15 inches, while the width W4 may be about between 17 and 25 inches, between 19 and 23 inches, or about 21 inches. As such, in some embodiments, a ratio between the width W3 and W4 will be between 3:5 and 4:5, between 3:5 and 13:15, or about 7:10 (or about 2:3, or about 11:15, or about 4:5).

Given the differences in width between the lower portion 48 and the upper portion 46 of the frame 12, the frame 12 may present track wells 49, as perhaps shown in FIGS. 1 and 2, configured to receive at least a portion of the tracks 40 of the loader 10. The track wells 49 may be defined by the space below the lateral panels 30(c), 32(c) and to the exterior side of the lower panels 30(b), 32(b). In more detail, and returning to FIG. 7, and as was described previously, the loader 10 may include a track frame 42 extending from each lateral side of the lower portion 46 the frame 12. Specifically, the track frames 42 may be secured to (e.g., via welding) and extend laterally away from the lower panels 30(b), 32(b) of the loader 10 frame 12. As was described above, each track frame 42 is configured to support a large, oversized track 40. As such, the tracks 40 will be positioned within the wells 49, at least partly underneath the upper portions 46 of the frame 12. Such a configuration permits the use of large, oversized tracks 40 while allowing loader 10 to have a small overall width W1.

In certain embodiments, the frame 12 of the loader 10 may have a front-to-back length (excluding the attachment 18) of between 60 and 100 inches, between 70 and 90 inches, or about 85 inches. The frame 12 of the loader 10 may have a top-to-bottom height (as measured with the loader arms 16 in the down position) of between 40 and 70 inches, between 50 and 60 inches, or about 55 inches. In some embodiments, the loader 10 will be configured with a ground clearance (as measured from the ground to the bottom side 34 of the frame of between 6 and 10 inches, between 7 and 9 inches, or about 7.5 inches.

Some embodiments of the present invention are further configured to provide the loader 10 with a small overall width W1 and large, oversized tracks 40 by providing for the sprockets 44 to be formed in a conical shape. In more detail, with reference to FIG. 8 (such conical shape is also illustrated in FIGS. 1 and 2), the sprockets 44 may have a circular base about which a plurality of teeth are circumferentially spaced. Generally, the base of each sprocket 44 will be positioned adjacent to the respective side 30, 32 of the frame 10. A rotational axis of each sprocket 44 will generally extend through a center of the circular base of the sprocket 44. From the base, the sprockets 44 each extend laterally outward while narrowing to a hub so as to provide the sprocket 44 with the conical shape. In some embodiments, the sprockets 44 will extend from the base to the hub via a plurality of circumferentially spaced spokes. The rotational axis of each sprocket 44 will generally extend through a center of the hub of the sprocket 44. In view of the above description, the sprockets 44 will have a conical shape with a radius (i.e., a distance from the rotational axis to an outer edge of the base) or a diameter of the base being larger than a radius (i.e., a distance from the rotational axis to an outer edge of the hub) or a diameter of the hub. Thus, the diameter of the sprockets 44 becomes larger as the sprockets extend from outboard to inboard when positioned on the loader 10.

Figure 10:
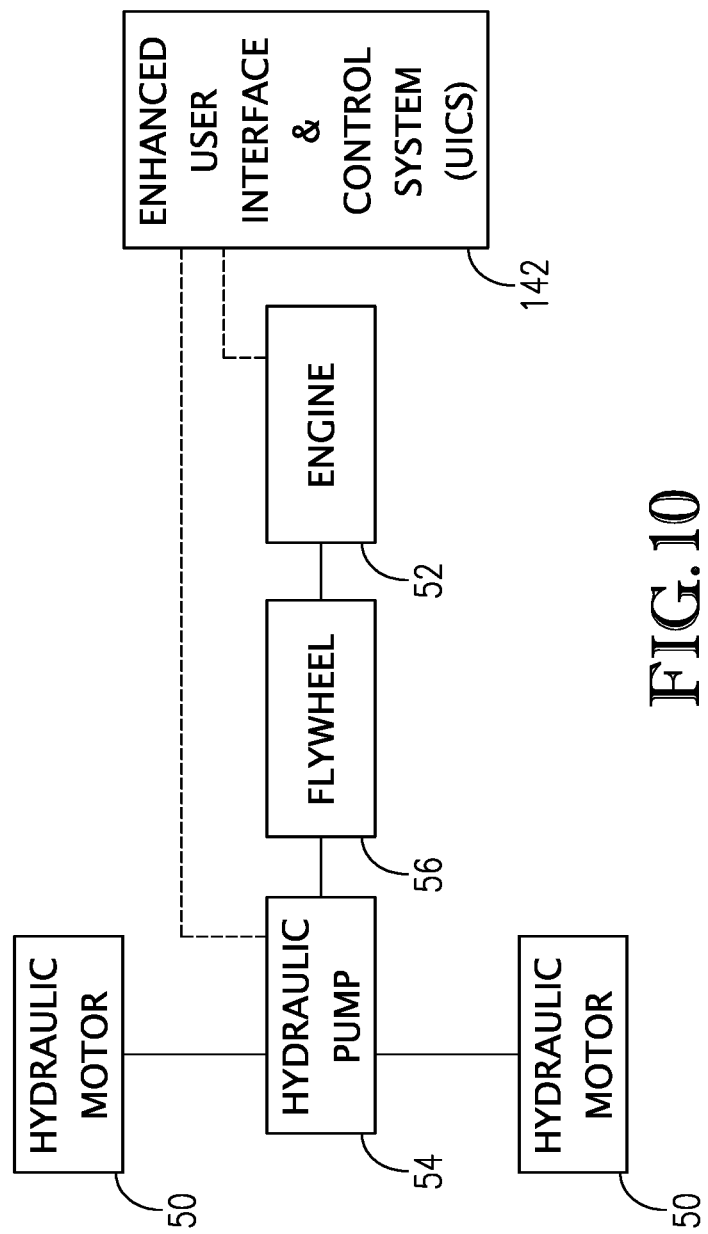
FIG. 10 is a schematic illustration of a powertrain of the compact utility loader from FIGS. 1-6.
Figure 11:
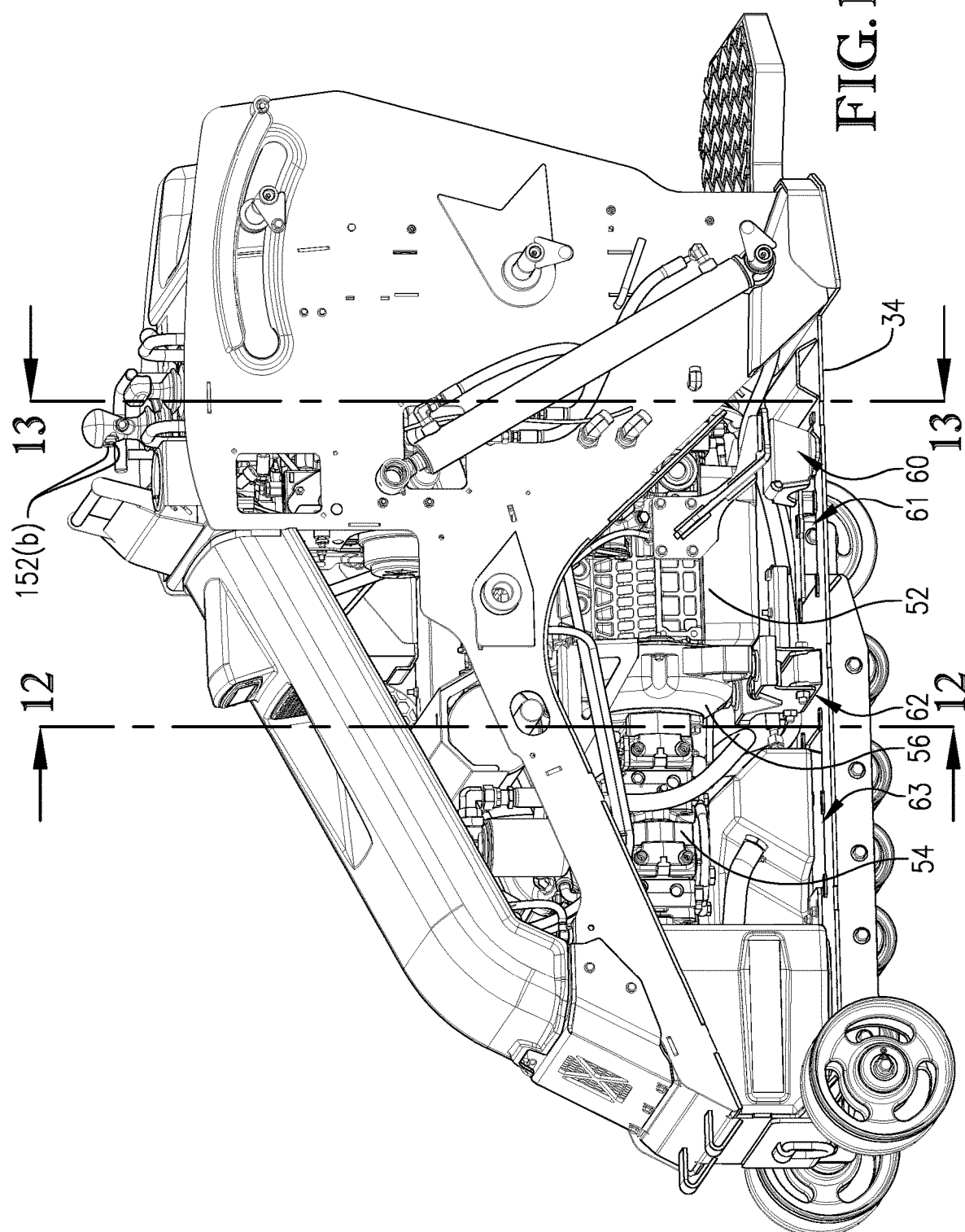
FIG. 11 is a side perspective view of the compact utility loader from FIGS. 1-6, particularly illustrating internal components of the compact utility loader.
Figure 12:
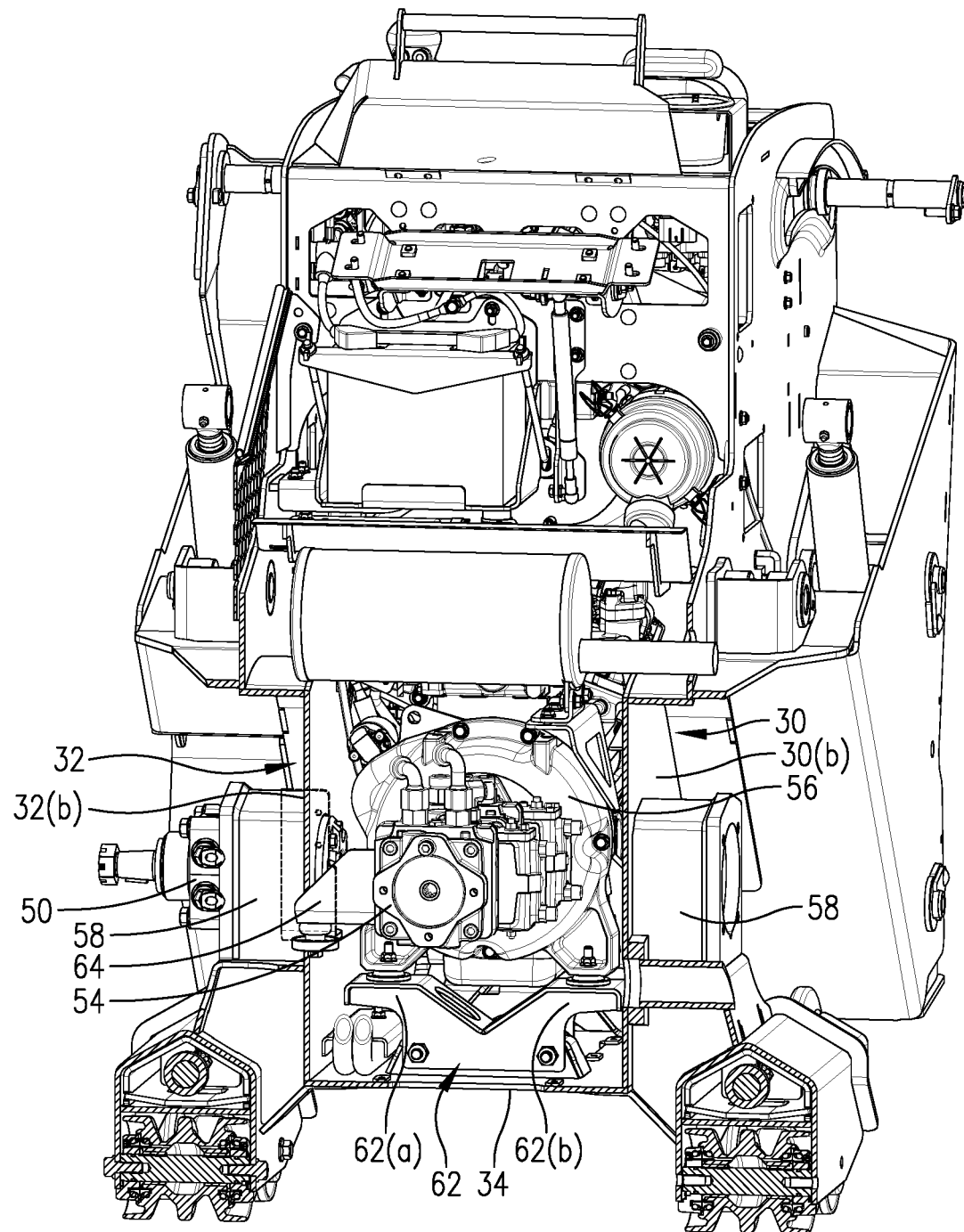
FIG. 12 is a cross-section of the compact utility loader taken along the line 12-12 from FIG. 11.

As noted above, the conical shape of the sprockets 44 assists in allowing the loader 10 to have a generally small overall width W1, yet large, oversized tracks 40. Specifically, the loader 10 may include a pair of hydraulic motors 50 positioned on either side of the frame 12 (a schematic depiction of a powertrain of the loader 10 is shown in FIG. 10, with the powertrain including the motors 50, an engine 52, a hydraulic pump 54, and a flywheel 56). Portions of the powertrain are also illustrated within the loader 10 in FIGS. 9 and 11. In some embodiments, the motors 50 may be attached to an exterior side of the left and right sides 30, 32 of the frame 12. For instance, the motors 50 may be attached to the lower panels 30(*b*), 32(*b*) of the frame 12. In some specific embodiments, as illustrated in FIG. 12, the motors 50 may each be at least partially enclosed in a motor housing 58 that forms part of the left and right sides 30, 32 of the frame 12 (the left side motor 50 is not shown in FIG. 12, only the left side motors housing 58 is shown). Each of the motors 50 may include a driveshaft that extends laterally from the frame 12. An end of each driveshaft is configured to secure to the hub of an associated sprocket 44. As such, the motors 50 are configured to rotate their driveshafts and, thus, the sprockets 44. Because of the conical shape of the sprockets 44, the bases of the sprockets will be positioned inward away from the hub and towards the frame 12 of the loader 10. As noted previously, the teeth of the sprockets 44 are positioned on the base of the sprockets 44. Due to the conical shape of the sprockets 44, the teeth of the sprockets 44 can be positioned inward, closer to the sides 30, 32 of the frame 12. As was described previously, the teeth of the sprockets 44 engage with the nubs on the tracks 40 to cause the tracks 40 to actuate. Stated differently, the base of the sprockets 44 (which are the inboard-most portion of the sprockets 44) are the portions of the sprockets 44 that engage with their respective tracks 40. The nubs are generally positioned at a center of the tracks 40. As a result of the teeth being positioned closer to the sides 30, 32 of the frame 12, the tracks 40 can likewise be positioned closer to the sides 30, 32 of the frame 12. By allowing the tracks 40 to be positioned closer to the sides 30, 32 of the frame 12, the left and right side tracks 40 can be positioned closer together, such that the loader 10 can have a generally small overall width W1, yet use large, oversized tracks 40.

The loader 10 may additionally include a stop element 59, as illustrated in FIG. 8, which extends from one of the sides 30, 32 of the frame 12 and is configured to selectively engage with a sprocket 44 so as to prevent rotation of the sprocket 44 and, thus, to prevent rotation of the track 40. In some embodiments, the loader 10 will include a stop element 59 extending from each side 30, 32 of the frame, such that one of the stop elements 59 can engage with each of the left side sprocket 44 and the right side sprocket 44 so as to prevent actuation of both the left side and the right side track 40. The stop elements 59 may be hydraulically actuated from retracted positions, in which the stop elements 59 do not engage with the sprockets 44 (and, thus, do not prevent rotation of the sprockets 44), to an extended position where the stop elements are engaged with the sprockets by being positioned between adjacent teeth of the sprockets 44 (and, thus, restrict rotation of the sprockets 44). With the stop elements 59 engaged with the sprockets 44, the stop elements 59 may function as parking brakes or emergency brakes for the loader 10, so as to prevent the loader 10 from inadvertent or unwanted movement by inhibiting rotation of the sprockets 44 and/or actuation of the tracks 40.

An interior compartment presented by the frame 12 of the loader 10 is depicted in FIG. 9. The interior compartment is configured to receive, house, and support various components of the loader 10, such as the engine 52 and the hydraulic pump 54. In more detail, the engine 52 may be generally positioned towards a rear of the frame 12, within a rear portion of the interior compartment. Such rearward shifting of the engine 52 provides space for secondary, internal components of the loader 10 to be positioned within a front portion of the interior compartment. Such internal components include portions of a hydraulic system of the loader 10, such as a hydraulic pump 54, a hydraulic fluid reservoir, hydraulic lines, and the like. The secondary, internal components may additionally include a fuel tank, fuel lines, a hydraulic filter, a fuel filter, a water separator, and the like. Such internal components can be easily accessed by lifting the hood 36, which covers the internal components during operation, as is illustrated by FIG. 6.

The hydraulic pump 54 is also positioned within the interior compartment forward of the engine 52. In some embodiments, the flywheel 56 will be positioned between the engine 52 and the hydraulic pump 54. Regardless, the hydraulic pump 54 will generally be positioned between the hydraulic motors 50 (illustrated schematically in FIG. 10), such that the hydraulic pump 54 can provide hydraulic power to the motors 50 so as to drive the motors 50 (which themselves drive the conical sprockets 44 and, thus, the tracks 40). As such, the engine 52 will be positioned rearward of the hydraulic motors 50. In more detail, the engine 52 may be an internal combustion engine, such as a diesel engine, that generates power to be used by the hydraulic pump 54. As noted previously, the hydraulic pump 54 provides pressurized hydraulic fluid to the motors 50 to actuate the sprockets 44 and tracks 40. In some embodiments, the hydraulic pump 54 may include and/or may be associated with a hydrostatic transmission which provides hydraulic fluid to the motors 50 to drive the sprockets 44 and tracks 40. The flywheel 56 may be used to maintain a consistent power output from the motor during varying RPMs. In certain embodiments, the flywheel 56 may include a housing that houses the internal components of the flywheel 56.

Figure 13:
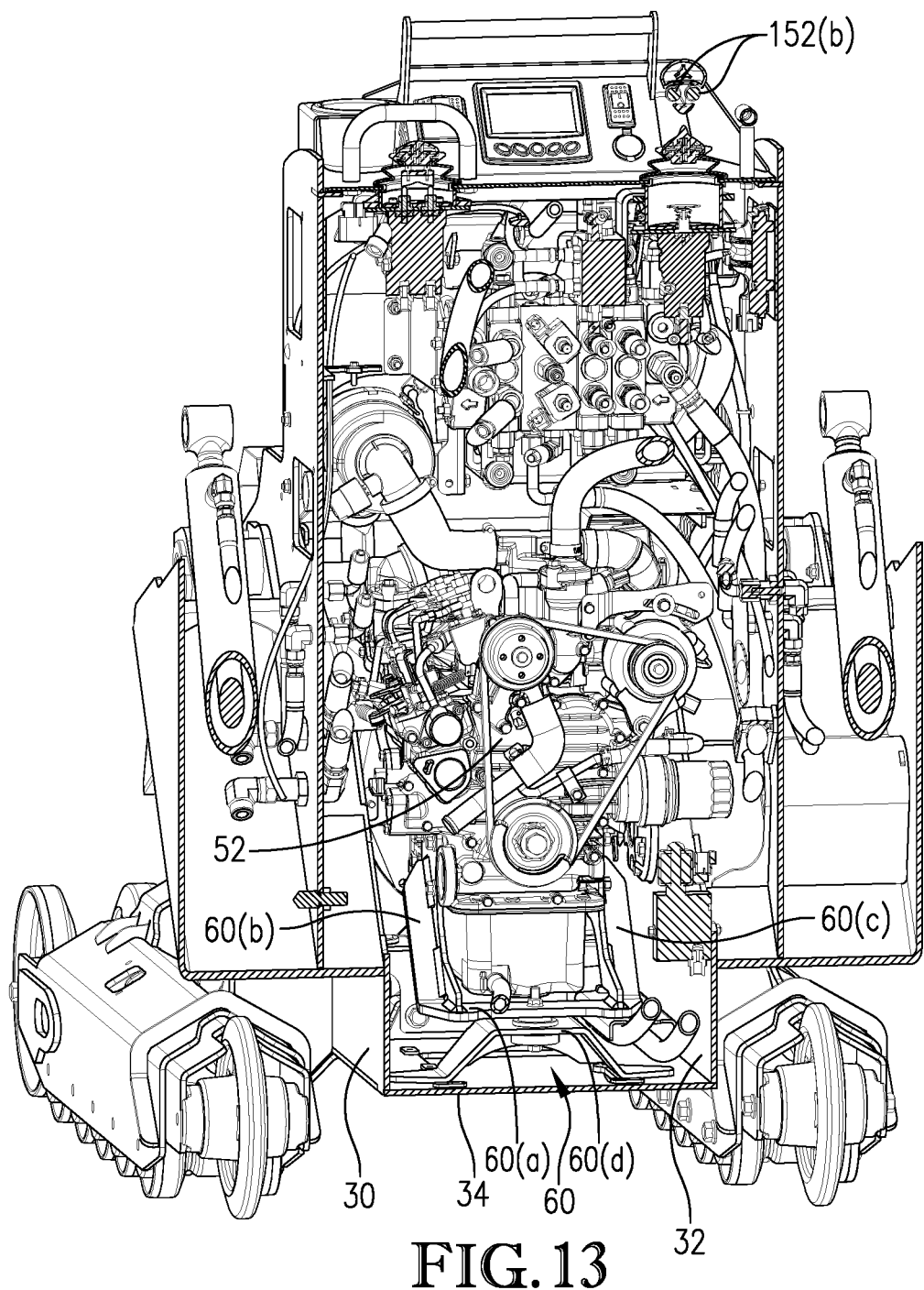
FIG. 13 is a cross-section of the compact utility loader taken along the line 13-13 from FIG. 11.

To support the engine 52 and the flywheel 56, embodiments of the present invention may include support brackets (illustrated in FIGS. 9 and 11-13) that beneficially do not contact the sides 30, 32 of the frame 12. In more detail, as shown in FIGS. 9, 11, and 13, the loader 10 may include an improved stabilized engine mount 60. The engine mount 60 is configured to secure the engine 52 to the frame 12 at points below the engine 52, instead of traditional methods that might secure the engine 52 at the side of the engine 52. In more detail, as perhaps best shown in FIGS. 11 and 13, the engine mount 60 is secured to the bottom side 34 of the frame 12, so as to secure the engine 52 to the bottom side 34 of the frame 12. As such, the engine 52 is free of attachment to either of the sides 30, 32 of the frame 12, as shown in the top plan view of FIG. 9. The engine 52 being free of attachment to the sides 30, 32 of the frame 12 increases the area around the engine 52 that an operator or repairman may reach to perform various repair, service, and/or maintenance tasks. Further, for removal of the engine 52 from the interior compartment, the engine 52 may be released from the engine mount 60 and/or the bottom side 34 of the frame 12 via an access port 61 formed in the bottom side 34 of the frame 12 forward of the engine mount 60 (See, e.g., FIG. 11). The access port 61 may have a rectangular shape and may generally be covered by a panel that can be removed (e.g., via release of fasteners) so as to provide access to the access port 61. Such release of the engine 52 from the engine mount 60 may be advantageously performed even before the full weight of the engine 52 is otherwise supported (e.g., by a lift, crane, or the like).

As was described above, and as illustrated in FIGS. 9, 11, and 13, the engine 52 is supported towards the rear of the loader 10 by the engine mount 60, which is supported on the bottom side 34 of the frame 12. As perhaps best illustrated in FIG. 13, the engine mount 60 may comprises a base element 60(a), a vertically extending left extension bracket 60(b), a vertically extending right extension bracket 60(c), and a frame attachment component 60(d). As such, the base element 60(a) extends laterally between the left and right extension brackets 60(b) and (c), which extend upward from the base element 60(a). Thus, in some embodiments, the engine mount 60 may be at least partially formed with a U-shape when viewed from the front or the back (see, e.g., FIG. 13). In some embodiments, the frame attachment component 60(d) will be secured to the bottom side 34 of the loader 10 frame 12 via welding or fasteners. However, in other embodiments, the frame attachment component 60(d) may be integrally formed with the bottom side 34 of the loader 10 frame 12, in which case the frame attachment component 60(d) may form part of the loader 10 frame 12 instead of the engine mount 60. The base segment 60(a) may be secured to the frame attachment component 60(d), such as via a fastener that is accessible from the access port 61 for efficient removal of the engine 52 (such as for service, repair, or replacement). If necessary, the engine mount 60 may also be removed from the frame 12 of the loader 10.

It should be appreciated that the engine mount 60 is physically separated from the sides 30, 32 of the frame 12, as illustrated in FIG. 9, so as to improve access to the engine 52 for maintenance and repairs thereof. Upper ends of the left extension bracket 60(b) and the right extension bracket 60(c) may be secured to the left and right sides of the engine 52, respectively, such as via fasteners (See, e.g., FIG. 11), so as to keep the engine 52 stable and structurally supported to the frame 12. Specifically, the engine 52 will generally be positioned between and secured to the left extension bracket 60(b) and the right extension bracket 60(c).

In addition, the loader 10 may include an improved stabilized flywheel mount 62, as illustrated in FIGS. 9, 11, and 12. The flywheel mount 62 is configured to secure the flywheel 56 to the frame 12 at points below the flywheel 56. Specifically, the flywheel mount 62 is configured to secure the housing of flywheel 56 to the frame 12. In more detail, the flywheel mount 62 is secured to the bottom side 34 of the frame 12, so as to secure the flywheel 56 (or the housing of the flywheel 56 more specifically) to the bottom side 34 of the frame 12. As such, the flywheel 56 and/or the housing of the flywheel 56 is free of attachment to the sides 30, 32 of the frame 12. The flywheel 56 and/or the housing of the flywheel 56 being free of attachment to the sides 30, 32 of the frame 12 increases the area around the flywheel 56 that an operator or repairman may reach to perform various service, repair, and maintenance tasks. Further, for removal of the flywheel 56 from the interior compartment, the flywheel 56 may be released from the flywheel mount 62 and/or the bottom side 34 of the frame 12 via the access port 61 previously described, or a second access port 63 formed in the bottom side 34 of the frame 12 forward of the flywheel mount 62 (See, e.g., FIG. 11). The access port 63 may have a rectangular shape and may generally be covered by a panel that can be removed (e.g., via release of fasteners) so as to provide access to the access port 63. Such release of the flywheel 56 may be performed even before the full weight of the flywheel 56 is otherwise supported (e.g., by a lift, crane, or the like).

With respect to FIG. 12, the flywheel mount 62 is shown secured to both the bottom side 34 of the frame 12 and the flywheel 56 (or the housing of the flywheel 56 more specifically). The flywheel mount 62 is secured to the bottom side 34 of the frame 12 by two lower fasteners, which are secured to a protrusion that extends upward from the bottom 34 side of the frame 12. Such a protrusion is illustrated as a trapezoidal prism. The fasteners allow for the flywheel mount 62 to be released from the frame 12 if necessary.

The flywheel mount 62 may have a generally V-shape (when viewed from the front or back as shown in FIG. 12) and comprises a left protrusion 62(a) and a right protrusion 62(b), which are each secured to one of the respective downward protrusions of the flywheel 56 (or the housing of the flywheel 56 more specifically). An upper fastener is disposed between the flywheel 56 (or the housing of the flywheel 56 more specifically) and each of the left and right protrusions 62(a) and (b) of the flywheel mount 62. Such upper fasteners may be removed for removal of the flywheel 56 from the flywheel mount 62.

Remaining with FIGS. 9 and 11, the hydraulic pump 54 may be secured to the frame 12 via a pump bracket 64 that is directly connected to one of the sides 30, 32 of the frame 12. The pump bracket 64 may be used to brace the pump 54 to reduce vibrations or to otherwise stabilize the pump 54.

Shown in FIG. 9 are the engine mount 60 and the flywheel mount 62 being disposed within the internal compartment of the frame 12 defined by the left side 30, the right 32, and the bottom side 34. It should be appreciated that the engine mount 60 and the flywheel mount 62 are both physically separated from the sides 30, 32 of the frame 12, such that a gap exists between both the engine mount 60 and the flywheel mount 62 and the sides 30, 32 of the frame 12. Instead, the engine mount 60 and the flywheel mount 62 are both secured to the bottom side 34 of the frame 12. The engine mount 60 and the flywheel mount 62 both extend upwardly from the bottom side 34 of the frame 12 and are free of connection to the sides 30, 32 of the frame 12. The engine mount 60 and the flywheel mount 62 both secure to their respective components (i.e., the engine 52 and the flywheel 56) away from a geometric center of such components (i.e., connection is made to the sides of the components) so as to provide lateral stability while still enabling easy access to the sides of the engine 52 and flywheel 56, respectively. As such, and in summary, the engine 52 is positioned within a rearward portion of the interior compartment and is secured to the bottom side 34 of the frame 12 via the engine mount 60. A forward end of the engine 52 is secured to a rearward end of the flywheel 56 (and/or a rearward end of the housing that supports the components of flywheel 56), which is secured to the bottom side 34 of the frame 12 via the flywheel mount 62. A forward end of the flywheel 56 (and/or a forward end of the housing that supports the components of flywheel 56) is secured to a rearward end of the pump 54, which is secured to one of the sides 30, 32 of the frame 12 at a front end of the pump 54.

As shown above, the fasteners of the flywheel housing mount 62 and the engine mount 60 may be accessed from below the loader 10 for removal of the engine 52 and/or flywheel 56. Specifically, the two access ports 61, 63 are disposed in the bottom side 34 of the frame 12 to allow for access to the respective fasteners, as well as other components of the loader 10 (e.g., for access to and efficient removal of the pump 54).

Loader Arm Configuration

Figure 14A:
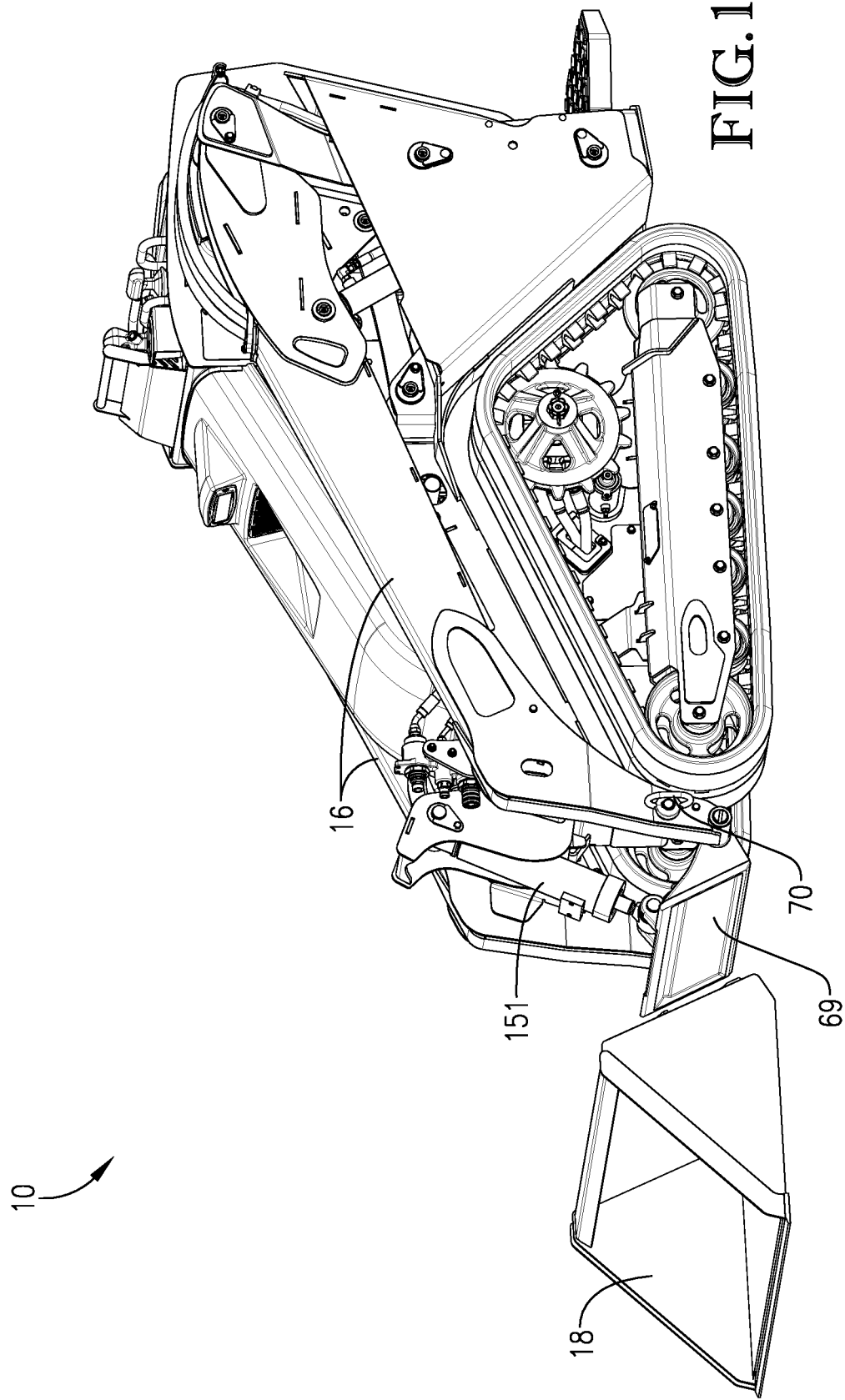
FIG. 14a is another perspective view of the compact utility loader from FIGS. 1-6, particularly illustrating an attachment in the form of a bucket being separated from loader arms of the compact utility loader.
Figure 14B:
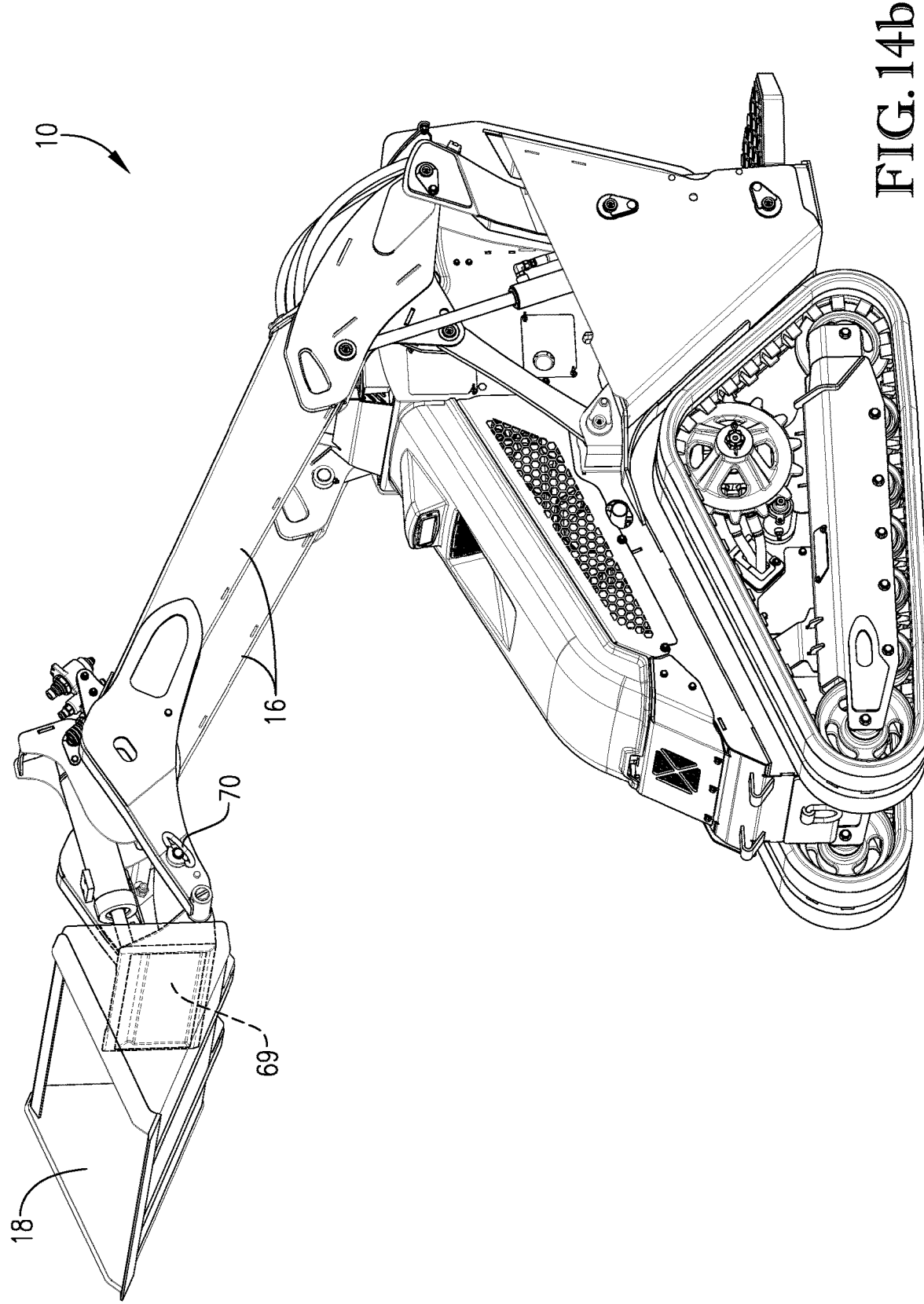
FIG. 14b is another perspective view of the compact utility loader from FIGS. 1-6, particularly illustrating the loader arms raising an attachment in the form of a bucket.

Embodiments of the present invention include improved, stabilized loader arms 16 for the loader 10, as illustrated in FIGS. 1, 2, and 14*a* (with the loader arms 16 in a lowered position) and FIG. 14*b* (with the loader arms 16 in a raised position). In more detail, and as will be discussed in more detail below, the loader arms 16 may be retained adjacent to and/or secured or attached directly to the frame 12. By being retained adjacent to and/or secured or attached directly to the frame 12, embodiments of the present invention inhibit lateral or yawing motion of the loader arms 16, such as when the loader arms 16 are loaded with a heavy or an uneven load or when the loader 10 is driving over uneven terrain. Although the loader arms 16, which are described in more detail below, are retained adjacent to and/or secured or attached directly to the frame 12, the loader arms 16 are nevertheless configured in a vertical-lift configuration. As such, the loader arms 16 provide the loader 10 with advantages of a vertical-lift configuration, such raising loads substantially vertically while keeping the loader arms 16 securely aligned with the frame 12 of the loader 10. Additional benefits of the loader arms 16 having the vertical-lift configuration include keeping loads longitudinally close to a center of gravity of the loader 10. Further, loads are generally prevented from being raised directly over the top of the loader 10, to minimize risks of loads striking the loader 10 or impacting the operator when being lifted. Such benefits are generally not provided by traditional, pivot-lift configured loader arms which actuate in a wide arcuate motion. Such arcuate motion often includes the attachment bringing the loads above the loader, which can pose a danger to the loader and/or to the operator.

Figure 15A:
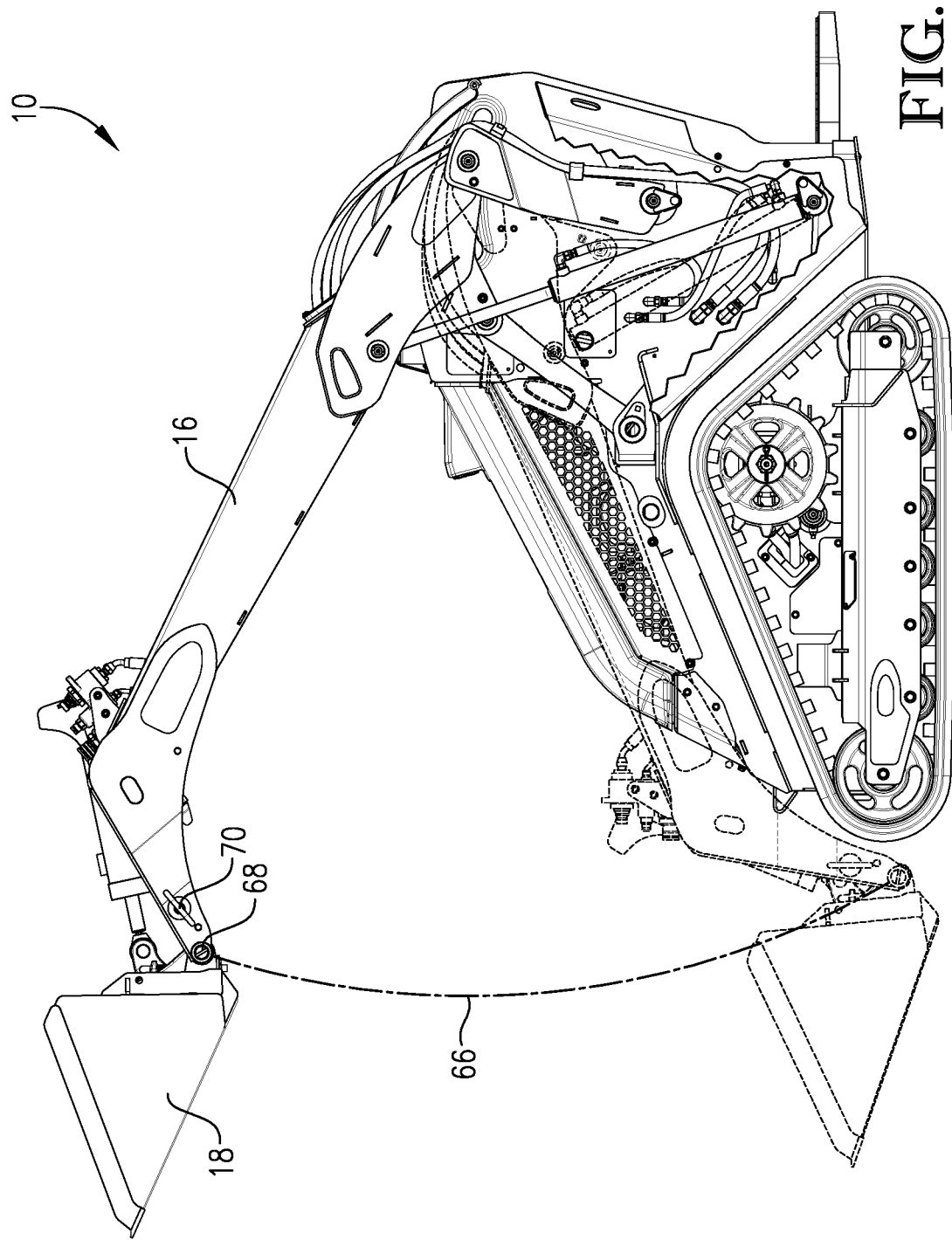
FIG. 15a is side elevation view of the compact utility loader from FIG. 14b, particularly illustrating a path traveled by the loader arms when shifting between a lowered position and a raised position.

In more detail, the loader arms 16 of the loader 10 are configured to operate with an extended reach and enhanced breakout strength. FIGS. 15*a* and 15*b* illustrate a travel path 66 made by front ends of the loader arms 16 (and/or of the attachment 18 supported by the loader arms 16) as the loader arms 16 transition between the lowered and raised positions. FIG. 15*a* shows an initial portion of the travel path 66 from the lowered position to an intermediate position, while FIG. 15*b* illustrates a secondary portion of the travel path 66 from the intermediate position to the raised position. In more detail, the travel path 66 may be defined as a path travelled by an attachment hitch pin 68 of the loader 10 (when viewing the loader 10 from a side elevation, see e.g., FIGS. 15*a* and 15*b*). In more detail, each of the loader arms 16 may include an attachment hitch pin 68 positioned at the front end of the respective loader arm 16. The attachment hitch pins 68 may be used to connect an attachment 18 to the loader arms 16. Specifically, as shown in FIGS. 14*a*-15*b*, the hitch pins 68 may secure a hitch plate 69 (e.g., a quick hitch assembly) to the loader arms 16, with the hitch plate 69 comprising a connection assembly configurable to secure attachments to the loader arms 16. The hitch plate 69 is generally configured to support one or more types of attachments 18 thereon.

Figure 16:
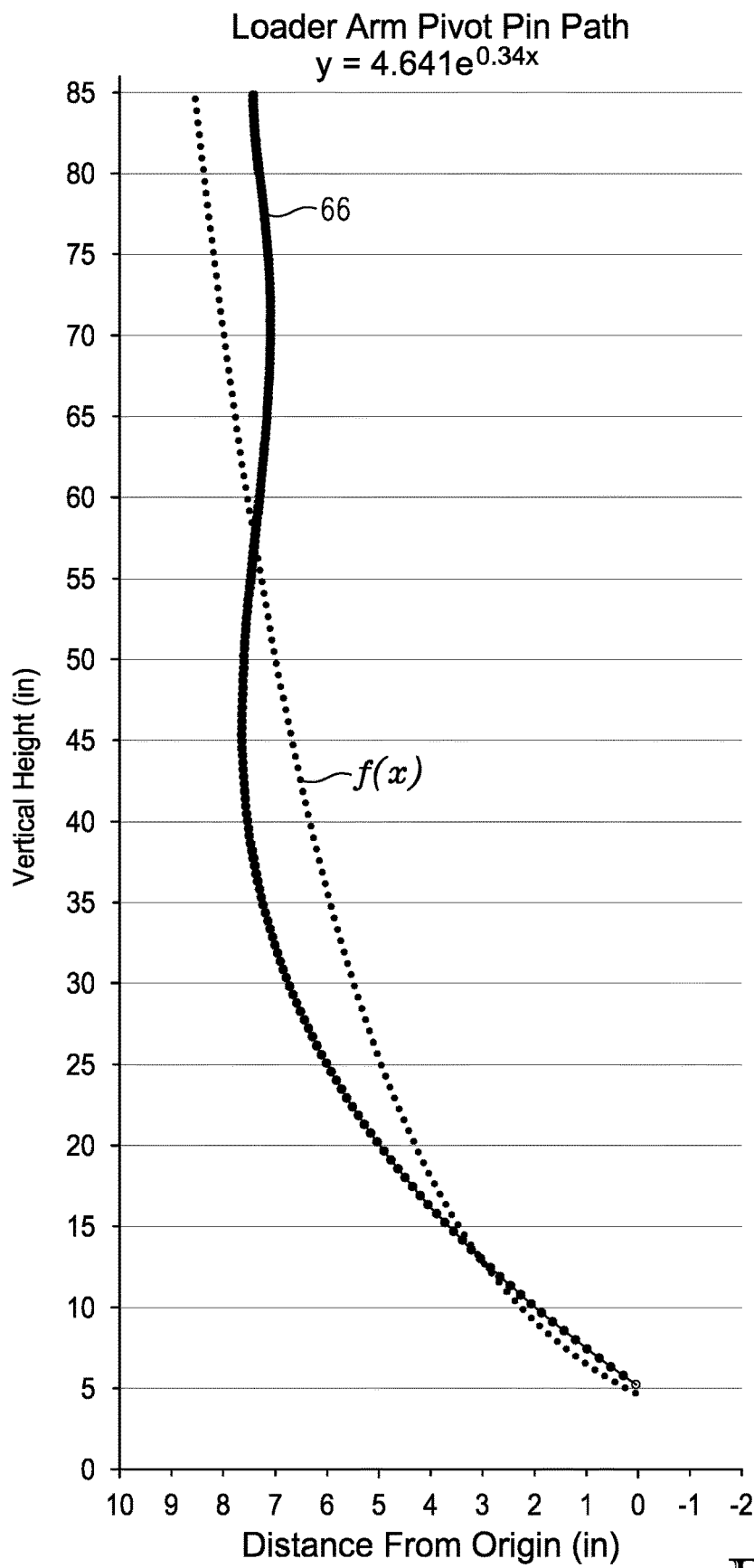
FIG. 16 is a graphical representation plotted to illustrate a path traveled by loader arms from the compact utility loader from FIGS. 1-6 when shifting between a lowered position and a raised position.

Turning to FIG. 16, the travel path 66 of the loader arms 16 is illustrated on a two-dimensional axis (i.e., an "x" "y" axis). As shown, the travel path 66 may approximate the function:

$$f(x)=4.641e^{0.34x}.$$

The horizontal direction (e.g., the forward/rearward direction) traveled by the loader arms 16 and/or the hitch pins 68 represents the "x" coordinate, while the vertical direction (e.g., the upward/downward direction) traveled by the loader arms 16 and/or the hitch pins 68 represents the "y" coordinate. Stated differently, for each "x" coordinate there is corresponding "y" coordinate, such that the set of "y" coordinates can be represented by the function "f(x)." When the loader arms 16 are completely lowered, the hitch pin 68 is positioned in a base position, where as illustrated in FIG. 16, the "x" coordinate equals 0 and f(x) equals 4.641 (i.e., the hitch pin 68 is positioned at 4.641 inches above the ground). Furthermore, a maximum vertical height of the loader arms 16 (as defined by the vertical height of the hitch pin 68 above the ground) may be at least 80 inches, at least 82 inches, at least 84 inches, at least 85 inches, at least 86 inches, at least 87 inches, or at least 88 inches. In some embodiments, the actual path 66 travelled by the loader arms 16 and/or the hitch pin 68 will deviate no more than 1.5, no more than 1.4, no more than 1.3, no more than 1.2, no more than 1.1, or no more than 1.0 inches in the horizontal direction (i.e., the "x" coordinate value) from the curve $f(x)=4.641e^{0.34x}$ for each "y" coordinate value. A maximum horizontal reach of the loader arms 16 (as defined by the forward, longitudinal reach of the hitch pin 68) may be at least 6 inches, at least 7 inches, at least 8 inches, at least 9 inches, or at least 10 inches forward of the base position.

In some further embodiments, as perhaps show, in FIGS. 1 and 13, one or both of the loader arms 16 of the loader 10 may include a rotatable hydraulic line guide 70 secured to an exterior side of the loader arms 16. The line guide 70 may comprise a ring-shaped (e.g., circular or oval) element rotatably connected to a loader arm 16 via a fastener. In general, the fastener will be positioned horizontally and will provide a rotational axis about which the line guide 70 is free to rotate with respect to the loader arms 16. The line guide 70 is configured to receive hydraulic lines, tubes, or hoses that may extend from the interior compartment of the loader 10 to the attachment 18. In some embodiments, such hydraulic lines will extend (at least partially) through an interior of the loader arms 16. In other embodiments, such lines may extend (at least partially) along an exterior of the loader arms 16. Rotation of the line guide 70 permits that hydraulic lines to be securely held in place as the loader arms 16 and/or the attachment 18 moves (e.g., as the loader arms 16 shifting upward and downward). Such a line guide 70 also prevents premature wearing and other damage to the hydraulic lines over time.

Figure 17A:
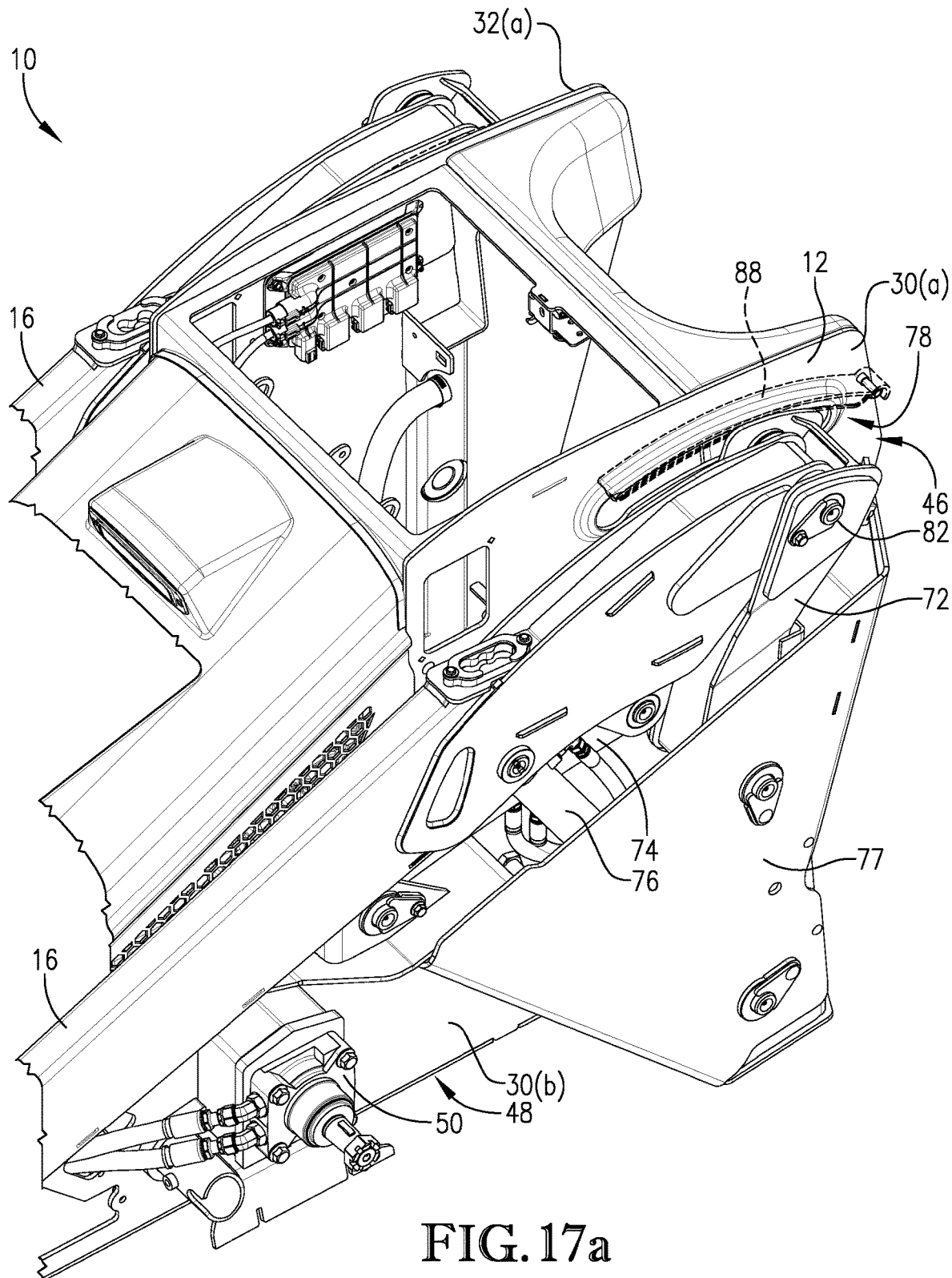
FIG. 17a is a partial perspective view of the compact utility loader from FIGS. 1-6, magnified to illustrate a track assembly directly connecting a loader arm to a frame of the compact utility loader.
Figure 17B:
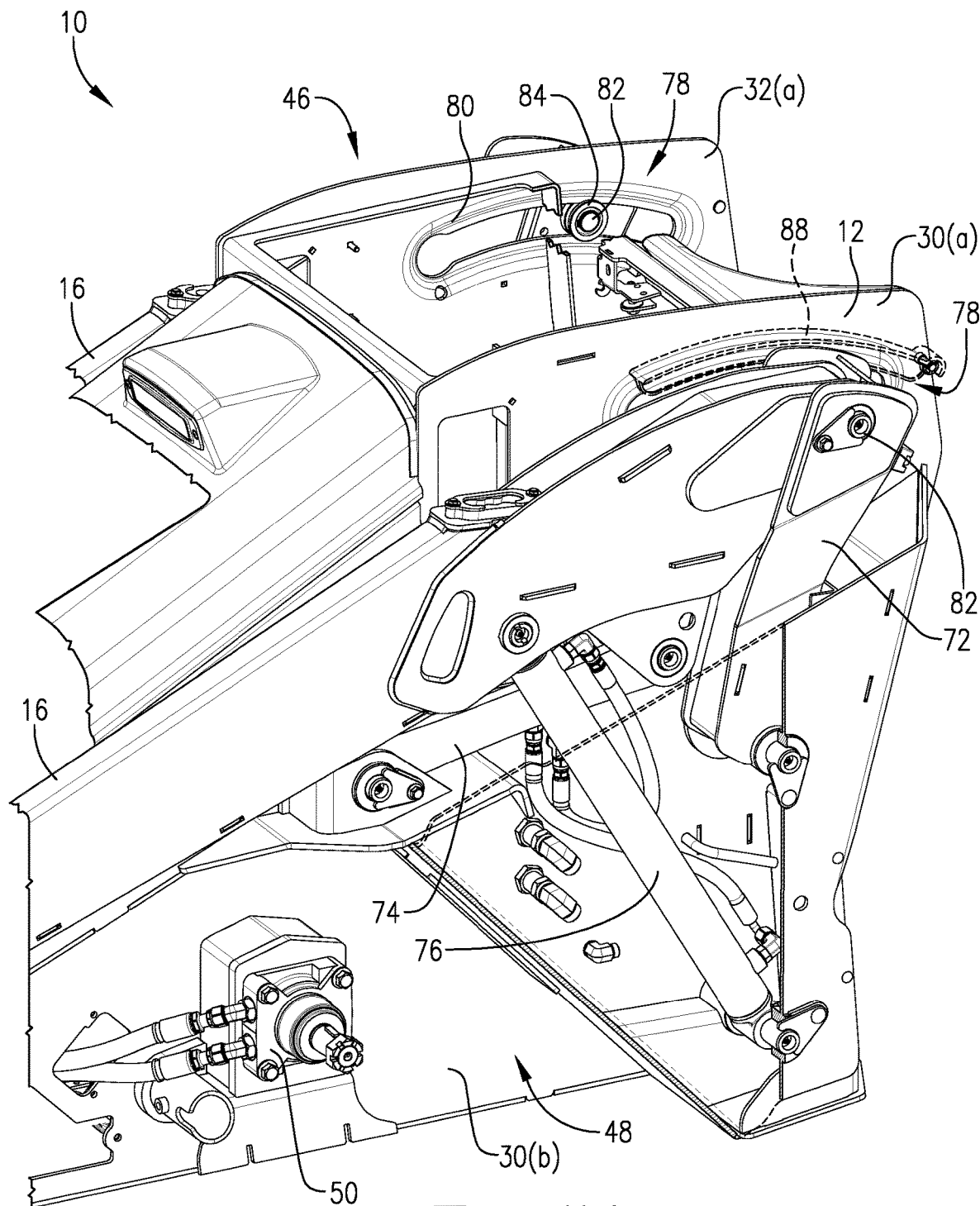
FIG. 17b is another perspective view of the compact utility loader from FIGS. 1-6, magnified to illustrate a track assembly directly connecting a loader arm to a frame of the compact utility loader and having a portion of the compact utility loader removed to illustrate a rear link, a control link, and an actuator indirectly connecting the loader arm to the frame.

As noted above, embodiments provide for the loader 10 to include loader arms 16 having a vertical-lift configuration but which are stabilized by direct connection to the frame 12, as illustrated in FIGS. 17*a* and 17*b*. As was also described above, the frame 12 may comprise an upper portion 46 and a lower portion 48. The lower portion 48 of the frame 12 is configured to support the track frames 42 (which supports the tracks 40) and the drive sprockets 44. The upper portion 46 of the frame 12 is configured to support the loader arms 16 via a direct connection between the frame 12 and the loader arms 16, as is shown in FIGS. 17*a* and 17*b*. It should be understood that in some embodiments, the upper potion 46 and the lower portion 48 are integrally formed elements of the frame 12. Nevertheless, the upper portion 46 may comprise the two spaced apart generally vertical upper panels 30(a), 32(a). In some embodiments, the upper panels 30(a), 32(a) are generally mirrored and parallel with each other. Similarly, the lower portion 48 may comprise the two spaced apart generally vertical lower panels 30(b), 32(b). In some embodiments, the lower panels 30(b), 32(b) are generally mirrored and parallel with each other.

In more detail, and with reference to FIGS. 17a-19b, each of the loader arms 16 may be attached to the frame 12 via a rear link 72, a control link 74, an actuator 76, and a track assembly 78. Although FIGS. 17a-19b focus on the left side rear link 72, the left side control link 74, the left side actuator 76, and the left side track assembly 78, it should be understood that the loader 10 includes corresponding components on the right side of the loader which are configured in a mirrored or parallel relationship with the right side components (see, e.g., FIGS. 2-5). Such mirrored or parallel relationship is maintained as the loader arms 16 transition between lowered and raised positions. In more detail, a left side loader arm 16 may be attached to the left side 30 of the frame 12 via a left side rear link 72, a left side control link 74, a left side actuator 76, and a left side track assembly 78. Similarly, a right side loader arm 16 may be attached to the right side 32 of the frame 12 via a right side rear link 72, a right side control link 74, a right side actuator 76, and a right side track assembly 78. The rear links 72, the control links 74, and the actuators 76 provide an indirect connection/attachment between the loader arms 16 and the frame 12 of the loader 10, while the track assemblies 78 provide a direct connection/attachment between the loader arms 16 and the frame 12 of the loader 10.

In some embodiments, a length of the rear link 72 is approximately equal to a length of the control link 74. In other embodiments, the length of the rear link 72 is between 70 to 130, between 80 to 120, or between 90 to 110 percent of the length of the control link 74. Furthermore, in some embodiments, a length of the actuator 76 is larger than the lengths of the rear link 72 and the control length 10. For instance, with the actuator 76 in an extended position, the length of the actuator 76 may be at least 50 percent, at least 75 percent, at least 100 percent, or at least 150 percent greater than the lengths of the rear length 72 and the control link 74.

Each of the rear links 72 is rotatably secured (e.g., via a pivot pin connection) to one of the sides of the frame 12 and rotatably secured (e.g., via a pivot pin connection) to a rear or proximal end of an associated loader arm 16. Each of the control links 74 is rotatably secured (e.g., via a pivot pin connection) to one of the sides of the frame 12 and rotatably secured (e.g., via a pivot pin connection) to an associated loader arm 16 at a position forward of the rear or proximal end of the loader arm 16. Each of the actuators 76 is rotatably secured (e.g., via a pivot pin connection) to one of the sides of the frame 12 and rotatably secured (e.g., via a pivot pin connection) to an associated loader arm 16 at a position forward of the rear or proximal end of the loader arm 16, and in some embodiments, forward of the points of connection of the rear and control links 72, 74. As perhaps best shown in FIGS. 17a and 18, each side of the loader 10 may include a cover panel 77 that covers lower portions of the rear link 72 and the actuator 76, so as to cover the connections between the rear link 72 and the actuator 76 to the frame 12. In some embodiments, connection between the rear link 72 and the actuator 76 to the frame 12 may include a connection with the cover panel 77. In some embodiments, the cover panels 77 may form part of the frame 12.

Figure 19A:
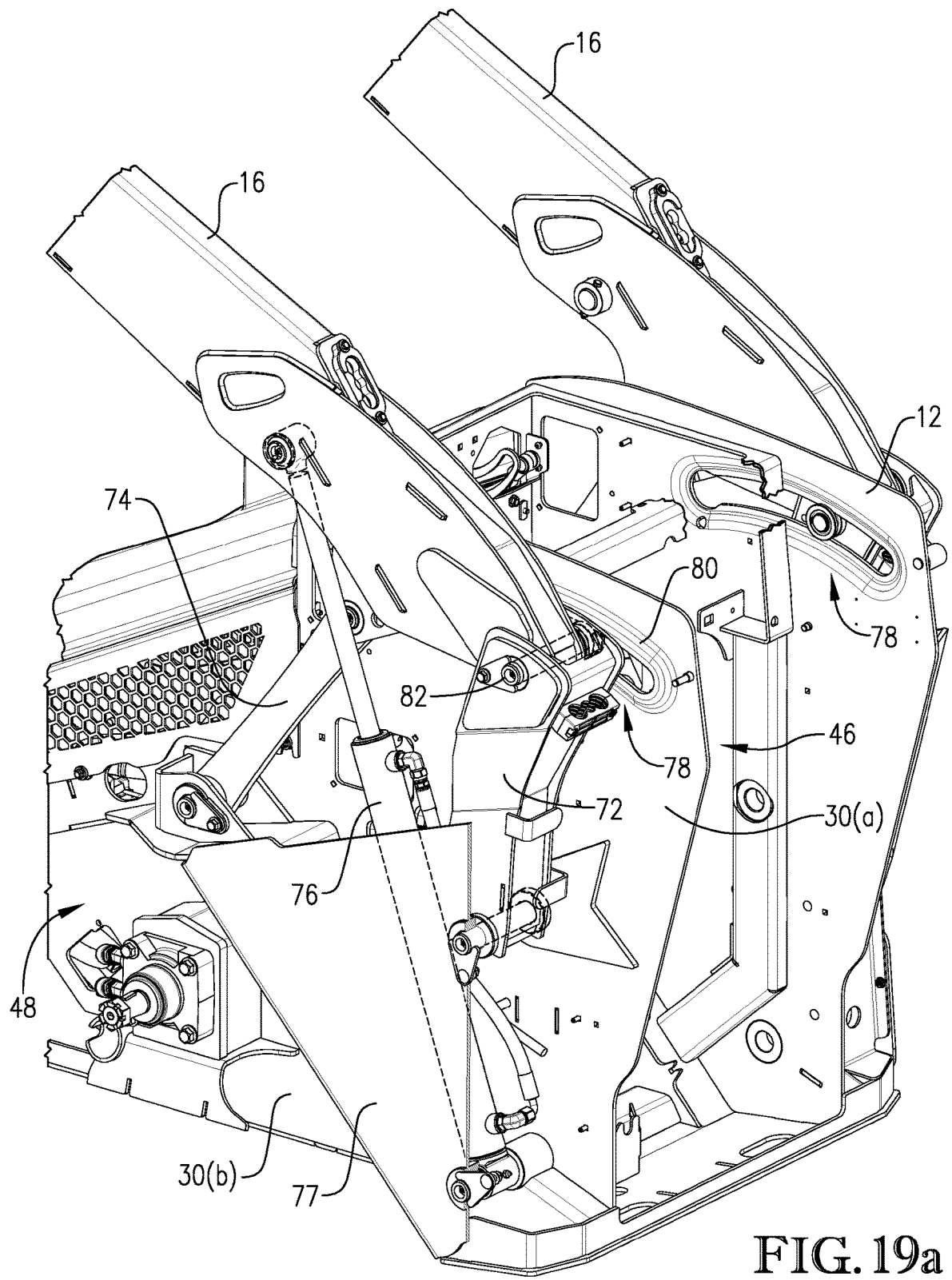
FIG. 19a is another partial perspective view of the compact utility loader from FIGS. 1-6, magnified to illustrate a track assembly directly connecting a loader arm to a frame of the compact utility loader, with the loader arm transitioning between a lowered position and a raised position.
Figure 19B:
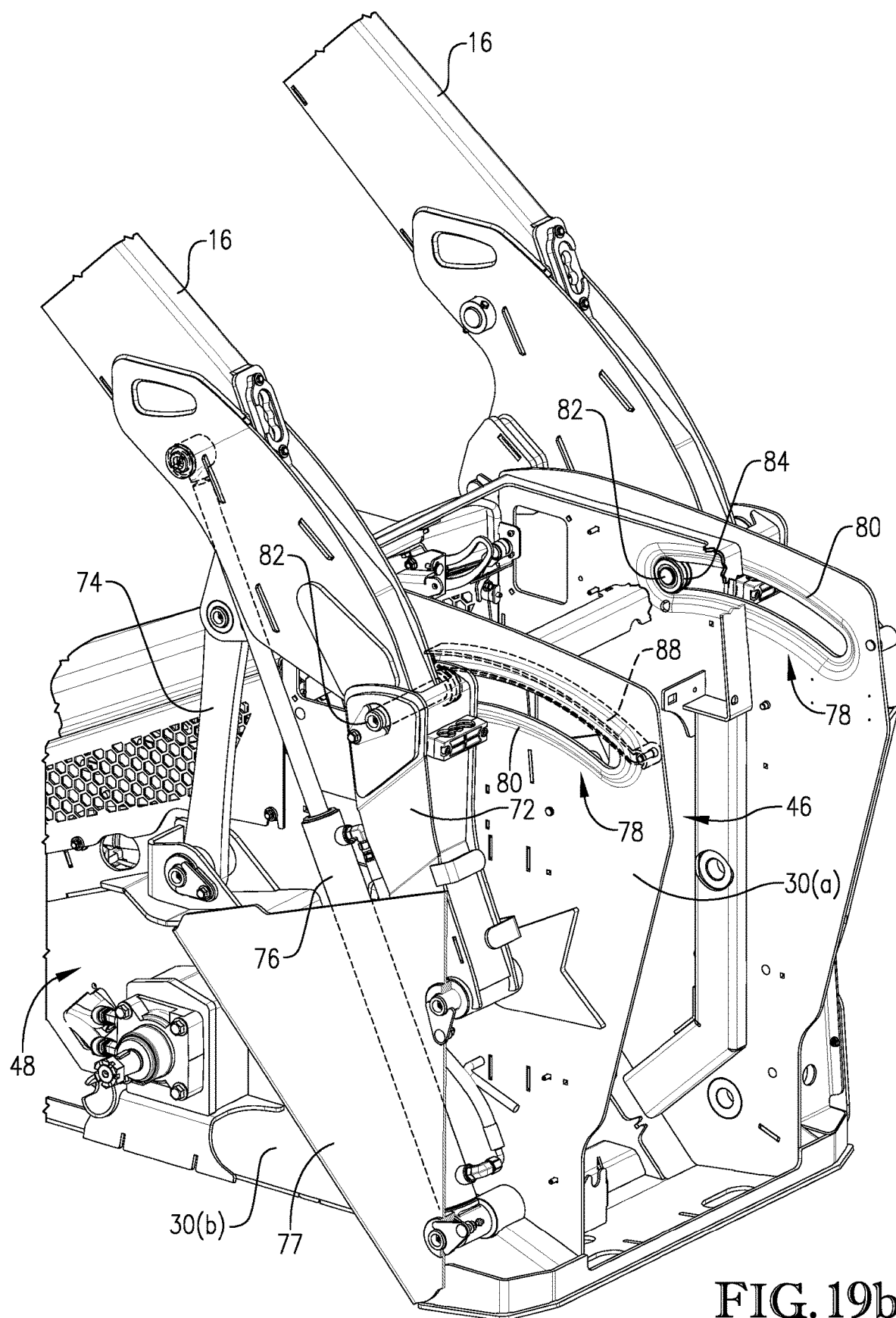
FIG. 19b is another partial perspective view similar to FIG. 19a, with the loader arm in the raised position.

As shown in FIGS. 1, 17a, and 17b, the loader arms 16 are disposed in a lowered position. In this lowered position, the rear links 72 are disposed in a substantially vertical orientation, the control links 74 are disposed at a substantially horizontal orientation, and the actuators 76 are disposed at an angle therebetween. It should also be noted that each of the actuators 76 extends across the associated control link 74. In FIG. 19b, the loader arms 16 are disposed in a raised position. In this raised position, the rear links 72 continue to be disposed in a substantially vertical orientation (although the upper ends of the rear links 72 are shifted at least slightly forward along the track assemblies 78), the control links 74 are disposed at a substantially vertical orientation, and the actuators 76 are disposed at an angle therebetween. FIG. 19a illustrate the loader arms 16 positioned intermediate the lowered and raised positions. In such a position, the rear links 72, the control links 74, and the actuators 76 are generally positioned in intermediate orientations between those described above in FIGS. 17b (loader arms 16 in the lowered positions) and 19b (loader arms 16 in the raised positions). It should also be noted that the actuators 76 continue to extend across their associated control link 74.

As was discussed previously, the manner in which the loader arms 16 are attached to the frame 12 provides for the loader arms 16 to actuate in a vertical-lift configuration. In more detail, the rear links 72 and the control links 74 support the loader arms 16 with respect to the frame 12 and provide for the loader arms 16 to raise and lower in a vertical-lift configuration when actuated by the actuator 76. In some embodiments, the actuators 76 may comprise linear actuators, such as hydraulic cylinders (e.g., single or double-acting cylinders), pneumatic cylinders, and/or or electronic linear actuators. However, as discussed in more detail below, the loader arms 16 may be actuated by various other types of actuators. The rear and control links 72, 74 may comprise generally rigid elements that support the loader arms 16 with respect to the frame 12 as the loader arms 16 are raised and lowered.

Although the loader arms 16 are configured to operate in a vertical-lift configuration, the track assemblies 78 permit the loader arms 16 to be maintained directly attached to the frame 12 during operation. As such, the loader arms 16 may be directly attached to the frame 14 at the track assemblies 78, while being indirectly attached to the frame 12 via the rear links 72, the control links 74, and the actuators 76.

Figure 18:
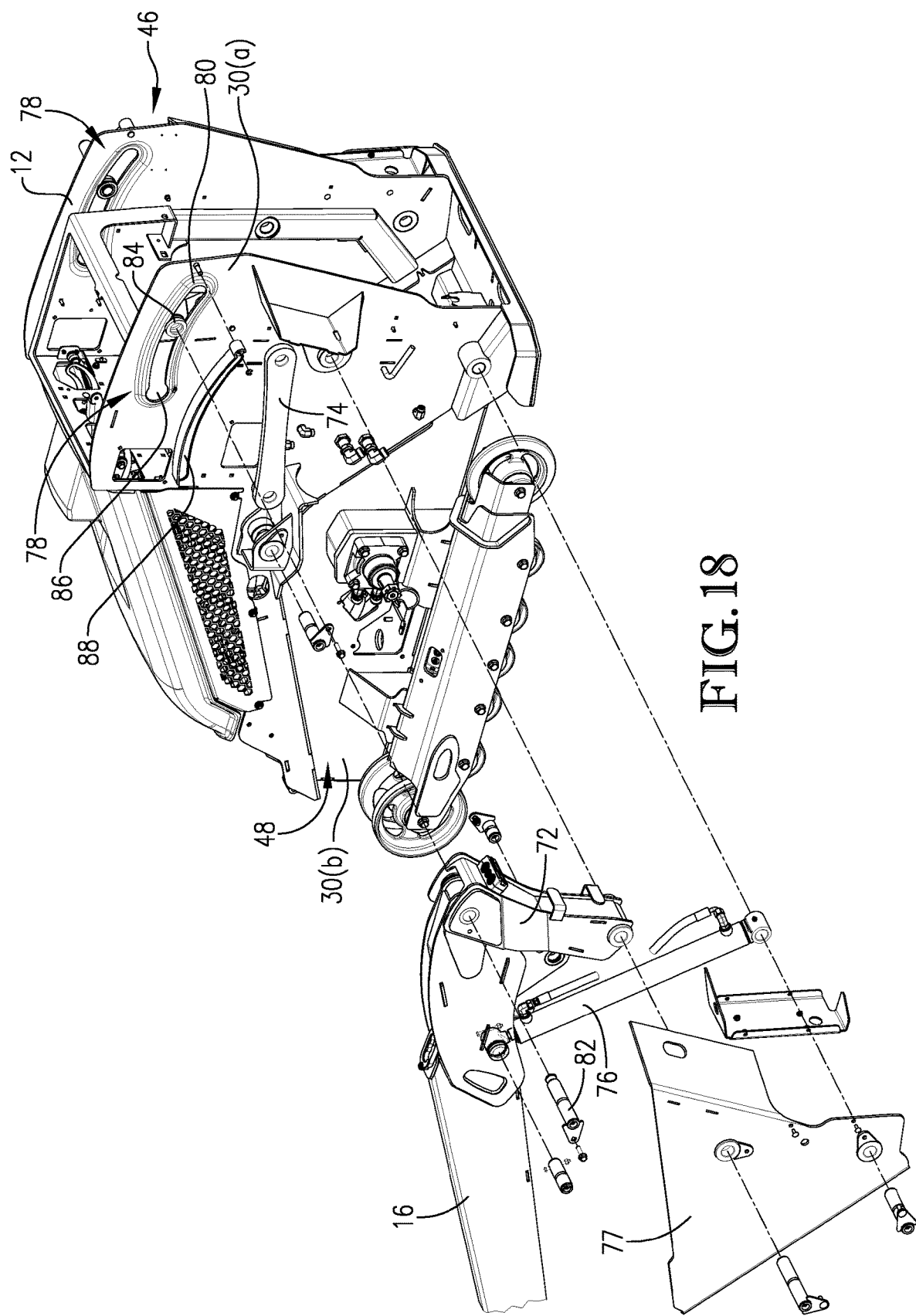
FIG. 18 is an exploded view of the compact utility loader from FIGS. 17a and 17b, particularly illustrating the track assembly, the rear link, the control link, and the actuator.

With reference to FIG. 18 In some embodiments, each of the track assemblies 78 may be in the form of a running track that broadly comprises a track body 80 that includes an elongated, arcuate frame or border presenting an opening or recess within the frame/border of the track body 80. As such, the opening or recess may likewise have an elongated, arcuate shape. The loader arms 16 may each be engaged with and/or attached to one of the track bodies 80 such that a portion of the loader arm 16 may travel along (e.g., slide forward/rearward and/or upward/downward) the opening presented by the track assembly 78. Specifically, the openings of the track assemblies 78 may act as guide paths along which at least a portion of the loader arms 16 are configured to translate. The track assemblies 78 are configured to prevent or reduce torsion of the loader arms 16 by preventing movement of the loader arms 16 beyond the track assemblies 78. For example, the track assemblies 78 may counter or otherwise resist lateral or torsional movement of the loader arms 16 so as to keep the loader arms 16 in proper alignment with the frame 12 of the loader 10 during movement (e.g., raising/lowering) of the loader arms 16.

With reference to FIG. 18, the track body 80 of each of the track assemblies 78 may be integrally formed within (or monolithic with) the upper portion 46 (e.g., the upper panels 30(a), 32(a)) of the frame 12. For example, the track body 80 is formed by stamping or embossing the metal of the frame 12 to form the track body 80. In alternative embodiments, the track body 80 may be secured (e.g., via weld) to the upper portion 46 (e.g., the upper panels 30(a), 32(a)) of the frame 12. Regardless, as noted above, the track body 80 presents an opening so as to form a running track. When the track body 80 is integrally formed with the frame 12, the opening may extend through a thickness of the frame 12. Remaining with FIG. 18, the track assemblies 78 may each comprise a pin 82 that is associated with (e.g., extends through) a respective loader arm 16 and/or rear link 72. In some embodiments, the pins 82 may be integrally formed with the loader arms 16. In more detail, each of the pins 82 may extend through a rear or proximal end of one of the loader arms 16 and into engagement with the track body 80 such that the pin 82 extends at least partially within the opening presented by the track body 80. In some embodiments, the pins 82 may also extend through the rear links 72. Regardless, each of the pins 82 is configured to move along the opening presented by the track body 80. Specifically, the pins 82 follow the guide paths presented by the track assemblies 78. As the loader arms 16 move from a lowered position (shown in FIGS. 17a and 17b) to a raised position (shown in FIG. 19b), the pins 82 shift between a rearward position of the track body 80, along the opening of the track body 80, and to a forward position of the track body 80. Correspondingly, the pins 82 may shift from the forward position to the rearward position while the loader arms 16 move from the raised position to the lowered position. As a result, the loader arms 16 are slidably connected to the frame 12

To help facilitate movement of the pins 82 through the opening of the track body 80, and as perhaps best shown in FIGS. 17b, 18, and 19b, each of the pins 82 may include (or otherwise be associated with) a captive runner 84 configured to be received on an end of the pin 82, with such end being the end that is engaged with the track body 80. The captive runners 84 may comprise ring-shaped bushings or bearings that are secured to the pins 82 in a manner that permits the captive runners 84 to rotate with respect to the pins 84. Furthermore, however, the captive runners 84 will each include two annular protrusions and an annular recess groove extending around a circumference of the captive runner 84, such that the captive runners 84 (and thus the pins 82) are held within the opening of the track body 80 via engagement between the annular recess and a track wall presented as an interior edge of the track body 80 that surrounds the opening. Such engagement may permit the captive runners 84 to rotate or roll along the track body 80 so as to reduce friction as the pins 82 move forward and rearward through the opening of the track body 80 (i.e., as the loader arms 16 are raised and/or lowered).

As shown in FIG. 17, One or more of the forward and rearward ends of the opening presented by each of the track bodies 80 may be formed with an access ports 86 that permits the captive runner 84 and/or the pins 82 to be inserted into and removed from engagement with the track assembly 78. The access ports 86 may have a larger open area than remaining portions of the opening of the track body 80, so as to allow the captive runner 84 and/or the pin 82 to pass therethrough. Such larger open area may be formed by reducing a width of the track wall 86 near the forward and rearward ends of the track body 80. The ability to remove the pins 82 and/or captive runners 84 from the track body 80 permits the loader arms 16 to be disengaged from the track assemblies 78 for purposes of service and maintenance, as may become necessary. It should be noted however, that during normal operations of the loader 10 (e.g., during raising and lowering of the loader arms 16), the pins 82 and/or captive runners 84 will not become aligned with the access ports 80, such that the loader arms 16 will not become inadvertently disengaged with the track assemblies 78

Finally, the track assemblies 78 may each be associated with a hand guard 88 that is rotatably attached to the frame 12 of the loader 10 directly above the track bodies 80. The hand guards 88 may cover the remaining components of the track assemblies 80 so as to protect the operator from inadvertently placing his/her body parts (e.g., hands), clothing, etc. into engagement with the track assemblies 78 which could cause damage or injury to the operator. Nevertheless, because the hand guards 88 are rotatably attached to the frame 12 (e.g., via pivot pins), the hand guards 88 can be rotated upward away from the remaining components of the track assemblies 78 when necessary to access such components of the track assemblies 78.

In view of the above, each of the track assemblies 78 presents an arcuate path that is configured to keep the captive runner 84 and the pins 82 (and by extension, the loader arms 16) stable vertically (e.g., upward and downward), laterally (e.g., into and away from the frame), in a roll direction (e.g., the pins 82 are restricted from moving upward and downward beyond the opening presented by the track body 80), and in a yaw direction (e.g., the pins 82 are restricted from moving forward and rearward beyond the opening presented by the track body 80). Stated differently, the track assemblies 78 prevent the loader arms 16 from moving vertically, laterally, in a roll direction, and in a yaw direction with respect to the track assemblies 78. The arcuate path of the track assembly 78 allows movement only along and aligned with the guide path presented by the opening of the track body 80. Thus, the track assemblies 78 allow the loader arms 16 to actuate in a vertical-lift configuration while being directly attached to the frame 12 of the loader 10.

In some further embodiments, the pins 82 of the track assemblies 78 may not be necessary to directly attach the loader arms 16 to the frame 12 and to still allow the loader arms 16 to operate in a vertical lift configuration. For example, the loader arms 16 may each be directly attached to the frame via a track assembly 78 that comprises a track body 80 and a captive runner 84 in the form of a track roller bearing configured to translate (e.g., slide) through the opening presented by the track body 80 as the loader arm 16 is raised and lowered. In such embodiments, each of the captive runners 84 may be directly attached to a respective loader arm 16 and track body 80. Thus, as the loader arms 16 are raised and lowered, the captive runner 84 translates along the track body 80, while maintaining a direct connection between the loader arms 16 and the frame 12. Additionally, in such embodiments, either the rear links 72 or the control links 74 may be removed. Thus, the actuators 76 and either the rear links 72 or the control links 74 indirectly attach the loader arms 16 to the frame 12, while the track assemblies 78 (without the pins 82 but including captive runners 84 in the form of a track roller bearings) directly attach the loader arms to the frame 12. As such, the loader arms 16 will be raised and lowered in a vertical lift configuration by the force of the actuators 76, while the track assemblies 78 (including captive runners 84 in the form of a track roller bearings) maintain a direct connection between the loader arms 16 and the frame 12.

Alternative Vertical Lift Embodiments

Embodiments of the present invention additionally include compact utility loaders with alternate types of loader arms having a vertical-lift configuration. The below embodiments generally include a frame and one or more loader arms similar to those discussed above with respect to the loader 10. For instance, the loader arms support an attachment, such as a bucket or hydraulically operated tool. An operator may raise and lower the loader arms (including the bucket or other tool) so as to perform any of various tasks.

Figure 20:
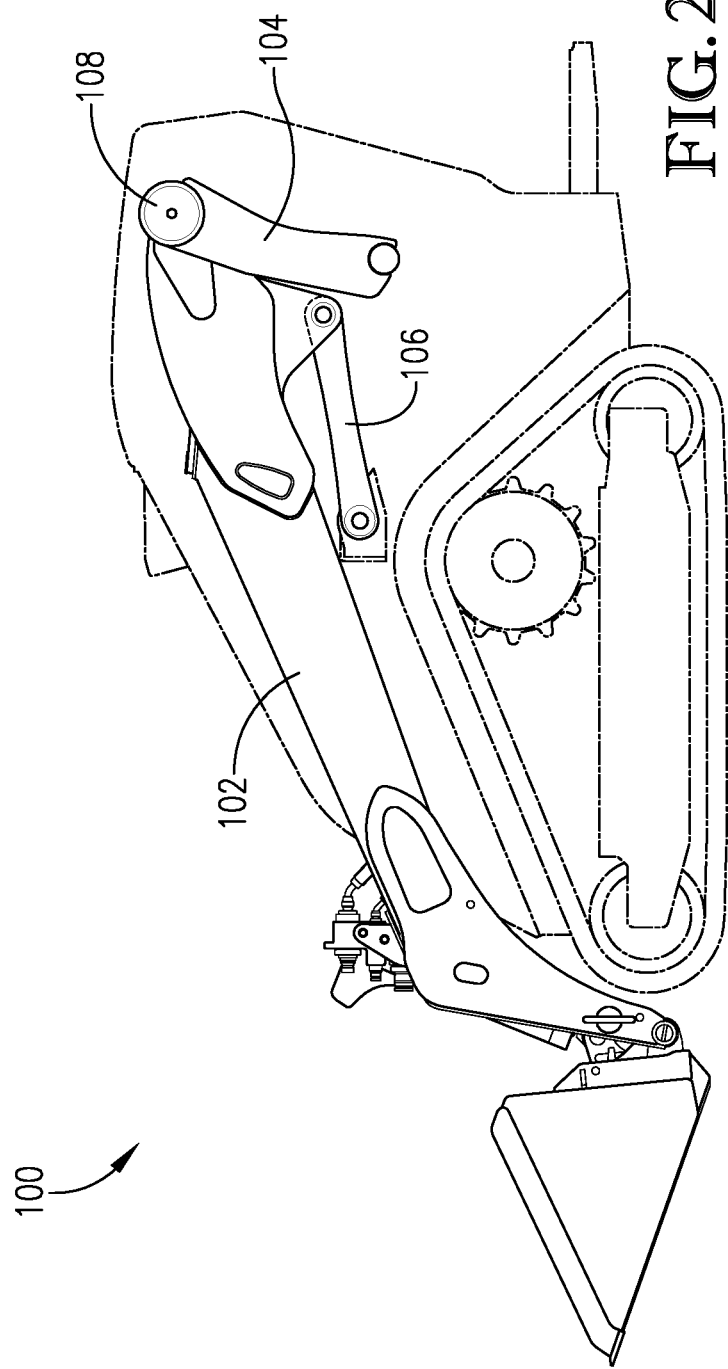
FIG. 20 is a side elevation view of a compact utility loader according to a second embodiment of the present invention, with loader arms of the compact utility loader in a lowered position.
Figure 21:
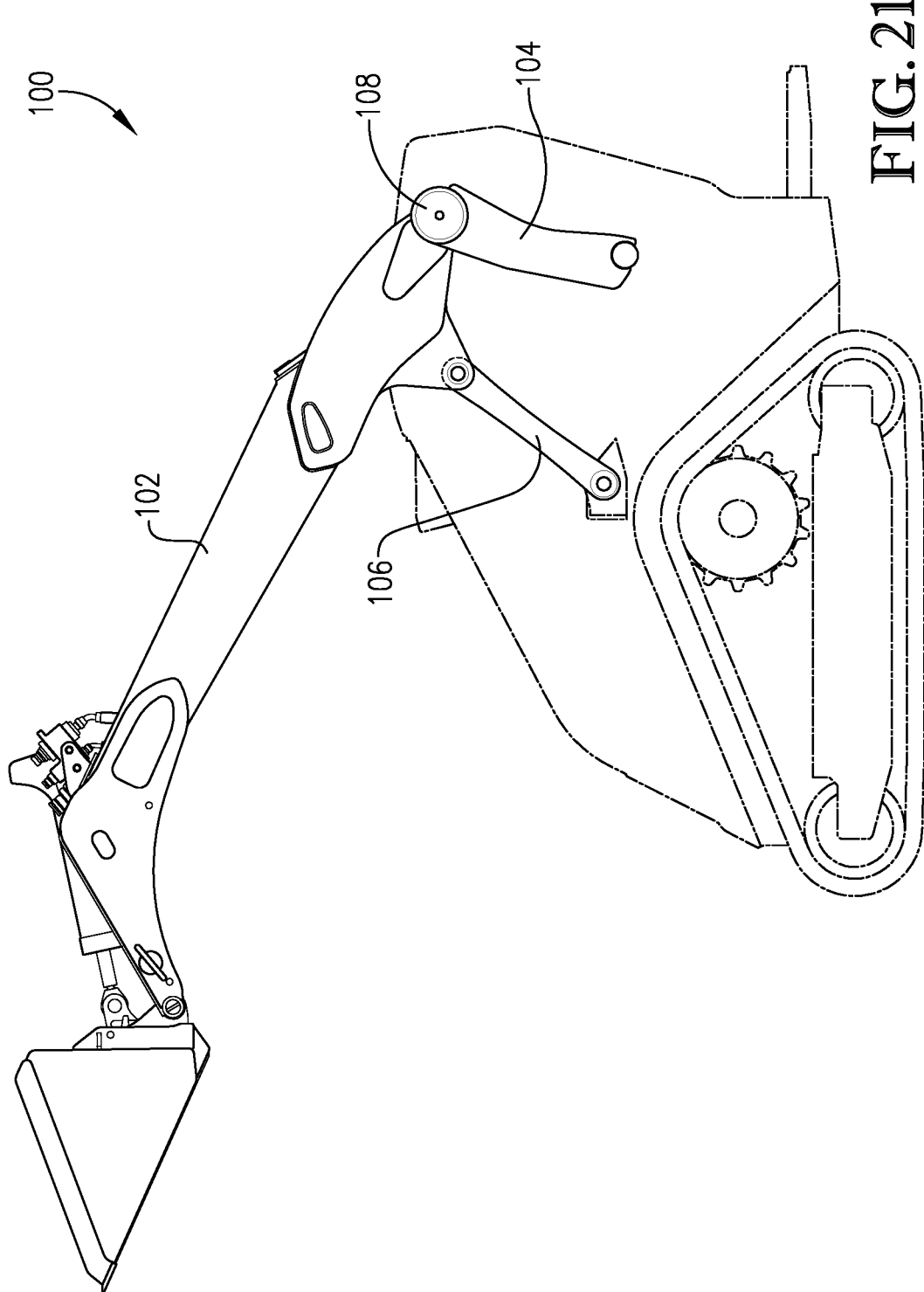
FIG. 21 is a side elevation view of the compact utility loader from FIG. 20, with the loader arms in a raised position.

For example, as shown in FIGS. 20 and 21, embodiments of the present invention include another style compact utility loader 100 with a pair of loader arms 102 having a vertical-lift configuration. In this embodiment, each loader arm 102 of the loader 100 is associated with a rear link 104 and a control link 106 similar to the rear link 72 and the control link 74 discussed above with respect to loader 10. Differently, however, each loader arm 102 of the loader 100 is secured to the rear link 104 via a rotary actuator 108, such that the rotary actuator 108 is disposed between the rear link 104 and the loader arm 102. The rotary actuator 108 is configured to rotate the loader arm 102 and/or the rear link 104 so as to change a relative angle between the loader arm 102 and the rear link 104. Changing the relative angle between the loader arm 102 and the rear link 104 permits the loader arm 104 to shift between a lowered position and a raised position in a vertical-lift manner. Although the figures only illustrate one side of the loader 100 (i.e., the left side), it should be understood that the opposite side of the loader 100 (i.e., the right side) similarly includes a loader arm 102, a rear link 104, a control link 106, and an actuator 108 that mirror those shown in FIGS. 20 and 21.

In some embodiments, the rotary actuator 108 may be secured to the loader arm 102 and the rear link 104. In other embodiments, however, the rotary actuator 108 may be secured to the control link 106 and the loader arm 102. Nevertheless, in either embodiment, the rotary actuator 108 may be permanently secured to the loader arm 102 or the respective link 104,106, imparting rotation on the other component, so as to cause the loader arm 102 to raise and lower.

The rotary actuator 108 produces a rotary motion. The rotary motion allows the operator to selectively raise and lower the loader arm 102 relative to the frame of the loader 100. In some embodiments, the rotary actuator 108 may be powered via hydraulic, pneumatic, or electrical power. In some of these embodiments, the rotary actuator 108 may be a linear piston-and-cylinder assembly that is stepped so as to produce rotation. In other of these embodiments, the rotary actuator 108 may be a rotating asymmetrical vane which swings through a cylinder of two different radii. The pressure differential between the two sides of the vane produces an unbalanced force which imparts a torque on an output shaft. In still other embodiments, the rotary actuator 108 is an electrically powered motor.

In some embodiments, the rotary actuator 108 may raise and lower the loader arm 102 (and associated attachment) while the rotary actuator 108 positioned further from the ground than on loaders with traditional vertical lift configurations. In these traditional configurations, an actuator may be susceptible to dirt and other contaminants due to the actuator's relatively low position. The rotary actuator 108 being disposed relatively high on the frame of the loader 100, and having fewer exposed moving parts, may thus reduce the likelihood of contaminants affecting the actuator 108.

Figure 22:
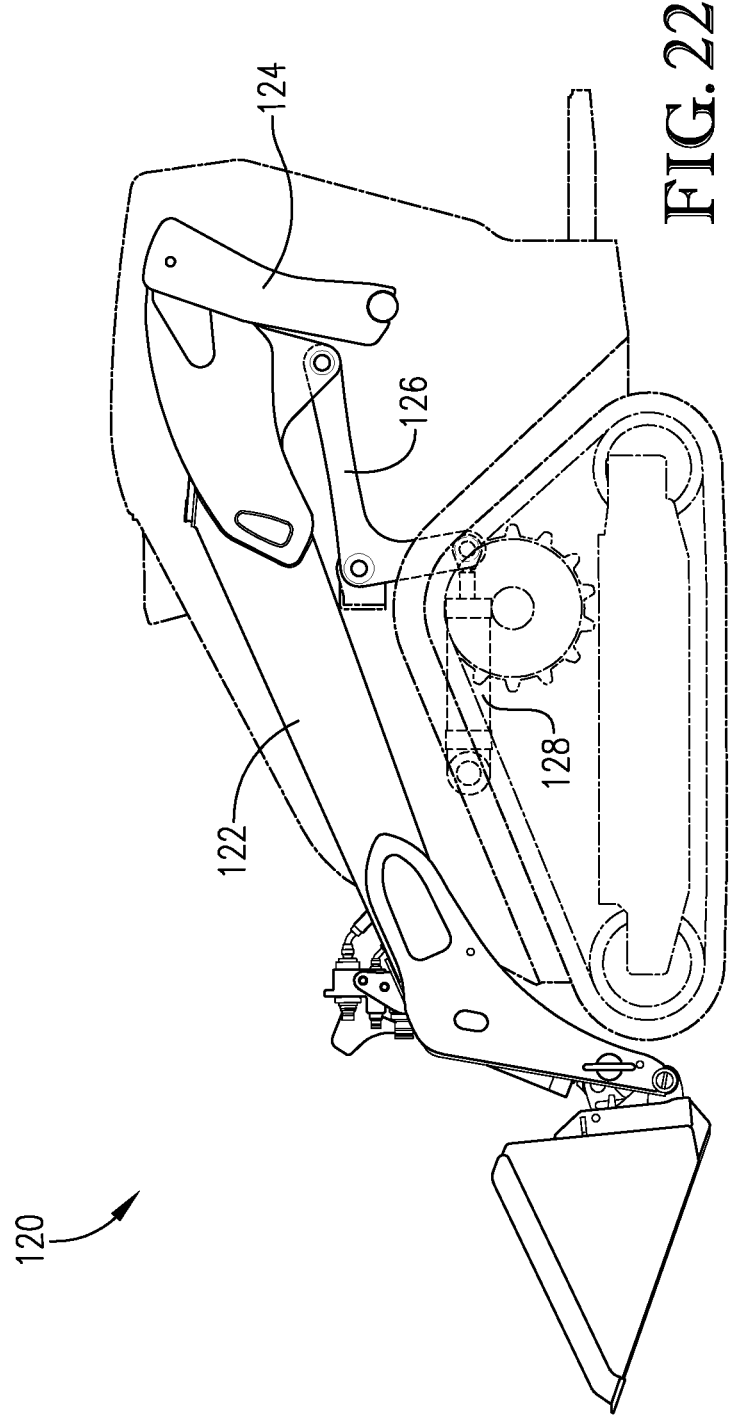
FIG. 22 is a side elevation view of a compact utility loader according to a third embodiment of the present invention, with loader arms of the compact utility loader in a lowered position.
Figure 23:
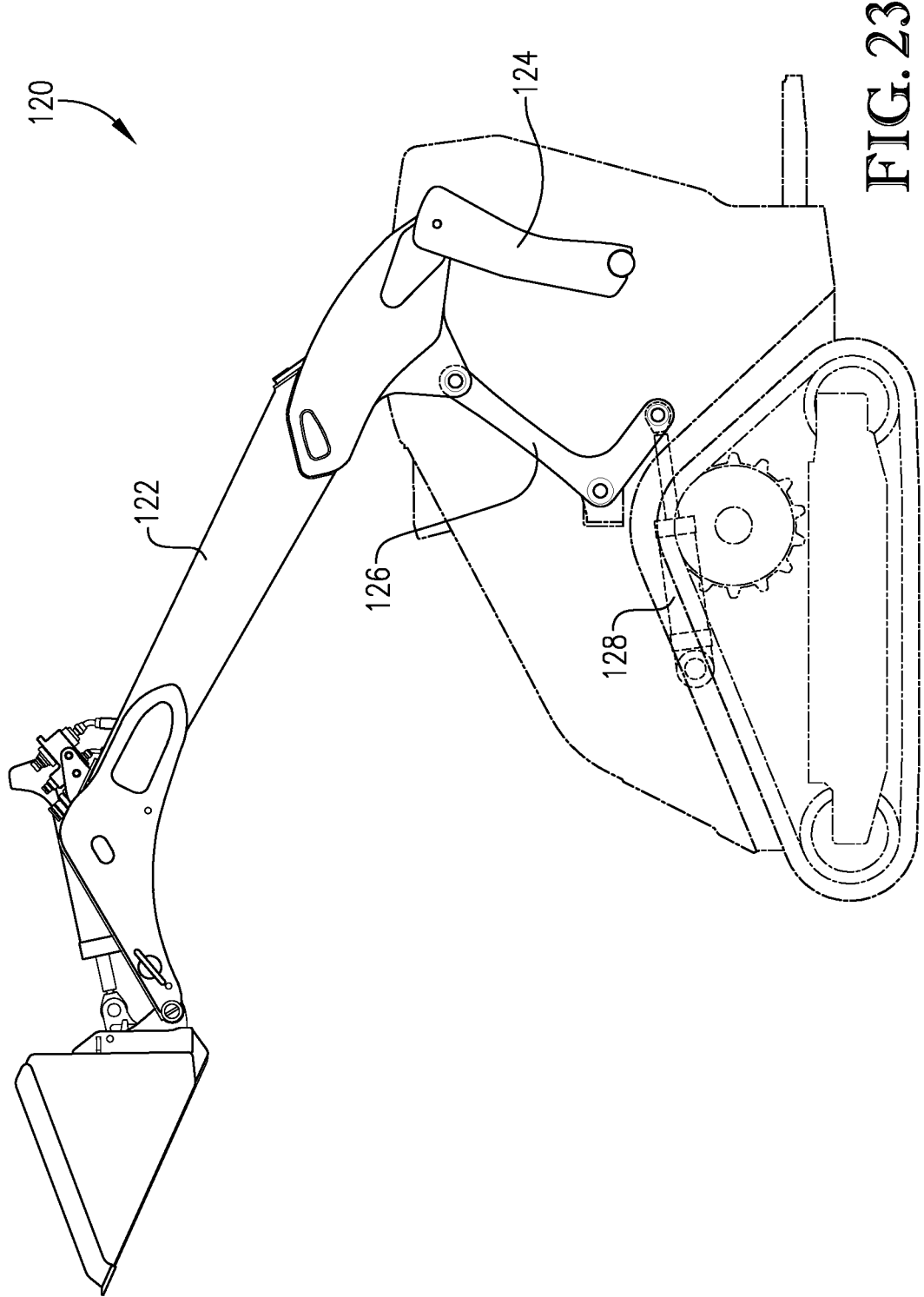
FIG. 23 is a side elevation view of the compact utility loader from FIG. 22, with the loader arms in a raised position.

In a second alternate embodiment of a compact utility loader 120, shown in FIGS. 22 and 23, with a pair of loader arms 122 having a vertical-lift configuration. In this embodiment, each loader arm 122 of the loader 120 is associated with a rear link 124 and a control link 126 similar to the rear link 72 and the control link 74 discussed above with respect to loader 10. Differently, however, the loader 120 includes a linear actuator 128 associated with each loader arm 122, with each linear actuator 128 pivotably secured to one of the control links 126 and to the frame of the loader 120 for raising and lowering the loader arms 122. In more detail, the linear actuators 128 may each comprise a hydraulic cylinder, a pneumatic cylinder, or an electric actuator that is rotatably secured to a side of the frame 12 (e.g., a left side 30 or a right side 32) and pivotably secured to the control link 126 of the loader 120. As such, a rotational force is produced via linear telescoping action of the linear actuator 128 onto the control link 126. In this embodiment, each of the control links 126 may be pivotably secured to the frame 12 (at a fulcrum positioned between the linear actuator 128 and the loader arm 122) and pivotably secured to the loader arm 122. Although the figures only illustrate one side of the loader 120 (i.e., the left side), it should be understood that the opposite side of the loader 120 (i.e., the right side) similarly includes a loader arm 122, a rear link 124, a control link 126, and an actuator 128 that mirror those shown in FIGS. 22 and 23.

In more detail, embodiments provide for each of the control links 126 in this embodiment to function as a lever. As illustrated, the lever may present a general L-shape with a center portion of the control link 126 being a fulcrum that is rotatably connected to a side of the frame of the loader 120. A first side of the control link 126 extends from the fulcrum to the linear actuator 128, while a second side of the control link 126 extends from the fulcrum to the loader arm 122. The first side and the second side of the control link 126 extend at an angle with respect to each other so as to present the L-shape. In some embodiments, the first side and the second side of the control link 126 may extend at an angle of about ninety degrees, although various other angles may be implemented. The lengths of the first and second section of the control link 126 may be selected, as necessary, to provide a preferable mechanical advantage for the lever (e.g., such lengths may be selected so as to reduce the force input from the actuator 128 necessary to cause displacement and/or rotation of the control link 126 and, thus, the loader arms 122).

In some embodiments, the first side of the control link 126 will be positioned in a vertical orientation (e.g., downward orientation) when the loader arms 122 are in the lowered position. Correspondingly, the second side of the control link 126 will be positioned in generally a horizontal orientation (and connected to the loader arm 122). As such, when the linear actuator 128 is extended and retracted, the first side of the control link 126 is shifted forward or rearward relative to the fulcrum. Correspondingly, the second side of the control link 126 (which is connected to the loader arms 122) will be raised and lowered. In this way, actuation of the control links 126 by the linear actuators 128 will shift the loader arms 122 relative to the frame of the loader 120. Specifically, the linear actuators 128 are configured to raise the loader arms 122 from a lowered position to a raised position by manipulating the control links 126 in a first direction, as well as being configured to lower the loader arms 122 from the raised position to the lowered position by manipulating the control links 126 in a second direction.

Figure 24:
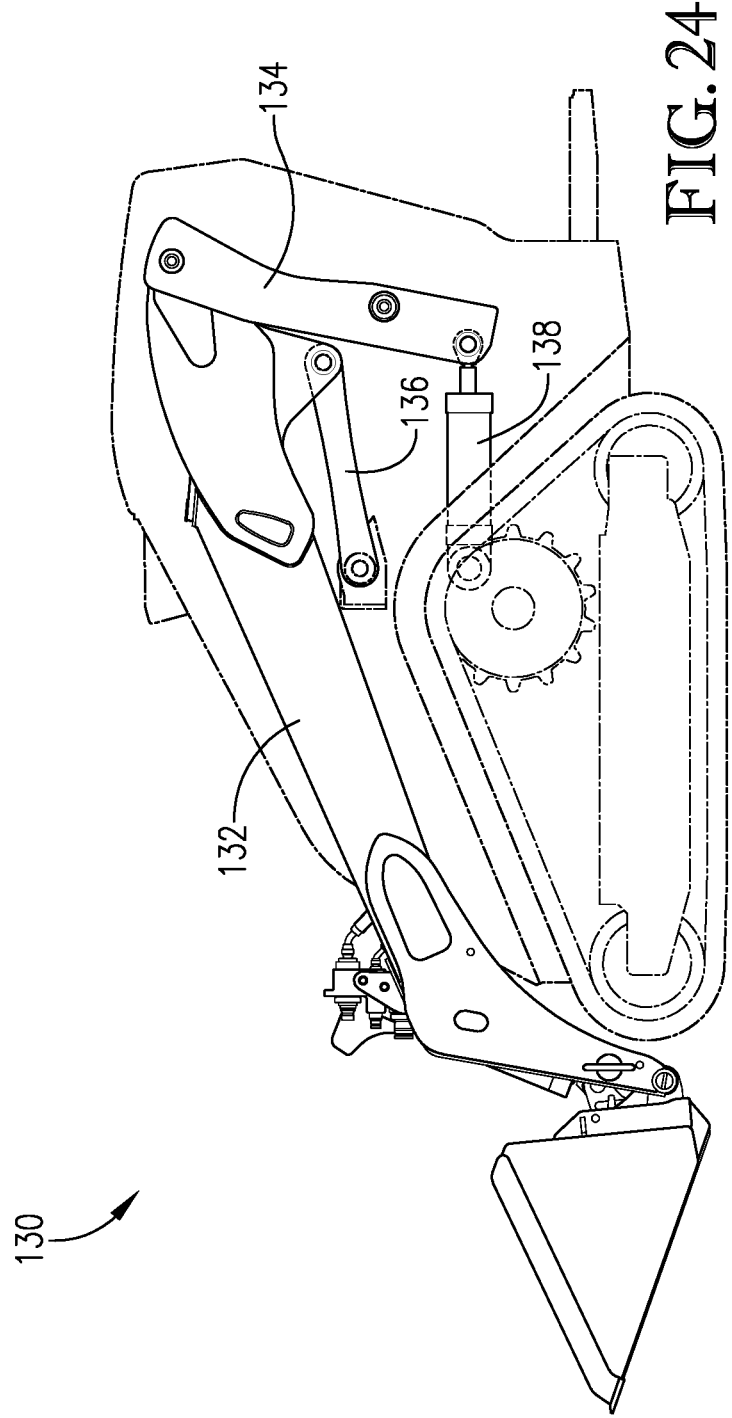
FIG. 24 is a side elevation view of a compact utility loader according to a fourth embodiment of the present invention, with loader arms of the compact utility loader in a lowered position.
Figure 25:
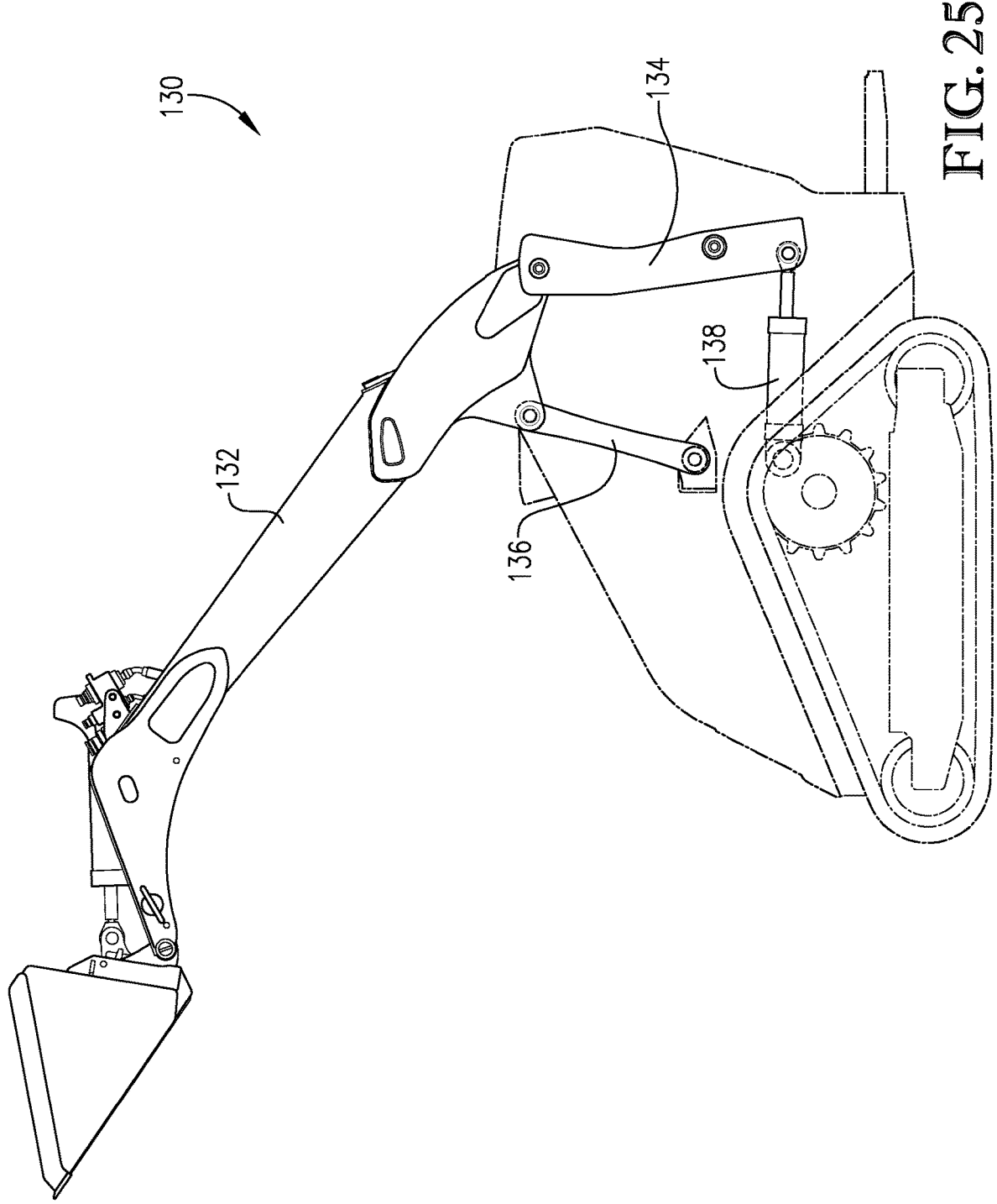
FIG. 25 is a side elevation view of the compact utility loader from FIG. 24, with the loader arms in a raised position.

In a third alternate embodiment of a compact utility loader 130, as shown in FIGS. 24 and 25, with a pair of loader arms 132 having a vertical-lift configuration. In this embodiment, each loader arm 132 of the loader 130 is associated with a rear link 134 and a control link 136 similar to the rear link 72 and the control link 74 discussed above with respect to loader 10. Differently, however, the loader 130 includes a linear actuator 138 associated with each loader arm 132, with each linear actuator 138 pivotably secured to one of the rear links 134 and to the frame of the loader 130 for raising and lowering the loader arms 132. In more detail, the linear actuators 138 may each comprise a hydraulic cylinder, a pneumatic cylinder, or an electrical actuator that is rotatably secured to a side of the frame 12 (e.g., a left side 30 or a right side 32) and pivotably secured to the rear link 134 of the loader 130. As such, a rotational force is produced via linear telescoping action of the linear actuator 138 onto the rear link 134. In this embodiment, each of the rear links 134 may be pivotably secured to the frame 12 (at a position between the connection points of linear actuator 138 and the loader arm 132) and pivotably secured to the loader arm 122. Although the figures only illustrate one side of the loader 130 (i.e., the left side), it should be understood that the opposite side of the loader 130 (i.e., the right side) similarly includes a loader arm 132, a rear link 134, a control link 136, and an actuator 138 that mirror those shown in FIGS. 24 and 25.

In more detail, embodiments provide for the rear link 134 to function as a lever. As illustrated, the lever may present a general I-shape with a center portion of the rear link 134 being a fulcrum that is rotatably connected to a side of the frame of the loader 130. A first side of the rear link 134 extends (e.g., downward) from the fulcrum to the linear actuator 138, while a second side of the rear link 134 extends (e.g., upward) from the fulcrum o the loader arm 132. The first side and the second side of the rear link 134 may extend generally colinearly so as to present the I-shape. The lengths of the first and second section of the rear link 134 may be selected, as necessary, to provide a preferable mechanical advantage for the lever (e.g., such lengths may be selected so as to reduce the force input from the actuator 138 necessary to cause displacement and/or rotation of the control link 134 and, thus, the loader arms 132).

In some embodiments, the rear links 134 will be positioned in a generally vertical orientation when the loader arms 132 are in the lowered position. As such, when the linear actuator 138 is extended and retracted, the first side of the rear link 134 (e.g., a lower side) is shifted forward or rearward relative to the fulcrum. Correspondingly, the second side of the rear link 134 (e.g., an upper side which is connected to the loader arm 132) will be shifted rearward or forward relative to the fulcrum. As a result, the loader arms 132 can be raised and lowered. More particularly, actuation of the rear links 134 by the linear actuators 138 will shift the loader arms 132 relative to the frame of the loader 130. The linear actuators 138 are configured to raise the loader arms 132 from a lowered position to a raised position by manipulating the rear links 134 in a first direction, as well as being configured to lower the loader arms 132 from the raised position to the lowered position by manipulating the rear links 134 in a second direction.

In other embodiments, not illustrated, the loaders 100, 120, 130, may include actuators operably attached to both the rear link and the control link. Regardless, as illustrated above with respect to the loaders 100, 120, and 130, embodiments of the present invention provide various configurations for creating a vertical-lift configured loader arm. In the above-described embodiments, however, the actuators used to raise and lower the loader arms (e.g., rotary actuator 108 or linear actuators 128, 138) are not simultaneously secured to both the frame and the loader arms. For instance, for loader 100, the rotary actuator 108 is attached directly to the loader arm 102 but is not attached to the frame. In some other embodiments, however, the rotary actuator 108 might be directly attached to the frame of the loader 100. For loaders 120, 130, on the other hand, the linear actuators 128, 138 are directly attached to the frame, but not directly attached to the loader arm 122, 132.

Control System

As described previously, and as perhaps best illustrated in FIGS. 26 and 27, the loader 10 may include control station 20 positioned at the rear of the loader 10. The control station 20 may include a platform 140 on which the operator can stand when operating the loader. Generally, the platform 140 will be secured to a lower portion of the frame 12 of the loader 10, such that the operator can comfortably reach the control panel 22 with the operator's hands. In some embodiments, the loader 10 may include a presence sensor 141 associated with the platform 140 and configured to determine if the platform 140 is currently supporting an operator (i.e., whether an operator is currently present on the platform 140). Such a presence sensor 141 may comprise an electronic position sensor, such an inductive proximity switch configured to be triggered by the weight of the operator present on the platform 140. Thus, the loader 10 is configured to determine whether or not an operator is positioned on the platform 140. As will be discussed in more detail below, in some embodiments, certain operational features of the loader 10 may be restricted if an operator is not present on the platform 140.

Figure 26:
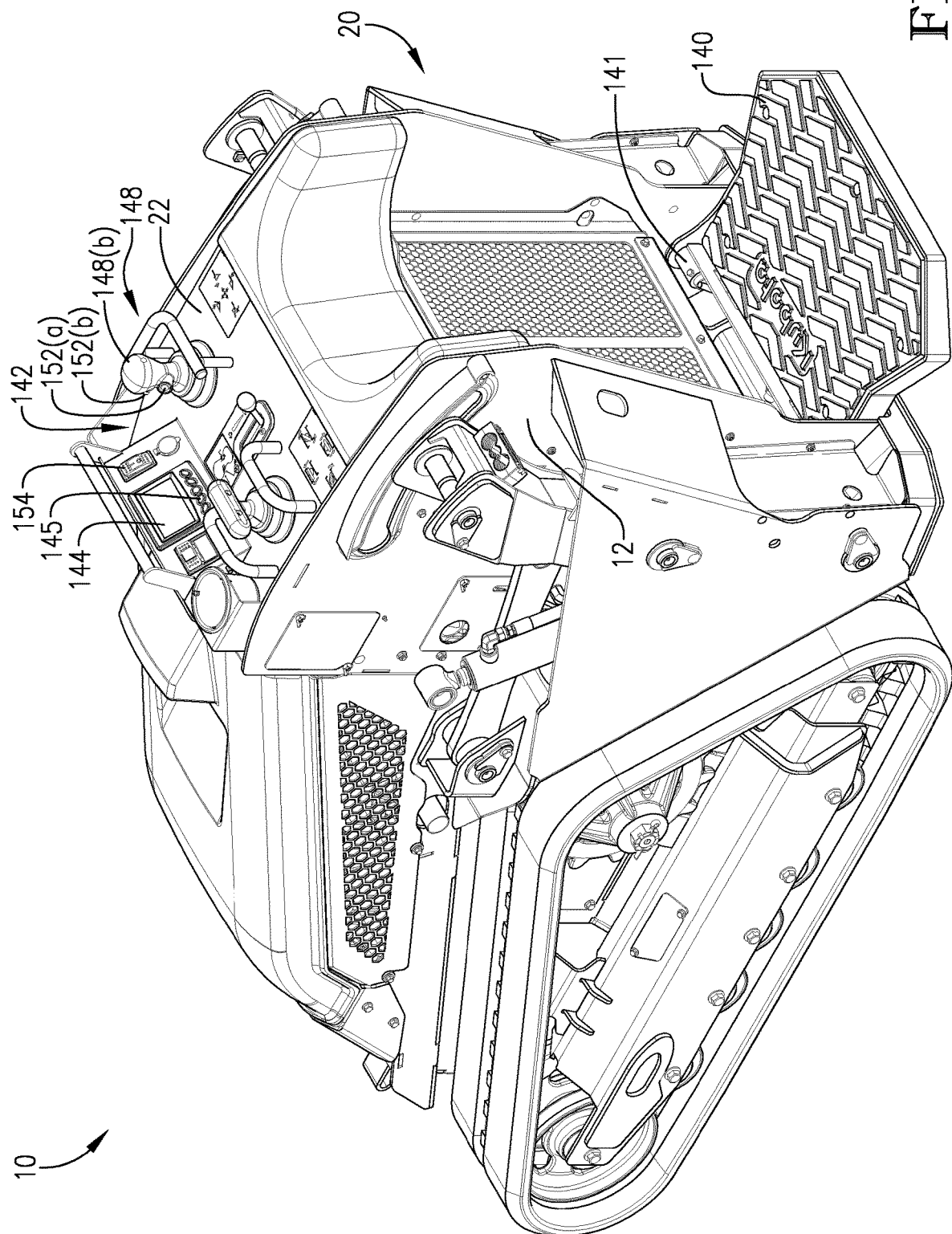
FIG. 26 is another rear perspective view of the loader from FIGS. 1-6, particularly illustrating a control station located at a rear of the compact utility loader.
Figure 27:
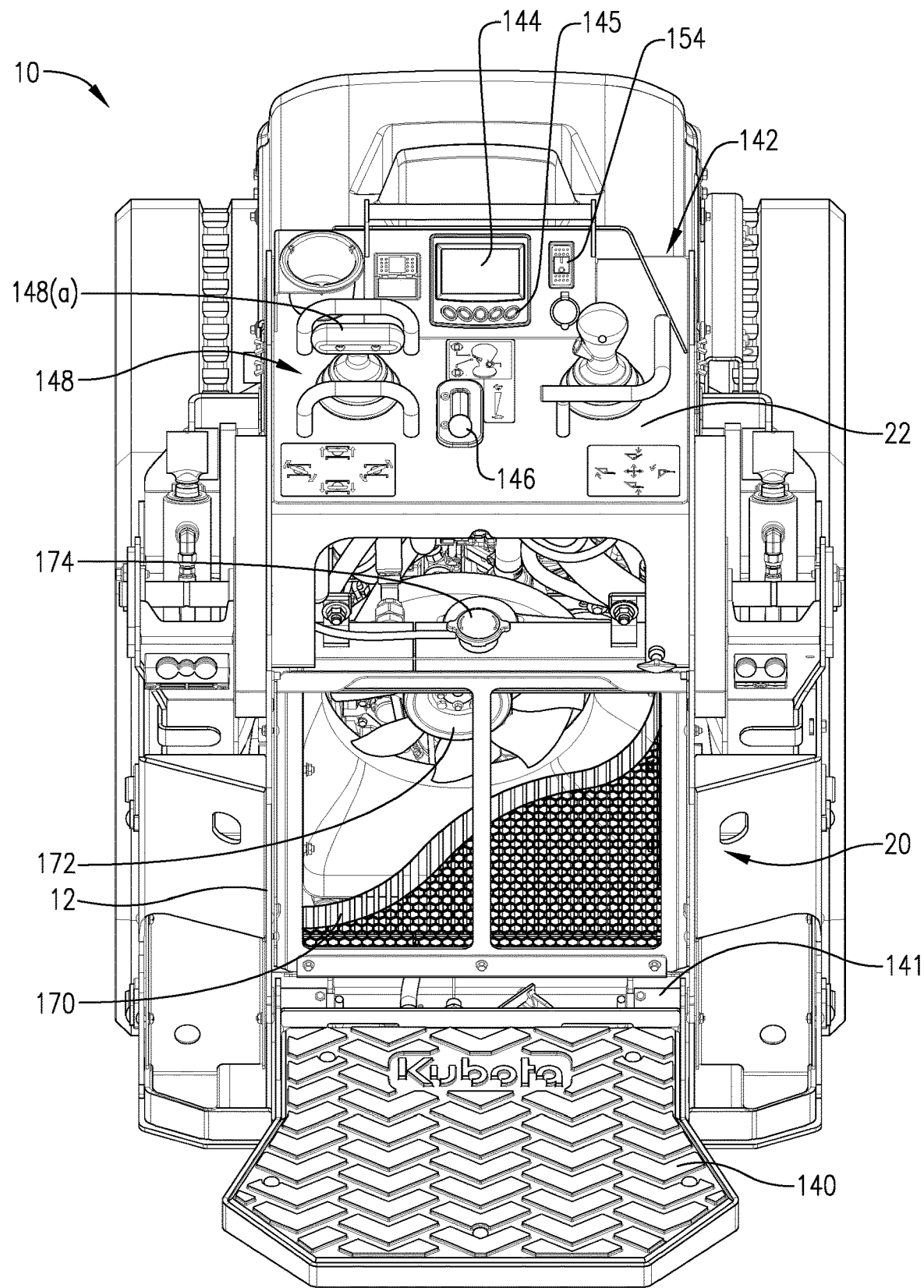
FIG. 27 is a rear elevation view of the compact utility loader from FIG. 26, with a portion of a radiator cut away to illustrate a fan positioned below a control panel of the compact utility loader.

The control panel 22 illustrated in FIGS. 26 and 27 may be part of an enhanced user interface and control system ("UICS") 142 that includes the control panel 22 and a plurality of control elements, such as buttons, switches, levers, joysticks, graphical display, etc., which collectively permit the operator to control operation of the loader 10. In more detail, the UICS 142 of the loader 10 may comprise a graphic display 144, one or more control elements 145 (e.g., buttons, switches, etc.), an engine speed lever 146, as well as one or more joystick controls 148. As noted above, the UICS 142 is positioned at a rear of the loader 10, such that an operator can stand at the rear of the loader 10 to operate the loader 10. Although the operator will normally stand on the platform 140 when operating the loader 10, in some embodiments, the loader 10 may be configured such that the operator can stand on the ground behind the loader 10 and reach the UICS 142 to control operation of the loader 10.

Figure 28:
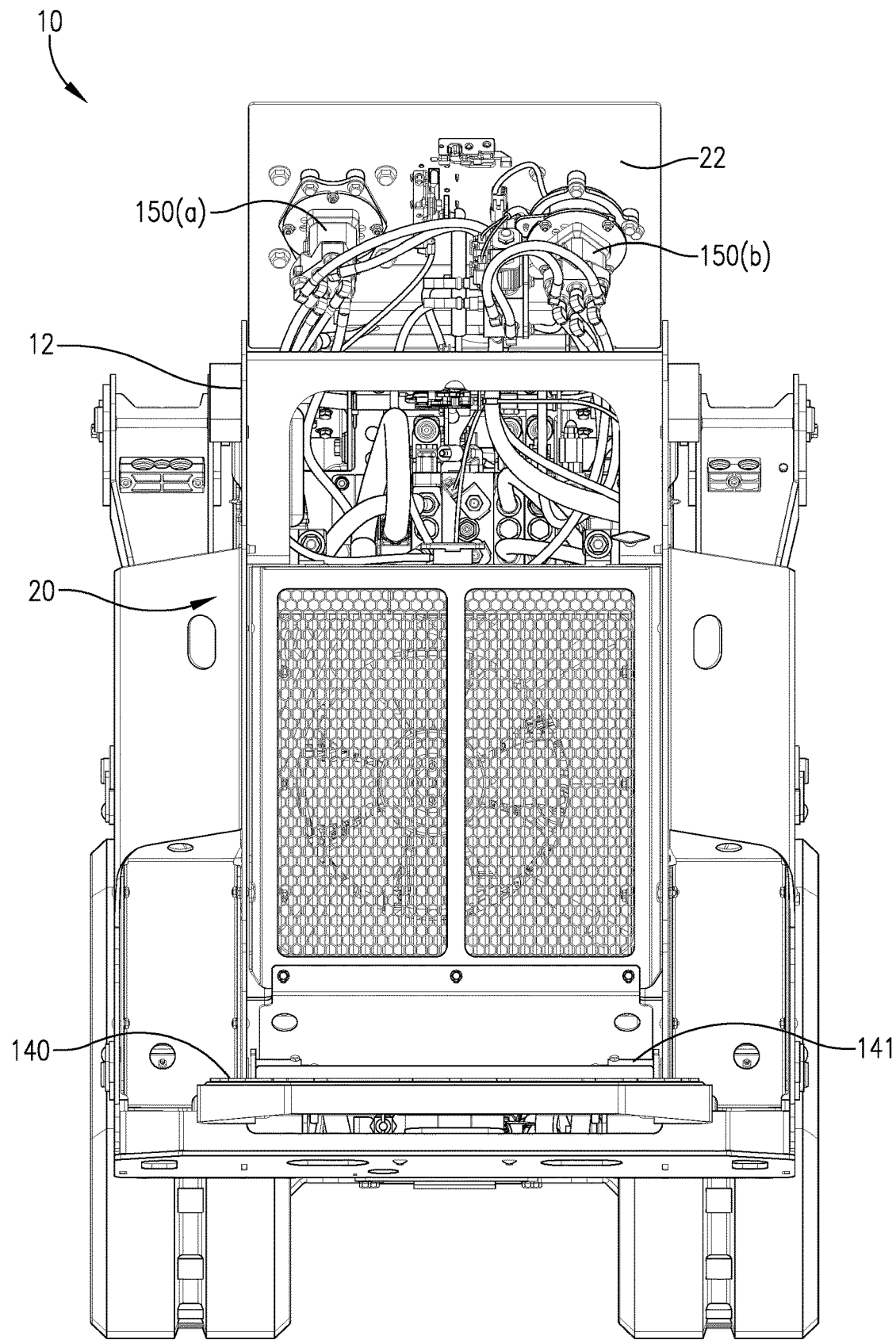
FIG. 28 is another rear elevation view of the compact utility loader from FIG. 27, with the control panel raised to illustrate pilot control valve assemblies associated with joysticks of the compact utility loader.

Beginning with the joystick controls 148, and with reference to FIG. 27, the UICS 142 may include a drive joystick 148(a), which is configured to control actuation of the tracks 40 (e.g., via the hydraulic motors 50 and the sprockets 44) for controlling overall movement (e.g., travel or drive movement) of the loader 10. In more detail, the drive joystick 148(a) may extend upward from the control panel 22, such that an operator may grasp and shift the drive joystick 148(a) so as to cause a corresponding movement of the loader 10. In more detail, as illustrated in FIG. 28, a pilot control valve assembly 150(a) may be secured to a bottom of the drive joystick 148(a). In general, the pilot control valve assembly 150(a) may be positioned below the control panel 22. The pilot control valve assemblies 150(a) and (b) are generally configured to distribute hydraulic fluid to other components of the loader's 10 hydraulic system based on inputs received on the joysticks 148(*a*) and (*b*). As such, hydraulic lines may extend from the pilot control valve assembly 150(*a*) to the hydraulic pump 54 (which provides hydraulic power to the hydraulic motors 50, such as perhaps via the hydrostatic transmission of the pump 54) such that actuation of the drive joystick 148(*a*) will manipulate the pilot control valve assembly 150(*a*) in a manner that causes a required function of the hydraulic motors 50 to cause actuation of the sprockets 44 and tracks 40, as well as overall movement of the loader 10.

For example, shifting the drive joystick 148(*a*) forward will cause the pilot control valve assembly 150(*a*) to provide a control signal (via the hydraulic lines) to the hydraulic pump 54 (and/or the hydrostatic transmission of the pump 54) to provide hydraulic fluid to each of the left side and right side hydraulic motors 50 in a manner that will cause the left side and right side sprockets 44 to rotate in a manner that correspondingly causes the left side and right side tracks 40 to rotate in a forward direction. As a result, the loader 10 will move forward. The amount by which the operator shifts the drive joystick 148(*a*) forward may determine the speed by which the loader 10 travels in the forward direction. Similarly, shifting the drive joystick 148(*a*) rearward will cause the pilot control valve assembly 150(*a*) to provide a control signal (via the hydraulic lines) to the hydraulic pump 54 (and/or the hydrostatic transmission of the pump 54) to provide hydraulic fluid to each of the left side and right side hydraulic motors 50 in a manner that will cause the left side and right side sprockets 44 to rotate in a manner that correspondingly causes the left side and right side tracks 40 to rotate in a rearward direction. As a result, the loader 10 will move rearward. The amount by which the operator shifts the drive joystick 148(*a*) rearward may determine the speed by which the loader 10 travels in the rearward direction. Rotating the drive joystick 148(*a*) clockwise (when viewing from above the control panel 22) will cause the pilot control valve assembly 150(*a*) to provide (i) a control signal (via the hydraulic lines) to the hydraulic pump 54 (and/or the hydrostatic transmission of the pump 54) so as to provide hydraulic fluid to the left side hydraulic motor 50 to rotate the left side sprocket 44 in a manner to cause the left side track 40 to rotate in a forward direction, and (ii) a control signal (via the hydraulic lines) to the hydraulic pump 54 (and/or the hydrostatic transmission of the pump 54) so as to provide hydraulic fluid to the right side hydraulic motor 50 to rotate the right side sprocket 44 in a manner to cause the right side track 40 to rotate in a rearward direction. As such, the loader 10 will turn in a rightward direction. The amount by which the operator rotates the drive joystick 148(*a*) clockwise may determine the speed or degree by which the loader 10 turns rightward. Similarly, rotating the drive joystick 148(*a*) counter-clockwise (when viewing from above the control panel 22) will cause the pilot control valve assembly 150(*a*) to provide (i) a control signal (via the hydraulic lines) to the hydraulic pump 54 (and/or the hydrostatic transmission of the pump 54) so as to provide hydraulic fluid to the left side hydraulic motor 50 to rotate the left side sprocket 44 in a manner to cause the left side track 40 to rotate in a rearward direction, and (ii) a control signal (via the hydraulic lines) to the hydraulic pump 54 (and/or the hydrostatic transmission of the pump 54) so as to provide hydraulic fluid to the right side hydraulic motor 50 to rotate the right side sprocket 44 in a manner to cause the right side track 40 to rotate in a forward direction. As such, the loader 10 turns in a leftward direction. The amount by which the operator rotates the drive joystick 148(*a*) counter-clockwise may determine the speed or degree by which the loader 10 turns leftward.

The UICS 142 may additionally include a loader arm & attachment ("LA&A") joystick 148(*b*) for controlling actuation of the loader arms 16 (e.g., raising and lowering) and various hydraulically-operated functions of the attachment 18 that may be supported on the front of the loader arms 16. For example, the hydraulically-operated functions may include a tilt function for buckets (e.g., as caused by a tilt actuator, such as the hydraulic tilt cylinder 151 illustrated in FIG. 14) or auxiliary hydraulic functions for other hydraulically-operated attachments 18 such as, e.g., bit rotation of a drill, bit actuation of a jack-hammer, rotation of a blade for a saw, rotation of multiple blades for a rotary cutter, brush rotation of a sweeper, etc. In more detail, as shown in FIGS. 26 and 27, the LA&A joystick 148(*b*) may extend upward from the control panel 22, such that an operator may grasp and shift the LA&A joystick 148(*b*) so as to cause a corresponding movement of the loader arms 16 and/or the associated attachment 18. As illustrated in FIG. 28, a pilot control valve assembly 150(*b*) may be secured to a bottom of the LA&A joystick 148(*b*). In general, the pilot control valve assembly 150(*b*) may be positioned below the control panel 22. Hydraulic lines may extend from the pilot control valve assembly 150(*b*) to the hydraulic pump 54 which provides hydraulic power to the actuators 76 (e.g., hydraulic cylinders) associated with each of the loader arms 16, such that actuation of the LA&A joystick 148(*b*) will manipulate the pilot control valve assembly 150(*b*) in a manner that causes a corresponding raising/lowering of the loader arms 16. For example, shifting the LA&A joystick 148(*b*) forward will cause the pilot control valve assembly 150(*b*) to provide a control signal (via the hydraulic lines) to the hydraulic pump 54 so as to provide hydraulic fluid to/from each of the left side and right side actuators 76 in a manner that will cause the left side and right side loader arms 16 to lower. Similarly, shifting the LA&A joystick 148(*b*) rearward will cause the pilot control valve assembly 150(*b*) to provide a control signal (via the hydraulic lines) to the hydraulic pump 54 so as to provide hydraulic fluid to/from each of the left side and right side actuators 76 in a manner that will cause the left side and right side loader arms 16 to raise.

In addition, the LA&A joystick 148(*b*) may include one or more control elements (e.g., buttons or switches) to facilitate control of the various hydraulic functionalities of the attachments 18 supported on the forward end of the loader arms 16. For example, as show in FIG. 26, the LA&A joystick 148(*b*) may include a float button 152(*a*) configured to permit the loader arms 16 (or the hitch pins 68 or the attachment 18 attached to the front of the loader arms 16) to float along undulating ground terrain. Selection of the float button 152(*a*) by the operator, will send a signal to open a float control valve that provides a path for fluid in the loader arms to vent to the loader's 10 hydraulic tank in a manner that will cause the left side and right side loader arms 16 (or the hitch pins 68 or the attachment 18 attached to the front of the loader arms 16) to remain at a specified height above the ground regardless of whether the ground is uneven, undulating, etc. As a result, the attachment 18 (or the hitch pins 68 or the attachment 18 attached to the front of the loader arms 16) being supported by the loader arms 16 will "float" above and/or within the ground during operation and/or movement of the loader 10. Stated differently, the loader arms 16, the associated attachment 18, and/or the hitch pins 68 will follow the contour of the ground over which the loader 10 is travelling. If the loader arms 16 are in the raised position and the float button 152(*a*) is selected, the loader arms 16 will lower until the loader arms 16 (and the attachment associated therewith) are positioned at the specified height and/or are floating along the contour of the ground, where they will remain during operation of the loader 10 until the operator further shifts the LA&A 148(*b*) joystick to change the height of the loader arms 16. Specifically, once the loader arms 16 are provided in the float configuration, the loader arms 16 will remain in such float configuration until the float button 152(*a*) is selected for a second, consecutive time or until the loader arms 16 are raised by the operator shifting the LA&A 148(*b*) joystick (e.g., shifting the LA&A 148(*b*) joystick in a rearward direction).

The LA&A joystick 148(*b*) can further include one or more auxiliary buttons 152(*b*) for activating the auxiliary hydraulic functions of the attachment (if applicable) associated with the loader 10. In some embodiments, the LA&A joystick 148(*b*) will include two auxiliary buttons 152(*b*), as illustrated in FIGS. 11 and 13. In some embodiments, the auxiliary buttons 152(*b*) will be configured to activate the hydraulic functions of the attachment 18 in either an "On-Demand" mode or a "Continuous" mode. When in the On-Demand mode, selection (e.g., depressing) of one of the auxiliary buttons 152(*b*) will cause the hydraulic auxiliary functions of the attachment 18 to operate. Releasing the same auxiliary button 152(*b*) will cause the hydraulic auxiliary functions of the attachment 18 to halt operation. In embodiments in which the attachment 18 is a bucket, the selection (e.g., depressing) of one of the auxiliary buttons 152(*b*) may cause the bucket to tilt downward (via actuation of the tilt actuator 151), while selection (e.g., depressing) of the other auxiliary button 152(*b*) operate may cause the bucket to tilt upward (via actuation of the tilt actuator 151). In contrast, in other embodiments, the auxiliary buttons 152(*b*) may be configured in a "Continuous" mode, whereby the hydraulic auxiliary functions of the attachment 18 begin operating upon selection of (e.g., depressing) one of the auxiliary buttons 152(*b*) and continue functioning until the operator selects (e.g., depresses) the same auxiliary button 152(*b*) a second, consecutive time.

In more detail, when in the On-Demand mode, selection of a first auxiliary button 152(*b*) may cause the pilot control valve assembly 150(*b*) to provide a control signal (via the hydraulic lines) to the hydraulic pump 54 so as to provide hydraulic fluid to the attachment 18 flowing in a first flow direction such that the hydraulic auxiliary functions of the attachment 18 are operated in a first direction (e.g., forward, clockwise, etc.). When the operator releases the first auxiliary button 152(*b*), the pilot control valve assembly 150(*b*) will provide a control signal (via the hydraulic lines) to the hydraulic pump 54 to stop providing hydraulic fluid to the attachment 18 such that the hydraulic auxiliary functions of the attachment 18 are halted. Correspondingly, when in the On-Demand mode, selection of a second auxiliary button 152(*b*) may cause the pilot control valve assembly 150(*b*) to provide a control signal (via the hydraulic lines) to the hydraulic pump 54 so as to provide hydraulic fluid to flow to the attachment 18 in a second flow direction such that the hydraulic functions of the attachment are operated in a second, opposite direction (e.g., reverse, counter-clockwise, etc.). When the operator releases the second auxiliary button 152(*b*), the pilot control valve assembly 150(*b*) will provide a control signal (via the hydraulic lines) to the hydraulic pump 54 to stop providing hydraulic fluid to the attachment 18 such that the hydraulic auxiliary functions of the attachment 18 are halted.

As was described above, when in the Continuous mode, selection of the first auxiliary button 152(*b*) may cause the pilot control valve assembly 150(*b*) to provide a control signal (via the hydraulic lines) to the hydraulic pump 54 so as to provide hydraulic fluid to the attachment 18 flowing in a first flow direction such that the hydraulic auxiliary functions of the attachment 18 are operated in the first direction (e.g., forward, clockwise, etc.). The hydraulic fluid will continue flowing to the attachment 18 in the first direction, such that the attachment 18 continues operating in the first direction until the operator selects the first auxiliary button 152(*b*) for a subsequent, second time. As a result, the pilot control valve assembly 150(*b*) will provide a control signal (via the hydraulic lines) to the hydraulic pump 54 to stop providing hydraulic fluid to the attachment 18 such that the hydraulic auxiliary functions of the attachment 18 are halted. Correspondingly, when in the Continuous mode, selection of the second auxiliary button 152(*b*) may cause the pilot control valve assembly 150(*b*) to provide a control signal (via the hydraulic lines) to the hydraulic pump 54 so as to provide hydraulic fluid to flow to the attachment 18 in the second flow direction such that the hydraulic functions of the attachment are operated in the second, opposite direction (e.g., reverse, counter-clockwise, etc.). The hydraulic fluid will continue flowing to the attachment 18 in the second direction, such that the attachment 18 continues operating in the second direction until the operator selects the second auxiliary button 152(*b*) for a subsequent, second time. As a result, the pilot control valve assembly 150(*b*) will provide a control signal (via the hydraulic lines) to the hydraulic pump 54 to stop providing hydraulic fluid to the attachment 18 such that the hydraulic auxiliary functions of the attachment 18 are halted.

In some embodiments, the UICS 142 may permit the operator to change the functionality of the auxiliary buttons 152(*b*) between the On-Demand mode and the Continuous mode via the graphic display 144 and/or the associated control elements 145, as will described in more detail below.

In some embodiments, the loader 10 may include proportional valves associated with each of the auxiliary buttons 152(*b*). Such proportional valves may be included within the pilot control valve assembly 150(*b*) or they may be included in the LA&A joystick 148(*b*) or a separate hydraulic control component. The proportional valves are configured to provide hydraulic fluid to the attachment 18 in an amount proportional to the magnitude of the depression of the auxiliary buttons 152(*b*). It is understood that increasing the amount of hydraulic fluid to the attachment 18 will increase the operating capabilities (e.g., power or speed) of the auxiliary functions being performed by the attachment 18.

For example, it may not be preferable to provide a maximum amount of hydraulic fluid to the attachment 18 upon any magnitude of depression of the auxiliary buttons 152(*b*). As such, the use of proportional valves may allow the amount of hydraulic fluid to the attachment 18 to vary (e.g., linearly) based on the magnitude of the depression. The ratio of the magnitude of depression of the auxiliary buttons 152(*b*) and the amount of hydraulic fluid provided to the attachment 18 may be defined by a scaling factor. In some embodiments, the UICS 142 may permit the operator to change the scaling factor, as necessary. Furthermore, in some embodiments, each of the auxiliary buttons 152(*b*) may have a deadband depression level, whereby depressing the auxiliary buttons 152(*b*) beyond the deadband depression level cause the pilot control valve assembly 150(*b*) to provide a control signal (via the hydraulic lines) to the hydraulic pump 54 to stop providing hydraulic fluid to the attachment 18 such that the hydraulic auxiliary functions of the attachment 18 are halted For example, in some embodiments, the deadband depression level can be set at 70% of the maximum depression level. As such, depressing one or both the auxiliary buttons 152(b) more than 70% will halt the hydraulic auxiliary functions of the attachment 18. However, depressing the auxiliary buttons 152(b) between 0 and 70% will cause the attachments 18 to operate at between 0 and 100% of the maximum operating capabilities of the attachment 18 depending on the scaling factor set by the operator. In some additional embodiments, when in the Continuous mode, the auxiliary buttons 152(b) will need to be depressed at least 25%, at least 30%, at least 35%, at least 40%, at least 45%, or at least 50% before the hydraulic auxiliary function of the attachment 18 is initiated.

Turning to the graphic display 144 of the UICS 142 in more detail, the graphic display 144 may comprise an electronic display, such as a cathode ray tube, liquid crystal display, plasma, or touch screen that is operable to display visual graphics, images, text, etc. In some embodiments, the graphic display 144 may be configured to display colored information. In certain embodiments, the loader 10 may include a control system that controls the UICS 142 (including the graphic display 144) and various other functions and features of the loader 10. The control system may include one or more memory elements, such as non-transitory computer readable media and/or firmware, with a computer program stored thereon. The control system may also include one or more processing elements, such as processors, CPUs, FPGAs, etc., which are configured to execute the computer program to perform various functions and features of the loader 10. It should be understood that certain of the loader's 10 functions and features discussed above and below are performed by execution of the computer program by the processing elements.

For example, the control system may be configured to (by the processing elements executing the computer program stored on the memory elements) (i) obtain information from various components of the loader 10 (e.g., via sensors, actuators, timers, clocks, etc.) so as to present such information to the operator via the graphic display 144, and (ii) receive instructions from the operator (e.g., via the graphic display 144, the control elements 145, the engine speed lever 146, and/or the joysticks 148) to control various operations of the loader 10. For example, the control system may permit the graphic display 144 to present various graphical user interfaces (GUIs) that provides information to the operator and/or that facilitate interaction and control of the loader 10 by the operator. In embodiments in which the graphic display 144 is a touchscreen, the GUIs enable the operator to interact with the loader 10 by touching or pointing at display areas of the GUI. In some other embodiments, the operator will interact with the GUIs and/or the loader by manipulating the control elements 145 that are associated with the graphic display 144.

Figure 29:
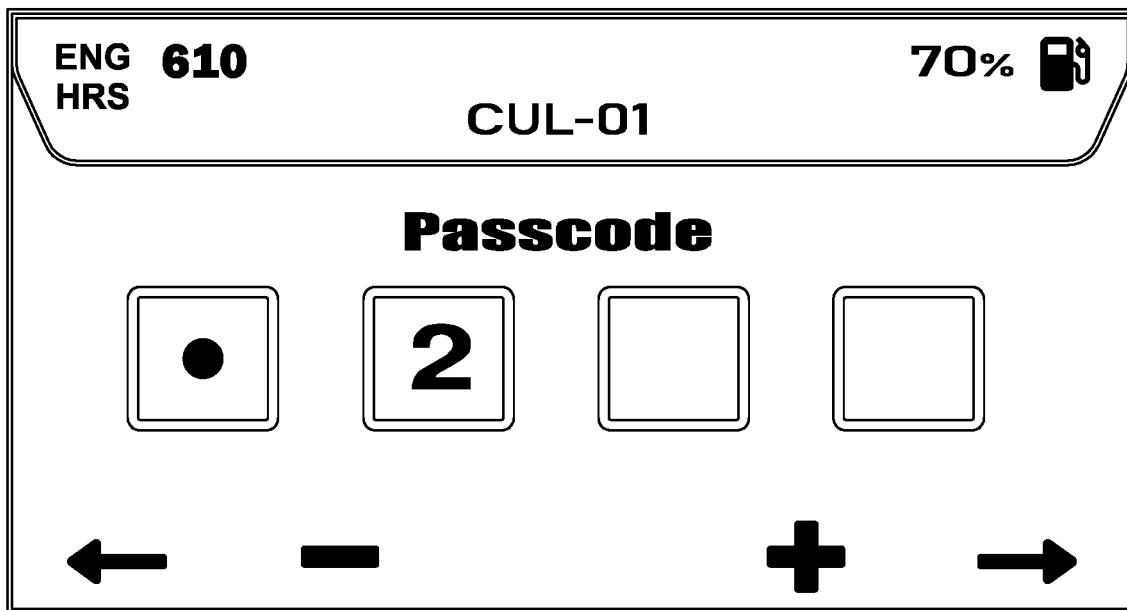
FIG. 29 is graphical user interface in the form of a Login Screen that can be presented on a graphic display of the compact utility loader of embodiments of the present invention.

FIGS. 29-32 present various GUIs, which embodiments allow to be displayed via the graphic display 144, and which provide information to the operator and/or that allow the operator to control various functions of the loader 10. Such GUIs enhance the operator's control of the loader 10. For example, as shown in FIG. 29, the graphic display 144 of the UICS 142 may present a Login Screen, which prompts the operator for a passcode before the loader 10 can be started or operated. The Login Screen may be activated upon a master switch 154 (See FIGS. 26 and 27) of the UICS 142 being activated. Such activation of the master switch 154 may provide for electrical power to be supplied from an electrical power source (e.g., a 12 Volt battery) of the loader 10 to the graphic display 144 (and to various other components of the loader 10, such as the control system). It should be noted that the master switch 154 may be deactivated so as to electrically disconnect the various components of the loader 10 from the electrical power source. In some embodiments, deactivation of the master switch 154 may also turn off the engine 52 (if the engine is on). In some embodiments, the loader 10 may include a power time-out, whereby if the master switch 154 is activated but the engine is not started within a pre-established timeframe (e.g., 30 minutes) from the master switch 154 activation, the master switch 154 is automatically deactivated. Both engine 52 shutdown and the switch turned on resets the power time-out timer.

Returning to the Login Screen, the operator is prompted to enter a passcode, which must be validated before operating the loader 10. The passcode may be a numeric, alphabetic, and/or alphanumeric code, such as 4 or 6-digit code. Such a passcode may be entered via the associated control elements 145 (See FIGS. 26 and 27) or directly via the graphic display 144 in embodiments in which the graphic display 144 is a touchscreen. Embodiments provide for the loader 10 to be associated with one or more passcodes associated with various types of user accounts (e.g., operator accounts, owner account, and master account). For example, each loader 10 may include a plurality of operator accounts, which can each be created for an individual operator that may require use of the loader 10 for normal operations. Each operator may be assigned his/her own unique passcode to access his/her operator account. In addition, the owner of the loader 10 (which may be a business entity) may have an owner account which can manage each of the operator accounts. The owner account may have its own passcode with which to access various functions and features of the loader 10. For example, an owner may use the owner account to establish, recover, change, or delete each of the operator accounts and associated passcodes (i.e., operator accounts may not be permitted to create, re-set, or recover their own passcodes). In addition, some other specific functions and features of the loader 10 may only be accessed and changed via the owner account. Such specific functions and features may include the resetting of service/maintenance reminders and warning alerts, which are discussed in more detail below. Furthermore, the loader 10 may be associated with a master account, which may be used to recover the owner account passcode, if necessary. The master account may be established by the manufacturer of the loader 10. In some embodiments, the master account passcode may not be changed. In some embodiments, when changing passcodes (e.g., when the owner account is used to change the passcode for an operator account), embodiments may provide for the new passcode to be randomly generated.

Figure 30:
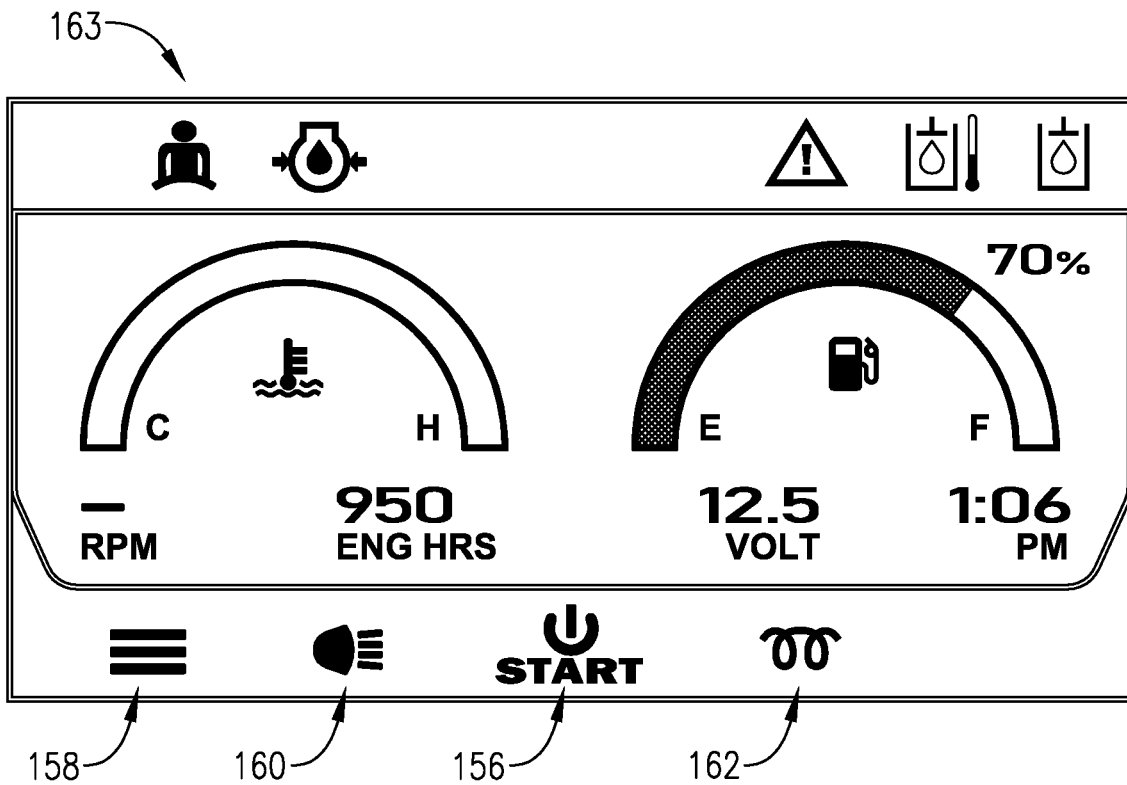
FIG. 30 is a graphical user interface in the form of an initial version of an Operations Screen that can be presented on a graphic display of the compact utility loader of embodiments of the present invention.

In some embodiments, the Login Screen may also present other relevant information of the loader 10, such as current number of engine hours operated by the loader 10, current fuel level, etc. Before successful entry of a passcode, various functions and features of the loader 10 may be disabled. However, successful entry of the passcode (e.g., at the Login Screen) may unlock one or more additional functions and features of the UICS 142, or of the loader 10 more generally. For example, as shown in FIG. 30, successful entry of the passcode may allow the graphic display 144 to present a GUI in the form of an Operations Screen that presents various operational information of the loader 10 to the operator. The Operations Screen may also present indications of available functions of the loader 10 that the operator may carry out. Such available functions indicated on the Operations Screen may be selected via associated control elements 145 or through the graphic display 144 itself (e.g., via touchscreen). For example, the operator may be able to start the engine 52 of the loader 10 by actuating a control element 145 associated with a START icon 156 of the Operations Screen. In some embodiments, upon successful entry of the operator's passcode at the Login Screen, the loader 10 will activate the fuel pump for a pre-established timeframe (e.g., 1 minute), such that the operator will be required start the engine 52 within the pre-established timeframe or the Login Screen will be re-displayed and the operator will be required to successfully re-enter the passcode.

The Operations Screen may have multiple versions depending on the state of the loader 10. For instance, the Operations Screen shown in FIG. 30 may be presented after a successful entry of the operator's password but prior to the engine 52 of the loader 10 being started. As such, the START icon 156 is presented on the Operations Screen indicative of the operator's ability to start the engine 52. The Operations Screen may additionally display a MENU icon 158, which when selected via the associated control elements 145 or through the graphic display 144 itself (e.g., touchscreen) will cause the graphic display 144 to display a Menu Screen, which is discussed in more detail below. The Operations Screen may additionally display a Work Light icon 160, which when selected via the associated control elements 145 or through the graphic display 144 itself (e.g., touchscreen) will cause the loader's 10 work lights to toggle on and off. When the work lights are on, the Work Light icon 160 may be highlighted with a color (e.g., blue), whereas when the work lights are off, the Work Light icon 160 may not have a highlighted color (e.g., the Work Light icon 160 may be uncolored or colored gray).

Furthermore, the Operations Screen may additionally display a Glow Plugs icon 162, which when selected via the associated control elements 145 or through the graphic display 144 itself (e.g., touchscreen) will cause the loader's 10 glow plugs to toggle on and off. Such glow plugs may be used to pre-heat the engine 52 in preparation for starting the engine 52. Activating the glow plugs (e.g., via the control elements 145 or touchscreen) may activate the glow plugs for a pre-selected time period (e.g., 5 seconds). Re-activating the glow plugs (e.g., by re-selecting the control elements 145 or touchscreen) may add another pre-selected time period (e.g., 5 seconds) to the glow plug activation. In some embodiments, the glow plugs may only be activated and/or re-activated (e.g., by selecting the control elements 145 or touchscreen) six consecutive times so as to limit the total active duration to a maximum "on-time time-limit." For example, in embodiments in which the pre-selected time period is five seconds, the maximum on-time time-limit of the glow plugs will be thirty seconds (i.e., 5×6=30). However, in some embodiments, after the glow plug activation time has reached the maximum on-time time-limit, the operator may be able to reactivate the glow plugs if necessary. When the glow plugs are on, the Glow Plug icon 162 may be highlighted with a color (e.g., green), whereas when the glow plugs are off, the Glow Plug icon 162 may not have a highlighted color (e.g., the Glow Plug icon 162 may uncolored or may be colored gray).

In addition to the above, and remaining with the Operations Screen of FIG. 30, embodiments provide for the Operations Screen to display other types of information related to the loader 10. For example, the Operations Screen may display a Temperature Gauge configured to present information indicative of a temperature of the engine 52 (such as may be obtained from a temperature sensor associated with the engine 52). In some embodiments, the Temperature Gauge may present information indicative of a temperature of the coolant used by the engine 52. The Temperature Gauge may present relative values of the engine 52 temperature or may present digital values (e.g., in Fahrenheit or Celsius). The Operations Screen may also present a Temperature Warning icon, which may be a warning alert that is activated to a highlighted color (e.g., red) when the engine 52 temperature exceeds a specified threshold (e.g., "210" degrees Fahrenheit). In contrast, when the engine temperature is below the specified threshold, the Temperature Warning icon may not be visible or it may not have a highlighted color (e.g., the Temperature Warning icon may be uncolored or may be colored gray). Furthermore, in some embodiments, the Temperature Warning icon may flash when the engine 52 temperature exceeds a maximum specified threshold (e.g., "220" degrees Fahrenheit), so as to indicate to the operator that the loader 10 may be overheating. In some embodiments, when the engine 52 temperature has exceeded a maximum specified threshold, the engine 52 may automatically be shut off by the loader's control system.

The Operations Screen may also display a Fuel Gauge configured to present information indicative of the fuel level of the loader 10. For instance, the engine 52 of the loader 10 may operate on diesel fuel, such that the loader 10 includes a fuel tank for supplying fuel (via a fuel pump) to the engine 52. In some embodiments, the Fuel Gauge may present relative values (e.g., a percentage of a full fuel tank) or may present digital values (e.g., a number of gallons). The Operations Screen may also present a Fuel Warning icon is activated to a highlighted color (e.g., red) when the fuel level falls below a specified threshold (e.g., below ten percent full), whereas when the fuel level is above the specified threshold, the Fuel Warning icon may not be visible or it may not have a highlighted color (e.g., the Fuel Warning icon may uncolored or may be colored gray). Furthermore, in some embodiments, the Fuel Warning icon may flash when the fuel level falls below a minimum specified threshold (e.g., below five percent full), so as to indicate to the operator that the loader 10 may soon run out of fuel and needs to be re-filled. The fuel level may be read from a fuel level sensor (e.g., a float sensor) located within, or otherwise associated with, the fuel tank of the loader 10. In some embodiments, the data obtained from the fuel level sensor may be averaged so as to avoid any erroneous readings that may result when the loader 10 is operating on an incline or over undulating terrain. In addition, each time the master switch 156 is turned on, the average value of the fuel level sensor data may be reset to a starting average equal to an instantaneous value of the fuel level so as to prevent any lag in immediately reading the fuel level.

The Operations Screen may also display RPM data indicative of the current rotations per minute (RPMs) of the engine 52. In some embodiments, the RPM data may be presented as a digital value (e.g., a number rotations per minute). The RPM data will generally only show values when the engine 52 has been turned on and is running. The RPMs of the engine 52 may be increased and decreased by the operator's actuation of the engine speed lever 146. For example, pushing the lever 146 forward may increase the RPMs of the engine 52, while pulling the lever 146 rearward may decrease the RPMs of the engine 52.

Furthermore, the Operations Screen may display Engine Hour data indicative of the total number of hours the engine 52 has operated. In some embodiments, the Engine Hour data may be obtained from a timer activated when the engine 52 is turned on. The Engine Hour data may be presented as a digital value (e.g., a number hours). The Operations Screen may also display Power Source data indicative of the current voltage of the loader's 10 electrical power source (e.g., a 12 Volt battery). The Power Source data may be obtained from a voltmeter associated with the loader's 10 power source. In some embodiments, the Power Source data may be presented as a digital value (e.g., a number Volts). In certain embodiments, the Power Source data may be highlighted a particular color (e.g., red) or may flash if the power level of the loader's power source falls below a pre-selected value (e.g., the pre-selected value may be 11.5 Volts when the engine 52 is on and 13.0 Volts when the engine is off). In additional embodiments, the Operations Screen may further present Clock data indicative of the time of day.

In certain embodiments, the Operations Screen may provide various other indicators and alerts for the operator. For example, the Operations Screen may present an Operator Presence icon 163 indicative of whether or not the operator is positioned on the platform 140. Such a determination may be made by the presence sensors 141, which was previously described. The Operator Presence icon 163 may be highlighted with a red color by default when an operator is not positioned on and supported by the platform 140. However, the Operator Presence icon 163 may be changed to a green color when the presence sensor 141 associated with the platform 140 indicates that the operator is positioned on and supported by the platform 140 (i.e., the weight of the operator forces the platform 140 downward, triggering the presence sensor 141). In some embodiments, a buffer period (e.g., one second) may be used when analyzing data obtained from the presence sensor 141 so as to ensure that the presence sensor 141 does not inadvertently indicate that an operator is not on the platform 140 in cases of bouncing or shaking of the loader 10 (such as may cause the operator's weight to momentarily shift upward away from the platform 140). As will be described in more detail below, certain components of the hydraulic system of the loader 10 may not be operated when an operator is not present on the platform 140. Thus, the buffer period prevents problems with certain hydraulic functions of the loader 10 being disabled if the loader 10 drives over undulating terrain causing the presence sensor 141 to improperly indicate (even for short, impulse moment) that the operator is not present on the platform 140. However, as will be described in more detail below, in some embodiments, the loader 10 will include an override feature that permits certain hydraulic functions to be used even when an operator is not present on the platform 140 (e.g., when the operator is standing or walking behind or beside the loader 10).

The Operations Screen may also present a Service Required icon, which functions as a service reminder if the loader 10 is due (or is overdue) for services or maintenance to be performed. Examples of such services or maintenance include replacement of air filter, replacement of engine 52 oil and filter, tension adjustment of fan belt, check and/or replace fuel filter, replacement of hydraulic oil and filter, replacement of hydraulic tank breather, engine coolant replacement, etc. Embodiments provide for each of the service reminders to have individualized time periods or operational periods. For instance, the engine 52 oil and filter may require replacement every two hundred engine 52 hours. Thus, after two hundred engine 52 hours, the Service Required icon may be activated indicating that the engine 52 oil and filter need to be replaced. However, other service reminders may be based on standard time periods, such as fan belts needing to be replaced after one year. As was described previously, the owner of the loader 10 (via use of the owner's password) may reset (i.e., deactivate) the Service Required icon upon the service/maintenance being performed (e.g., after the engine 52 oil and filter being changed and/or the fan belt being replaced). The individualized time periods or operational periods within which the services are required to be performed (i.e., before activation of the Service Required icon) may also be set using the owner account. As such, the operator account may not, in some embodiments, be used to re-set the Service Reminder icon or to establish the individualized time periods or operational periods for the service reminders.

In addition to the service reminders, the Operations Screen may provide other indications, such as warning alerts, in instances where the loader 10 is experiencing a problem malfunction. For example, the Operations Screen present a warning alert in the form of an Air Cleaner Warning icon (e.g., highlighted in the color red) when the loader's 10 air filter/cleaner is sensed to be restricted (e.g., via an air cleaner restriction sensor associated with the loader's air filter/cleaner). Similarly, the Operations Screen may provide a warning alert in the form of a Low Engine Oil Pressure Warning icon upon the loader 10 experiencing a drop in engine 52 oil pressure. In addition to the Low Engine Oil Pressure Warning icon, the Operations Screen may present the statement "WARNING: LOW OIL PRESSURE. When safe, shutdown immediately to avoid engine damage," if the engine 52 oil pressure is sensed (e.g., via an oil pressure sensor associated with the engine 52) to have dropped below a normal operating pressure while the engine 52 is running. If the low engine 52 oil pressure is sensed for a pre-established time period (e.g., six seconds), embodiments provides for the loader's 10 control system to automatically shutdown the engine 52. In addition, the Operations Screen may present a new message stating "Engine auto-shutdown due to low oil pressure." This new message may remain on the Operations Screen until the operator selects a control element 145 (or the touchscreen) acknowledging the low engine 52 oil pressure.

Figure 31:
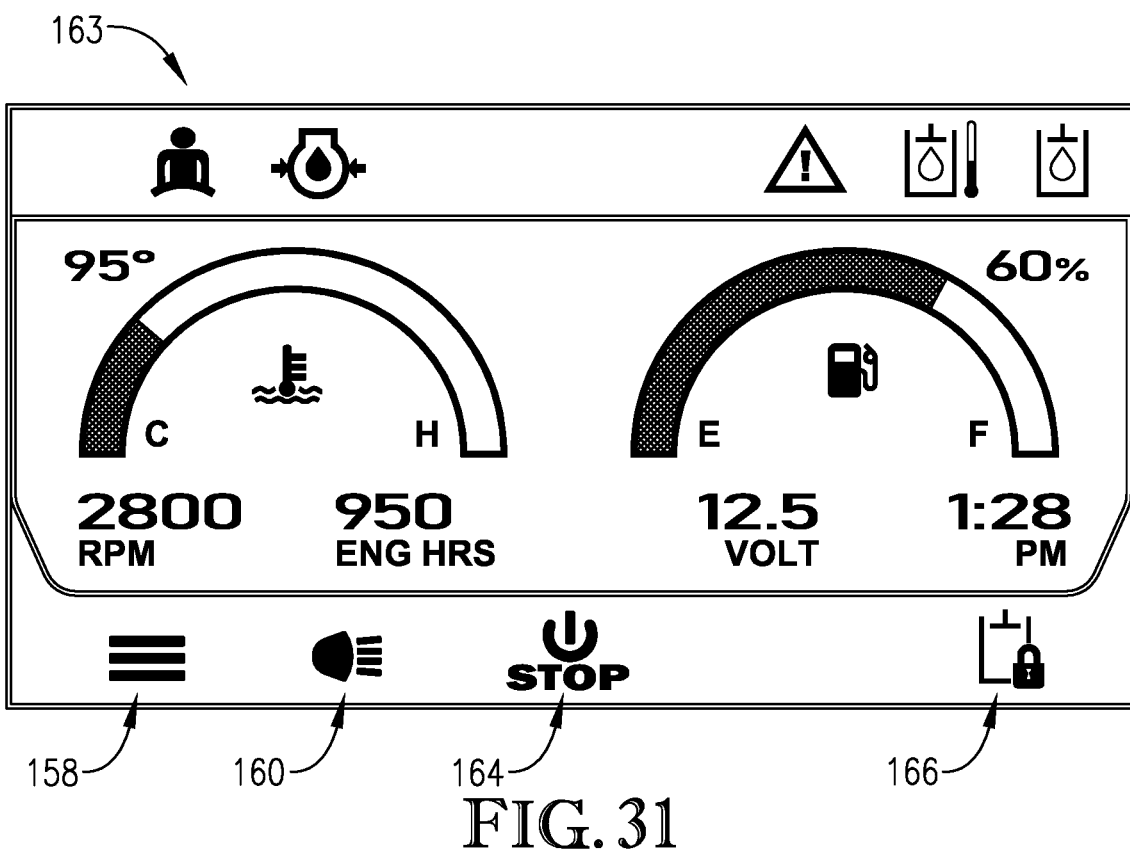
FIG. 31 is a graphical user interface in the form of an additional version of an Operations Screen that can be presented on a graphic display of the compact utility loader of embodiments of the present invention.

In certain embodiments, once the engine 52 of the loader 10 has been started, the Operations Screen may present different information or may permit the operator to perform different functions. For example, as illustrated in FIG. 31, the Operations Screen may include a STOP icon 164 in place of the START icon 156. In a similar manner, however, the operator can select the STOP icon 164 (e.g., via the control elements 145 and/or touchscreen), so as to cause the engine 52 to turn off. Specifically, the selection of the STOP icon 164 may cause the fuel pump to stop providing fuel to the engine 52, so that the engine 52 stops. Once the engine 52 is turned off, or alternatively, once the master switch 154 is turned off, once the engine 52 stalls, and/or once the engine's 50 RPMs fall below a pre-defined threshold, the Operations Screen may revert to the version of the Operations Screen illustrated in FIG. 30.

Remaining with FIG. 31, the Operations Screen additionally presents the operator with the option of initializing the hydraulic system of the loader 10 once the engine 52 has been started. For example, the Operations Screen may present a Hydraulic System icon 166, which when selected (e.g., via a control element 145 and/or touchscreen), activates certain functions of the loader's 10 hydraulic systems. For purposes of the present description, the hydraulic system of the loader 10 is generally grouped into performing the following functions: Drive Functions, Loader Functions, and Attachment Functions. However, it should be understood that such a listing is exemplary, and the hydraulic system of the loader 10 may perform other functions. The Drive Functions correspond to the movement of the loader 10 (e.g., forward, rearward, and turning), such as caused by the hydraulic pump 54 providing power (e.g., via the hydrostatic transmission) to the hydraulic motors 50. The Loader Functions correspond to the movement of the loader arms 16 (e.g., raising and lowering), such as caused by the hydraulic pump 54 providing power to the actuators 76. The Attachment Functions correspond to the various functionalities of an attachment 18 supported by the loader arms 16 (e.g., bucket tilt, hydraulic auxiliary functions, float functions, etc.), such as caused by the hydraulic pump 54 providing power to the attachment 18 (or to the loader arms 16 in case of the float functions). When the Hydraulic System icon 166 is deactivated, the icon may not be highlighted with a color (e.g., may not be visible or may be colored gray) and/or may include a locked mechanical lock icon (See FIG. 31), so as to indicate to the operator that the loader's 10 hydraulic systems are not activated. In contrast, once the Hydraulic System icon 166 has been selected and the hydraulic systems are activated, the Hydraulic System icon 166 may highlighted with a color (e.g., green) and/or may include an unlocked mechanical lock indicator, as to indicate the operator that the loader 10 that the hydraulic systems are at least partially activated.

For example, upon selection of the Hydraulic System icon 166 (with the engine 52 running), the loader's 10 hydraulic system may be permitted to provide operating power to the components of the loader 10 to facilitate Drive Functions and Loader Functions. In such instance, stop element 59 of the loader 10 may be retracted, such that the operator can maneuver the loader 10. The Operations Screen may present the message "Park brake will disengage. Drive and loader controls will be enabled. Operate with extreme caution." In some embodiments, however, the engine 52 may be required to be operating below a pre-established RPM level (e.g., less than 1500 RPMs) before the hydraulic system can be activated. If the engine's 52 RPMS are greater than the pre-established RPM level, the Operations Screen may present the message: "Reduce engine speed to less than 1500 RPM." The engine speed may be reduced via actuation of the engine speed lever 146.

In some embodiments, the hydraulic system of the loader 10 may only be unlocked if the operator is present on the platform 140 (e.g., as determined by the presence sensor 141 previously described, and as indicated on the Operations Screen by Operator Presence icon 163). However, in other embodiments, the UICS 142 may include an override (e.g., a control element 145, touchscreen, or a separate element of the UICCS 142), which when selected, permits the hydraulic system of the loader 10 to be activated and used by the operator when the operator is not positioned on the platform 140 (e.g., when the operator is standing or walking behind or beside the loader 10). In certain embodiments, the override will only permit the Drive Functionality and the Loader Functionality of the hydraulic system to be operational. In certain embodiments, the override will be turned off if the engine 52 shuts down, if the hydraulic system is toggled off by the operator, and/or if the operator becomes present on the platform 140 (so that the override is not necessary).

Figure 32:
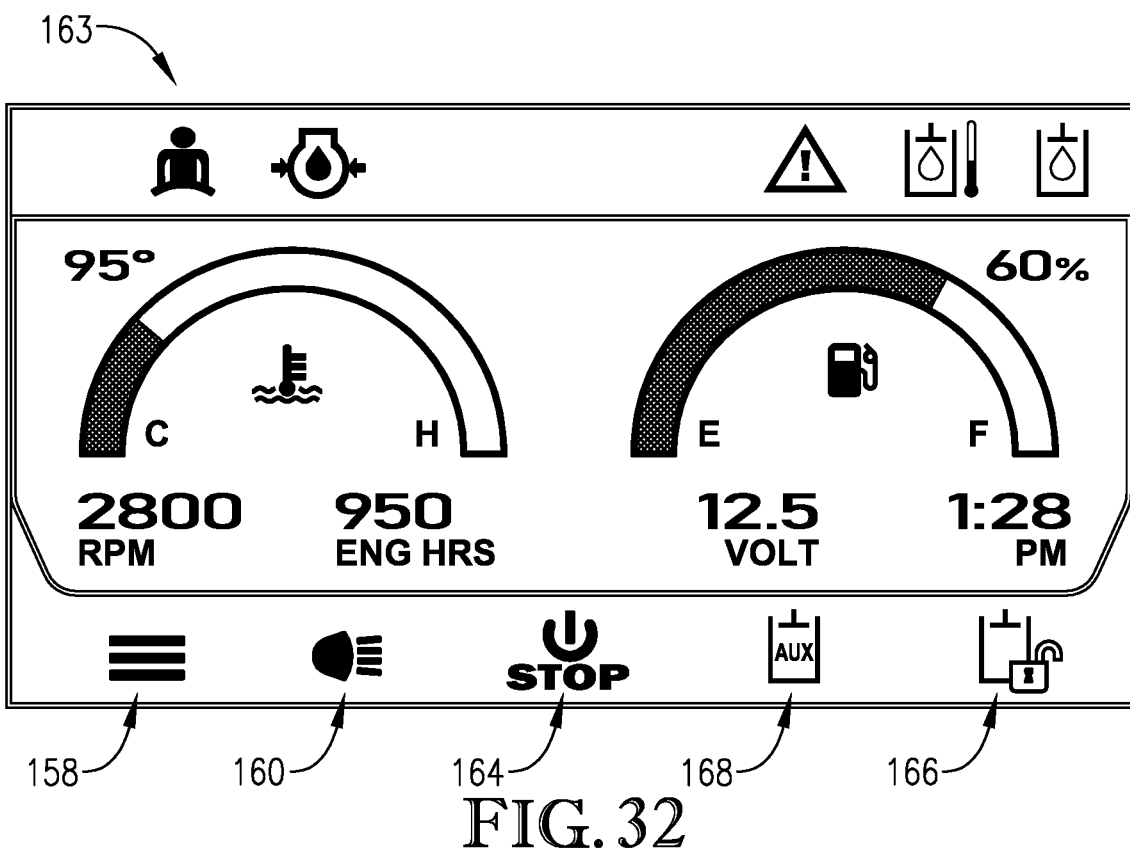
FIG. 32 is a graphical user interface in the form of yet an additional version of an Operations Screen that can be presented on a graphic display of the compact utility loader of embodiments of the present invention.
Figure 33:
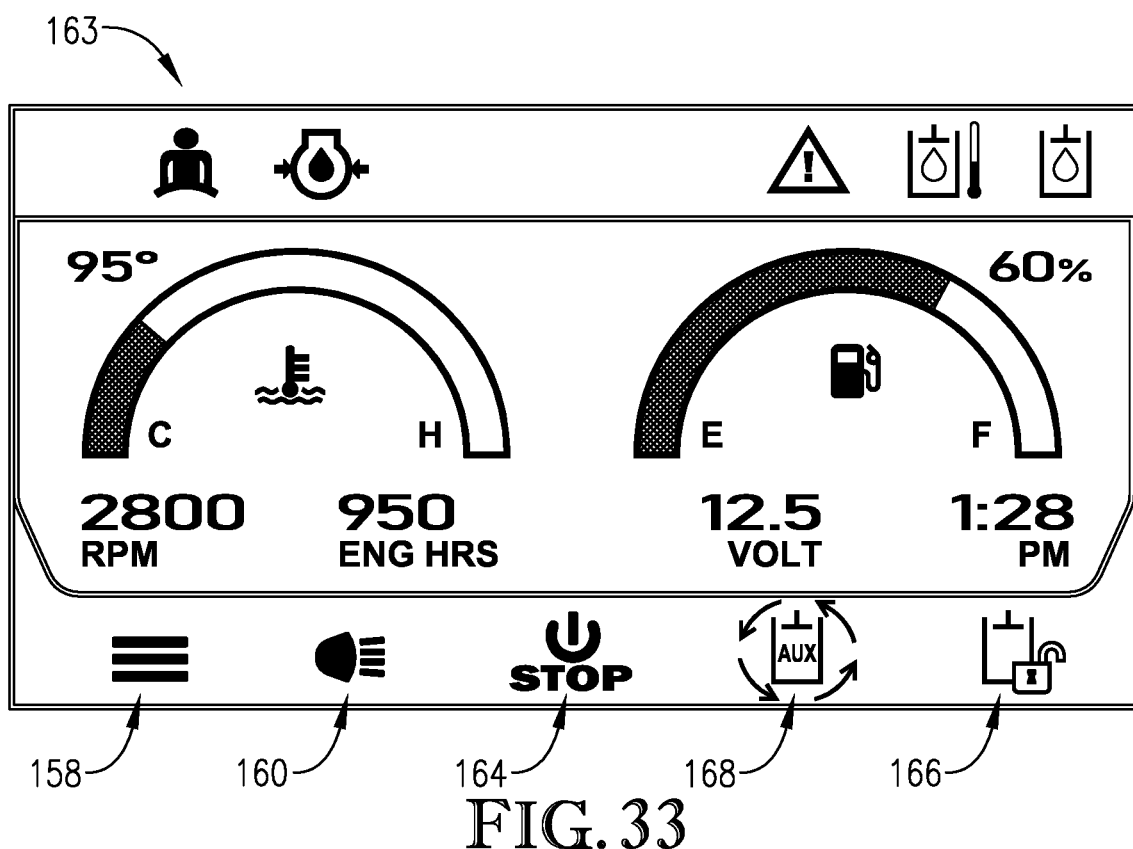
FIG. 33 is a graphical user interface in the form of still an additional version of an Operations Screen that can be presented on a graphic display of the compact utility loader of embodiments of the present invention.

If the operator does become present on the platform 140 of the loader 10 (and with the engine 52 started and the hydraulic system activated), additional hydraulic functionality may be activated. FIG. 32 illustrates an Operations Screen whereby the Hydraulic System icon 166 is illustrated as being unlocked. In such instances, the Attachment Functions of the loader 10, such as the attachment's auxiliary hydraulic functions and the float functionality, may be made operational. In more detail, once the loader's 10 hydraulic system has been activated (with the operator present on the platform 140), the float and the hydraulic auxiliary functions of the attachments may be operable such that the operator can control such functions via the LA&A joystick 148(b), as was previously described. In some embodiments, with the engine 52 started, with the operator present on the platform 140, and with the hydraulic system activated, the Operations Screen may present an Auxiliary Hold icon 168, as illustrated in FIG. 32. By default, the Auxiliary Hold icon 168 will be deactivated, which is indicative of the hydraulic auxiliary functions being set to On-Demand mode (See FIG. 32). The Auxiliary Hold icon 168 may be not be highlighted (e.g., not visible or colored gray) when not activated. Selecting the Auxiliary Hold icon 168 (e.g., via one of the control elements 145 or touchscreen) will permit the Continuous mode of the auxiliary hydraulic functions to be activated. When activated, the Auxiliary Hold icon 168 may be highlighted (e.g., with a green color) and may include a plurality of circularly arranged arrows, as illustrated in FIG. 33.

As is shown in each of the Operations Screens 30-33, the UICS 142 may present the Menu icon 158, which when selected, presents a Menu Screen that permits the operator to perform various administrative functions for the loader 10 and/or display various loader 10 related information. For example, the Menu Screen may permit the operator to view, change/update, and/or re-set the loader's 10 settings, service reminders, safety alerts, and loader specifications, passwords, software, etc. The settings of the loader 10 may allow the operator to display and/or change one or more of the following: language displayed on the UICS 142 (e.g., English, Spanish, etc.), machine serial number, software version, etc. As was previously described, in some embodiments, an owner account may be required to change or update passcodes for an operator account. As was noted previously, the loader 10 may have multiple operators associated with the loader 10, with each having their own unique operator account and/or passcode. The owner account may individually view and change passwords for each operator. In some embodiments, the owner account (or the master account) may also disable passcode requirements, such that the loader 10 can be started and operated without a passcode being entered via the UICS 142. In addition, as was noted previously, a master account may be required to view or change the passcode for an owner. In certain embodiments, from the settings, the owner may (via the owner account) view and/or change the scaling factor used by the auxiliary buttons 152(b) of the FA&A joystick 148(b). In some embodiments, the settings may allow the operator or the owner to view the software version currently used on the loader 10. The software may be updated wirelessly (e.g., WiFi, Bluetooth, or cellular) or via wired connection (e.g., USB, memory card, etc.). In certain embodiments, an owner account may be required to update the software of the loader 10.

Selecting the service reminders from the Menu Screen may permit the operator to reset the loader's 10 service reminders (e.g., air filter, fuel filter, oil filter replacement, etc.), such as after the appropriate services have been performed. In some embodiments, as was described previously, an owner account may be required to reset or to define the service reminders. Selecting the safety alerts from the Menu Screen may present any Warnings Alerts (e.g., low oil pressure) that the loader 10 is currently experiencing (or has experienced in the past). In some embodiments, the owner account may be required to reset any existing Warning Alerts. Finally, selecting the loader 10 specifications from the Menu Screen may display various loader 10 specifications to the operator, such as fluid capacities, oil types, filter models, etc.

Figure 34:
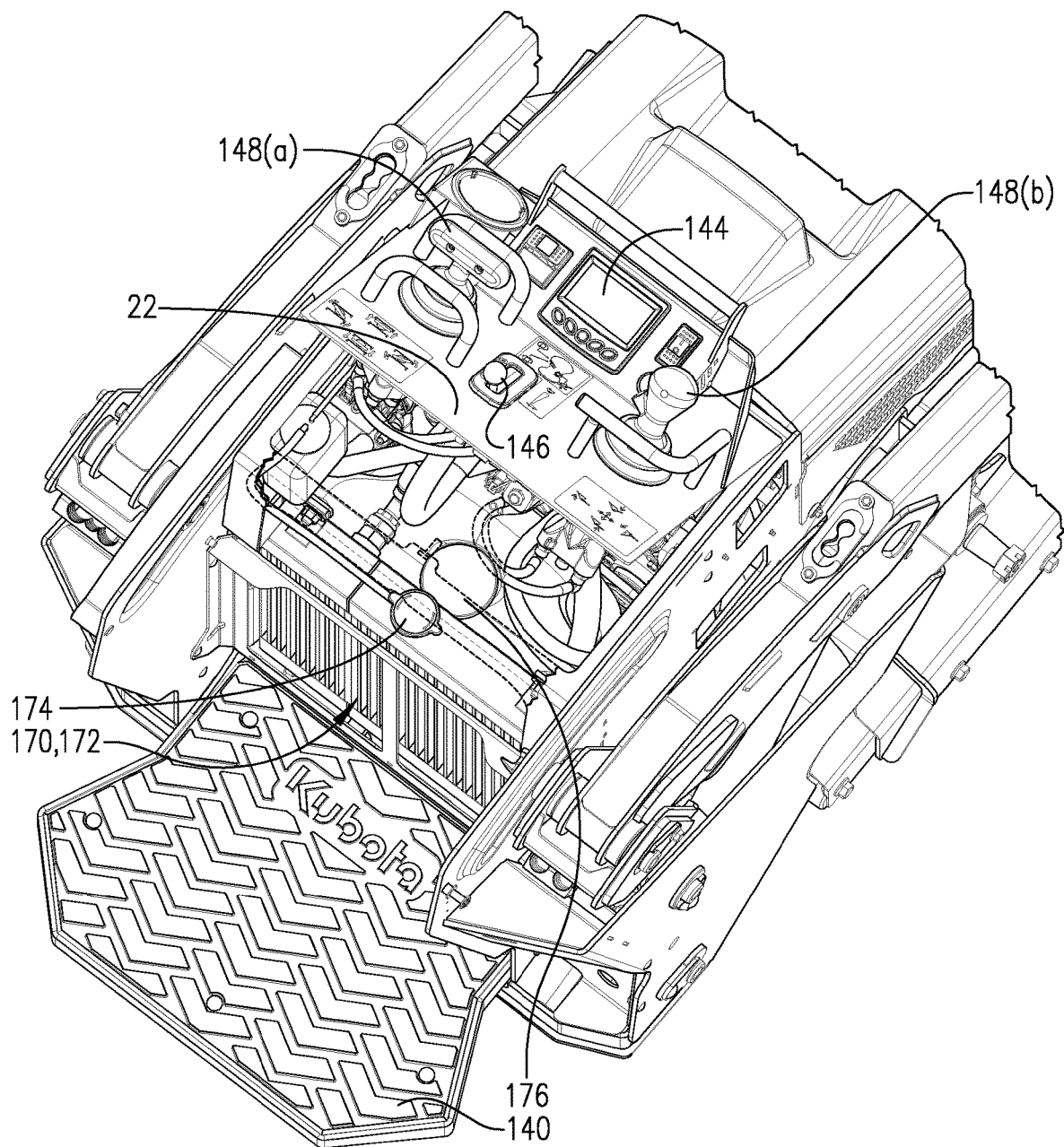
FIG. 34 is another partial rear perspective view of the compact utility loader from FIGS. 1-6, particularly illustrating a control panel being raised to provide access to a radiator and fan for cleaning.

Finally, turning to FIGS. 26 and 27, the UICS 142 includes the control panel 22 on which the joysticks 148, graphic display 144, and control elements 145 are located. In some embodiments, the control panel 22 may be pivotally connected with the frame 12 of the loader 10, such that the control panel 22 can pivot or rotate upward. With the control panel 22 pivoted upward, as illustrated in FIG. 34, access is provided to certain internal components located underneath the control panel 22. For example, upward rotation of the control panel 22 can allow access to the pilot control valve assemblies 158(a) and (b) extending from the joysticks 148(a) and (b) on the opposite side of the control panel 22 (as is perhaps best shown in FIG. 28). Returning to FIG. 34, a radiator 170 and associated fan 172, which may be positioned below the control panel 22, may be accessed via the open control panel 22. The radiator 170 and fan 172 are also shown in FIG. 27. Accessing the radiator 170 and fan 172 from the open control panel 22 may facilitate quick and efficient addition of coolant to the radiator 170 (e.g., via radiator cap 174 positioned on top of the radiator 170). The radiator 170 and fan 172 may comprise a frame or shroud that houses interior components of the radiator 170 and fan 172. As shown in FIG. 34, the frame or shroud may comprise an access port 176 that is accessible from the open control panel 22 and that allows a user to introduce a pressurized air nozzle into the frame or shroud for cleaning the radiator 170 and/or fan 172, such as for blowing out debris from fins of the radiator 170. Specifically, this access port 176 is accessible upon the control panel 22 being rotated upward and permits the user to insert a pressurized air hose and/or nozzle into the access port 174 to blow out the radiator 170.

Recap of Certain Loader Embodiments

As described in the above description, embodiments of the present invention include a loader 10 that provides various benefits over prior art loaders. For example, the loader 10 may include a generally T-shaped frame 12, which permits at least a portion the tracks 40 to extend underneath at least a portion of the loader's 10 frame 12. Such a configuration allows the loader 10 to be formed with a relatively narrow overall width W1, but to also include oversized tracks 40. Benefits of this configuration include increased maneuverability and a more even distribution of the loader's 10 load and weight onto the ground surface.

In addition, the loader 10 CUL may include tapered conical sprockets 44 extending from the lateral sides (e.g., left side and right side 30, 32) of the frame 12 of the loader 10, which facilitates the ability of the loader 10 to include oversized tracks 40 with the reduced-width frame 12 (i.e., having the overall width W1). The sprockets 44 extend laterally outward from each of the left side and right side 30, 32 of the frame 12 and are generally in operable connection with the hydraulic motors 50 (with the motors 50 being positioned in the interior compartment of the frame 12, each being adjacent to one of the left side and right side 30, 32). The motors 50 are powered indirectly by an engine 52 (e.g., via a hydrostatic transmission associated with the hydraulic pump 54), with the engine 52 being shifted rearward behind the motors 50. Such rearward shifting of the engine 52 facilitates the ability of the loader 10 to have a reduced width because the motors 50 are not required to be positioned directly to the lateral sides of the engine 52. In some embodiments, the motors 50 may still require sufficient spacing to permit the flywheel 56 to be positioned between the motors 50. Nevertheless, the configuration of the conical sprockets 44 permits the motors 50 of the loader 10 to actuate the oversized tracks 40 while the loader 10 itself can maintain a reduced overall width W1. The rearward shifting of the engine 52 also provides space for secondary, internal components of the loader 10 to be positioned within the interior compartment presented inside the frame 12 of the loader 10. The rearward shifting of the engine 52 further provides a rearward shifting of the loader's 10 center of gravity (due to the high weight of the engine 52), which improves load distribution and maneuverability of the loader 10. For example, the center of gravity of the loader 10 of embodiments of the present invention may be shifted rearward from the midpoint of the length of the loader 10. Specifically, a distance from the front of the loader 10 to the center of gravity forms a ratio of between 55:45 to 75:25, between 60:40 to 70:30, or about 65:35 with respect to a distance from the rear of the loader 10 to the center of gravity. Stated differently, the center of gravity of the loader 10 may be positioned about 15% of the overall length of the loader 10 rearward from the midpoint of the loader's 10 length.

As noted above, the rearward positioning of the engine 52 also permits other internal components of the loader 10 to be positioned within the interior compartment of the loader 10 frame 12 (forward of the engine 52). Such components include the various elements of the loader's 10 hydraulic system (e.g., hydraulic pump 54, hydraulic reservoir, hydraulic lines, etc.), fuel tank, fuel lines, hydraulic filter, fuel filter, water separator. Providing such components in the interior compartment of the frame 12, forward of the engine 52, improves access to such components for service and maintenance), as well as inhibits the chance of liquids and fluids spilling onto the engine 52. In some embodiments, the loader 10 will include the hood 36 (which may be formed from plastic, fiberglass, or other similar material), which covers the internal components of the loader 10 positioned within the internal space of the frame 12. However, the hood 36 may be hingedly attached the frame 12, such that the hood 36 can be raised to provide easy access to such components (e.g., for service and maintenance, re-filling fluids, etc.).

In some embodiments, the engine 52 of the loader 10 may incorporate a turbo, which provides for higher torque at a lower RPM. As such, the loader 10 can incorporate the use of low-displacement motors 50, which allow the loader 10 have an increased speed at lower RPMs. In some embodiments, a maximum ground speed of the loader can be at least 4.8 MPH, at least 4.9 MPH, at least 5.0 MPH, at least 5.1 MPH, or at least 5.2 MPH. Such enhanced ground speed is provided even with a low horsepower rating of the loader's 10 engine 52. For example, in some embodiments, the engine 52 may have a horsepower rating of less than 50 horsepower, less than 40 horsepower, less than 30 horsepower, and/or less than 25 horsepower. The use of the turbo also permits the loader to operate with a generally low noise level. In addition, the shape of the loader 10 frame 12 (i.e., the T-shaped frame 12) also functions to attenuate noise generated by the loader 10. The use of a muffler and the hood 36 (which may be made from plastic) may also function to reduce noise level of the loader 10.

In additional embodiments, the loader 10 may include an enhanced user interface and control system (i.e., UICS 142), which includes several features that improve the ability of a user to operate and to receive information related to the loader 10. The UICS 142 may be part of the control station 20, so as to be positioned at a rear of the loader 10. As such, and operator can stand at and/or on the rear of the loader 10 to operate the loader 10. In more detail, the UICS 142 may include a graphic display 144 and one or more control elements 145 associated with the graphic display 144 (e.g., user inputs, such as buttons or switches positioned below or otherwise adjacent to the graphic display 144), which allow the operator to interact with the GUIs presented by the graphic display 144. In some embodiments, the graphic display 144 may comprise a touchscreen, such that the control elements 145 are not necessary to interact with the GUIs presented by the graphic display 144.

As was described above, the UICS 142 may also include one or more joystick 148 type controls for controlling various functions and features of the loader 10. The graphic display 144 and the joysticks 148 may be supported on the control panel 22 so as to be accessible from above the control panel 22. In some embodiments, the control panel 22 may be configured to pivot upward, so as to provide access to internal components located at a rear of the loader 10 and underneath the control panel 22. For example, the loader 10 may include the radiator 170 and fan 172 positioned behind the engine 52 and below the control panel 22. The ability of the control panel 22 to be pivoted upward allows access to the radiator 170 and fan 172 so as to, for example, add coolant to the radiator 170. In additional embodiments, the radiator 170 may be configured with a radiator frame or shroud with an access port 176 that allows a user to introduce a pressurized air nozzle for cleaning (e.g., blowing out) fins of the radiator 170. Such an access port 176 may be positioned below the control panel 22, such that pivoting the control panel 22 permits the operator to insert the pressurized air nozzle into the access port 176 to blow out the radiator 170. In some embodiments, the operator may also access the fan 172 and/or the fan belt (e.g., so as to adjust the tension of an alternator and/or fan belt or to replace the belt) upon the control panel 22 having been pivoted upward. In some additional embodiments, internal components of the loader's hydraulic system can be accessed upon the opening of the control panel 22. For instance, the pilot control valve assemblies 150(a) and (b) (and hydraulic lines) associated with the joysticks 148(a) and (b) may extend downward below the control panel 22, while the joysticks 148(a) and (b) may extend upward from the control panel 22. As such, the pilot control valve assemblies 150(a) and (b) (and hydraulic lines) may be accessed efficiently once the control panel 22 has been pivoted upward.

Embodiments provide for the loader 10 to incorporate the use of the joysticks 148 due, in part, to the use of the pilot control valve assemblies 150(a) and (b) (and hydraulic lines). In general, the pilot control valve assemblies 150(a) and (b) can be used to separate a low-pressure side (the "low side") of the loader's 10 hydraulic system from a high-pressure side (the "high side"). Each of the joysticks 148(a) and (b) may be operably connected with one of the pilot control valve assemblies 150(a) and (b). The pilot control valve assemblies 150(a) and (b) are, in turn, configured to generate and output hydraulic pressure to the high-pressure side ("high side") components of the loader's 10 hydraulic system. Such high side components may include, for instance, the hydraulic pump 54, the hydraulic motors 50 that actuate the tracks 40, the actuators 76 (e.g., hydraulic cylinders) that actuate the loader arms 16, the tilt cylinder 151 that actuates the attachment 18 (e.g., a bucket cylinder for tiling a bucket attachment), and/or the hydraulic auxiliary components of the attachment 18.

For example, the loader 10 may include a drive joystick 148(a) that can be used to control the motion of the loader 10. As such, the drive joystick 148(a) can be used to direct the loader 10 in a forward direction, a rearward direction, to turn left, or to turn right. The drive joystick 148(a) may extend upward from the control panel 22, such that a user may actuate the drive joystick 148(a) to move the loader 10. The pilot control valve assembly 150(a) may be connected underneath the drive joystick 148(a) and extend below the control panel 22. Hydraulic lines may extend from the pilot control valve assembly 150(a) to the hydraulic pump 54 that is connected to the hydraulic motors 50 of the left-side and right-side tracks 40. As such, actuation of the drive joystick 148(a) will cause a corresponding actuation of the loader 10 tracks 40 to cause movement of the loader 10. The low side of the loader's 10 hydraulic system may operate with hydraulic fluid that is pressurized to around 330 psi. This low pressurized hydraulic fluid is input to the pump 54 as a control signal. The hydraulic pump 54 (and/or the associated hydrostatic transmission) correspondingly outputs a high pressurized hydraulic fluid (e.g., about 4000 psi) to the high side of the loader's 10 hydraulic system, and particularly to the motors 50 to cause actuation of the sprockets 44 tracks 40, and movement of the loader 10.

Similarly, the LA&A joystick 148(b) may be used to control movement of the loader arms 16 (e.g., so as to raise and lower the attachment 18 connected to the ends of the loader arms 16) and/or to actuate the attachment 18. Specifically, the LA&A joystick 148(b) may include a pilot control valve assembly 150(b) (and associated hydraulic lines) that operate using hydraulic fluid pressurized to about 330 psi. The pilot control valve assembly 150(b) can be connected to (1) the actuators 76 of the loader arms 16, and/or (2) the hydraulic auxiliary components of the attachment 18. The pilot control valve assembly 150(b) may output hydraulic fluid to the high side loader arm 16 actuators 76 and/or tilt cylinder 151 at a pressure of around 3000 psi. The pilot control valve assembly 150(b) may output hydraulic fluid to the high side auxiliary components of the attachment 18 at a pressure of around 2800 psi.

In some embodiments, the LA&A joystick 148(b) will control the loader arms 16 (e.g., raising and lowering) by actuating the drive joystick 148(a). In some of such embodiments, the LA&A joystick 148(b) will include one or more auxiliary buttons 152(b), which when depressed, will activate auxiliary functions of the attachment 18 (if applicable). In addition, the LA&A joystick 148(b) may include a float button 152(a), which when depressed, permits the loader arms 16 to float along the surface of the ground and follow the terrain, regardless of changes in terrain.

As described above, an operator may operate the loader 10 from the rear of the loader 10. For example, the loader 10 may include the platform 140 positioned near a bottom, rear of the frame 12. The operator may stand on the platform 140 to operate the loader (e.g., by actuating the components of the UICS 142). In some embodiments, the platform 140 may include a presence sensor 141 (e.g., an inductive proximity or pressure sensor), which is configured to deactivate certain components of the hydraulic system of the loader 10 when the operator is not standing on the platform 140. For example, the low side pilot control valve assembly 150 may be disabled when an operator is not standing on the platform 140. In some additional embodiments, the loader 10 may include an override function (e.g., accessible as a component of the UICS 142) that allows certain of the loader's 10 hydraulic systems to be operated (e.g., Drive Functionality and Loader Functionality) even when the operator is not standing on the platform 140. In some embodiments, the presence sensor 141 may be configured to deactivate components of the loader's 10 drive system 14 when the operator is not present on the platform 140. For example, when the operator leaves the platform 140, the presence sensor 141 may send a signal to the loader's 10 control system to engage the stop elements 59 with the sprockets 44 so as to prevent movement of the loader 10.

The graphic display 144 of the UICS 142 also includes several features that enhance operation of the loader 10. For example, the graphic display 144 may present a GUI in the form of a Login Screen, which requests that the operator enter a passcode (e.g., a numeric code, a textual code, alphanumeric code, etc.) for unlocking certain functions and features of the loader 10 (including of the UICS 142). For example, prior to entry of a valid passcode, certain of the loader's 10 features may be disabled, such as certain "low side" components of the loader's hydraulic system (e.g., the drive joystick 148(a) and/or LA&A joystick 148(b)). Other features may also be disabled, such as the loader's 10 work lights and glow plugs. Upon the operator entering a correct or valid passcode, additional features of the UICS 142 may be unlocked, such as for instance, the ability for the operator to start the engine 52 of the loader 10 (e.g., using a control element 145 or touchscreen). Thus, the operator may start the loader 10 without a physical key. Similarly, the operator may turn off the engine 52 of the loader without a physical key (e.g., using a control element 145 or touchscreen). In some instances, upon successfully entering the passcode, the passcode may not need to be re-entered upon successive startups as long as such successive startups are performed within a predetermined period of time (e.g., 30 seconds).

In view of the above, certain embodiments of the loader 10 may provide for the loader 10 to include a keyless start mechanism configured to permit the loader 10 (and/or the engine 52) to be started without a physical key. Such keyless start mechanism may also be used to permit the loader 10 (and/or the engine 52) to be stopped without a physical key. In some embodiments, the keyless start mechanism will comprise the graphic display 144, which is configured to present operational information to the operator. As discussed above, the graphic display 144 is configured to present a Login Screen prompting the operator for a passcode, whereby the engine 52 is prevented from being started until a valid passcode is entered via the UICS 142. In some embodiments, the operator can enter the passcode via the plurality of control elements 145, such that the engine 52 of the loader 10 can be started (and/or stopped) without a physical key. In other embodiments, the graphic display 144 may be a touchscreen, and the operator can enter the passcode via the touchscreen, such that the engine 52 of the loader 10 can be started (and/or stopped) without a physical key. In some further embodiments, the UICS 142 may include an additional control element, such as a push button associated with the control panel 22. In such embodiments, the keyless start mechanism may comprise the push button, such that an operator can start (and/or stop) the engine 52 of the loader 10 without a physical key by depressing the push button (e.g., without requiring the input of a passcode).

Upon unlocking the UICS 142 with a valid passcode, the loader 10 may also permit power to be selectively distributed to the loader's 10 hydraulic systems, work lights, glow plugs, etc. Specifically, the operator may use the graphic display 144 (e.g., in conjunction with the associated control elements 145 and/or the GUIs presented by the graphic display 144) to selectively control the various functions and features of the loader 10, such as: turning on/off the hydraulic system (e.g., including overriding the standard deactivation of the hydraulic system when a user is not positioned on the platform 140), configuring the auxiliary hydraulic functions of the attachment 18 in either the On-demand mode or the Continuous mode, setting the scaling factor used by the buttons 152(a),(b) of the FA&A joystick 148(b) (e.g., as may be necessary for proper use of the auxiliary hydraulic functions of the attachment 18), to selectively engage or disengage the stop element 59 (so as to functions as a parking break of the loader 10), turn the the lights of the loader 10 on/off (in some embodiments the lights may be associated with a courtesy timer, such that the lights will remain on and will automatically shut off after a predetermined period of time has elapsed after the loader 10 has been turned off), and passcode entry.

The graphic display 144 may also be configured to present colored graphics, such as to present various types of operational information to the operator. Such operational information may include (as was described above): engine hours, fuel level, engine RPM, engine temperature, battery voltage, day/time. The graphic display 144 may also present operational information in the form of service/maintenance reminders (e.g., air filter, fuel filter, oil filter replacement). Such reminders may be based on time (e.g., a daily/weekly/monthly/yearly timer), engine hours, or based on various sensor data received from other loader 10 sensors. For example, the loader 10 air filter may be associated with a sensor (e.g., an airflow/pressure sensor) for indicating when the air filter is clogged and needs to be cleaned/replaced. The graphic display 144 may also present information indicative of the status of the loader's hydraulic system, such as (i) when the loader's 10 hydraulic system is activated, (ii) when the loader 10 is in Continuous mode, and/or (iii) when the loader 10 is in an On-Demand mode.

Furthermore, the loader 10 includes loader arms 16 that provide for vertical-lift operation with an extended reach. For example, when the loader 10 is equipped with an attachment 18 in the form of a bucket, the loader arms 16 may raise the bucket to an extendable height of at least 84.7 inches and a forward reach of at least 28.3 inches (measured from tangent of loader track 40 and with the bucket tilted/dumped 45 degrees downward). To accomplish such enhanced height and reach capabilities, the loader arms 16 includes a unique travel path, as defined by the path traveled by the loader arm 16 hitch pin 68 when viewing the loader 10 from a side elevation view. The travel path may approximate the function $f(x)=4.641e^{0.34x}$. Such a travel path of the loader arms 16 also provides for enhanced breakout strength of the loader arms 16 and associated attachments 18.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

What is claimed is:

1. A compact utility loader comprising:
   a frame;
   a loader arm configured to support an attachment, wherein said loader arm is in a vertical-lift configuration;
   a first link comprising a first arm, a second arm, and a central portion, wherein the central portion is pivotably coupled with said frame the first end and the second end, wherein the first arm extends from the central portion to a first end of said first link, wherein the second arm extends from the central portion to a second end of said first link, wherein the first arm and the second arm extend from the central portion at an angle with respect to each other, and wherein said first link is pivotably secured to said loader arm at the first end of said first link;
 a second link pivotably secured to said frame and to said loader arm; and
 an actuator configured to raise and lower said loader arm, wherein said actuator is pivotably coupled with the second end of said first link,
 wherein said actuator is not simultaneously secured to both said frame and said loader arm.

2. The compact utility loader of claim 1, wherein said actuator is a linear actuator.

3. The compact utility loader of claim 2, wherein said first link is a control link and said second link is a rear link, wherein said linear actuator is pivotably secured to said frame and is pivotably secured to said control link.

4. The compact utility loader of claim 3, wherein the central portion of said control link is a fulcrum.

5. The compact utility loader of claim 4, wherein said control link functions as a lever, such that extension and retraction of said linear actuator causes a corresponding raising and lowering of said loader arm.

6. The compact utility loader of claim 5, wherein said control link is formed as an L-shape.

7. The compact utility loader of claim 2, wherein said linear actuator comprises a hydraulic cylinder.

8. The compact utility loader of claim 1, wherein said loader arm is a left side loader arm, and wherein said compact utility loader further comprises a right side loader arm.

9. The compact utility loader of claim 1, wherein said first link is a left side control link, said second link is a left side rear link, and said actuator is a left side actuator, wherein said compact utility loader further comprises a right side control link, a right side rear link, and a right side actuator.

10. The compact utility loader of claim 1, wherein said compact utility loader comprises a joystick for controlling said actuator.

11. A compact utility loader comprising:
 a frame;
 a loader arm configured to support an attachment, wherein said loader arm is in a vertical-lift configuration;
 a first link pivotably secured to said frame and to said loader arm;
 a second link pivotably secured to said frame and to said loader arm, wherein said second link is positioned forward of said first link; and
 an actuator configured to raise and lower said loader arm, wherein said actuator is not simultaneously secured to both said frame and said loader arm, and wherein said actuator is a rotary actuator directly coupled to both said first link and to said loader arm and operable to change a relative angle between said first link and said loader arm.

12. The compact utility loader of claim 11, wherein said first link is a control link and said second link is a rear link, and wherein said rotary actuator is positioned at a pivot connection between said rear link and said loader arm.

13. The compact utility loader of claim 12, wherein said rotary actuator is configured to change the relative angle between said rear link and said loader arm to selectively raise and lower said loader arm relative to said frame.

14. The compact utility loader of claim 11, wherein said rotary actuator is hydraulically powered.

* * * * *